(12) United States Patent
Huang et al.

(10) Patent No.: US 12,531,623 B2
(45) Date of Patent: Jan. 20, 2026

(54) BEAM DETERMINATION IN HOLOGRAPHIC MIMO SYSTEM

(71) Applicant: QUALCOMM Incorporated, San Diego, CA (US)

(72) Inventors: Min Huang, Beijing (CN); Wei Xi, Beijing (CN); Chao Wei, Beijing (CN); Yu Zhang, San Diego, CA (US); Hao Xu, Beijing (CN); Chenxi Hao, Beijing (CN); Rui Hu, Beijing (CN); Liangming Wu, Beijing (CN); Kangqi Liu, San Diego, CA (US); Qiaoyu Li, Beijing (CN); Jing Dai, Beijing (CN); Changlong Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 313 days.

(21) Appl. No.: 18/261,403

(22) PCT Filed: Mar. 26, 2021

(86) PCT No.: PCT/CN2021/083245
§ 371 (c)(1),
(2) Date: Jul. 13, 2023

(87) PCT Pub. No.: WO2022/198633
PCT Pub. Date: Sep. 29, 2022

(65) Prior Publication Data
US 2024/0088980 A1    Mar. 14, 2024

(51) Int. Cl.
*H04B 7/06* (2006.01)
*H04B 17/318* (2015.01)

(52) U.S. Cl.
CPC ....... *H04B 7/06952* (2023.05); *H04B 7/0626* (2013.01); *H04B 7/0691* (2013.01); *H04B 17/328* (2023.05)

(58) Field of Classification Search
None
See application file for complete search history.

(56) References Cited

U.S. PATENT DOCUMENTS

2017/0127295 A1    5/2017  Black et al.
2020/0059290 A1    2/2020  Pan et al.
2023/0344469 A1*  10/2023  Chen .................... H04B 7/0617

OTHER PUBLICATIONS

Chongwen H., et al., "Holographic MIMO Surfaces for 6G Wireless Networks: Opportunities, Challenges, and Trends", IEEE Wireless Communications, Coordinated Science Laboratory, Department of Electrical and Computer Engineering, University of Illinois at Urbana-Champaign, US, vol. 27, No. 5, Oct. 1, 2020 (Oct. 1, 2020), pp. 118-125, XP011817269, 8 Pages, ISSN: 1536-1284, DOI: 10.1109/MWC.001.1900534 [retrieved on Oct. 27, 2020] p. 4.
International Search Report and Written Opinion—PCT/CN2021/083245—ISA/EPO—Sep. 15, 2021.

* cited by examiner

*Primary Examiner* — Minh Trang T Nguyen
(74) *Attorney, Agent, or Firm* — Patterson+ Sheridan, L.L.P.

(57) ABSTRACT

Certain aspects of the present disclosure relate to wireless communications, and more particularly, to techniques for beam determination, multi-user transmission, and channel state variance information (CSVI) reporting in a holographic multiple input multiple output (MIMO) system.

30 Claims, 44 Drawing Sheets

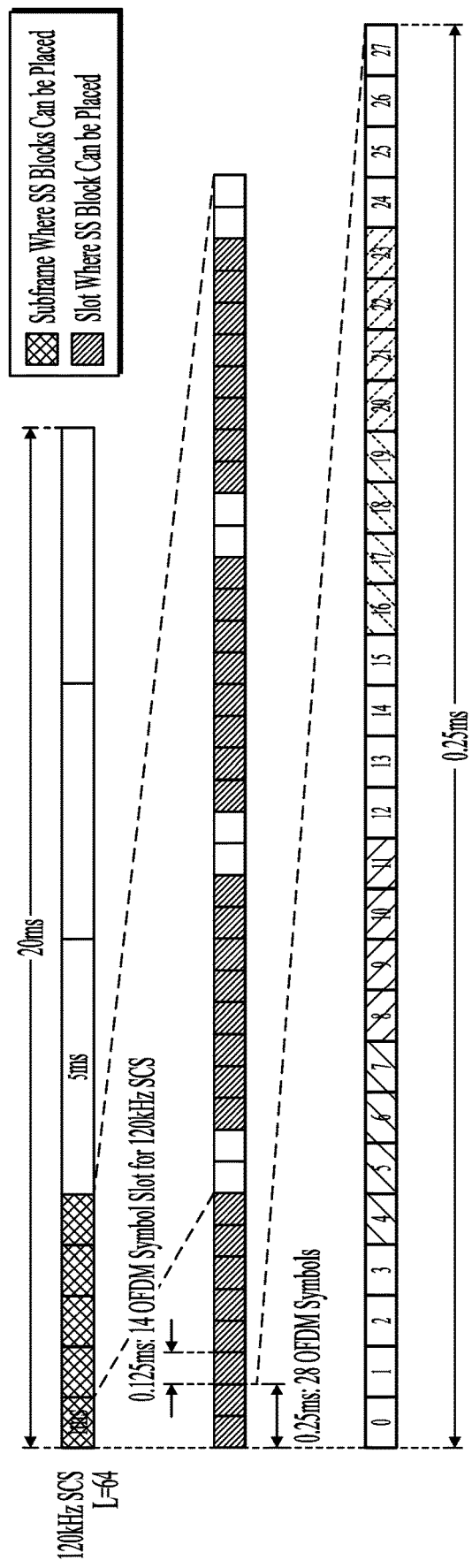
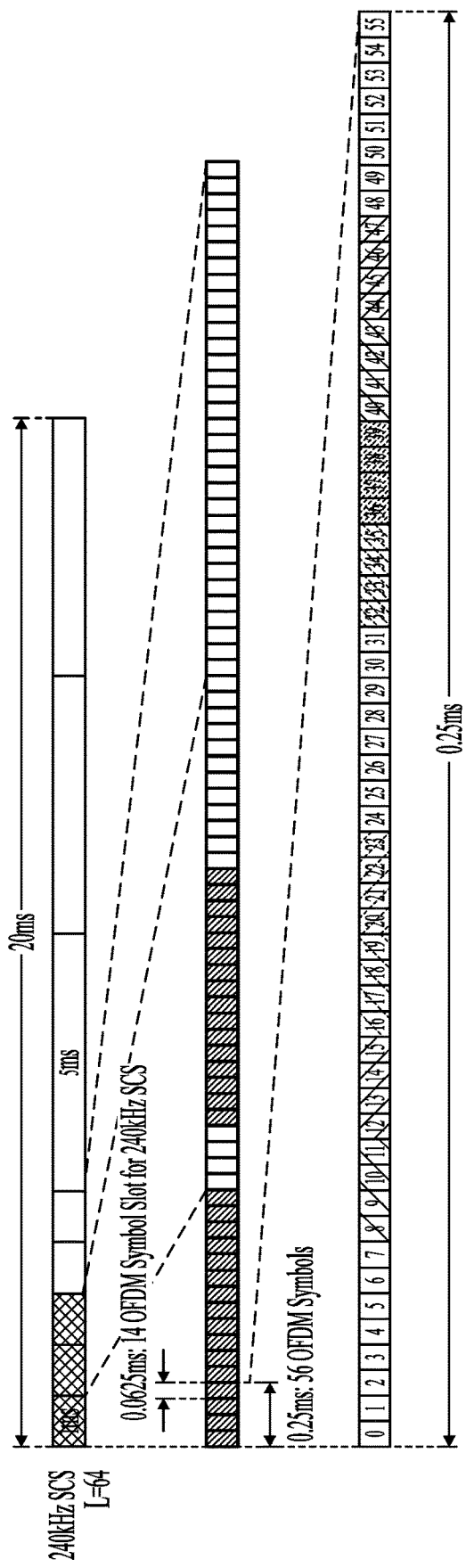
FIG. 6A
FIG. 6B 2D beams 3D beam

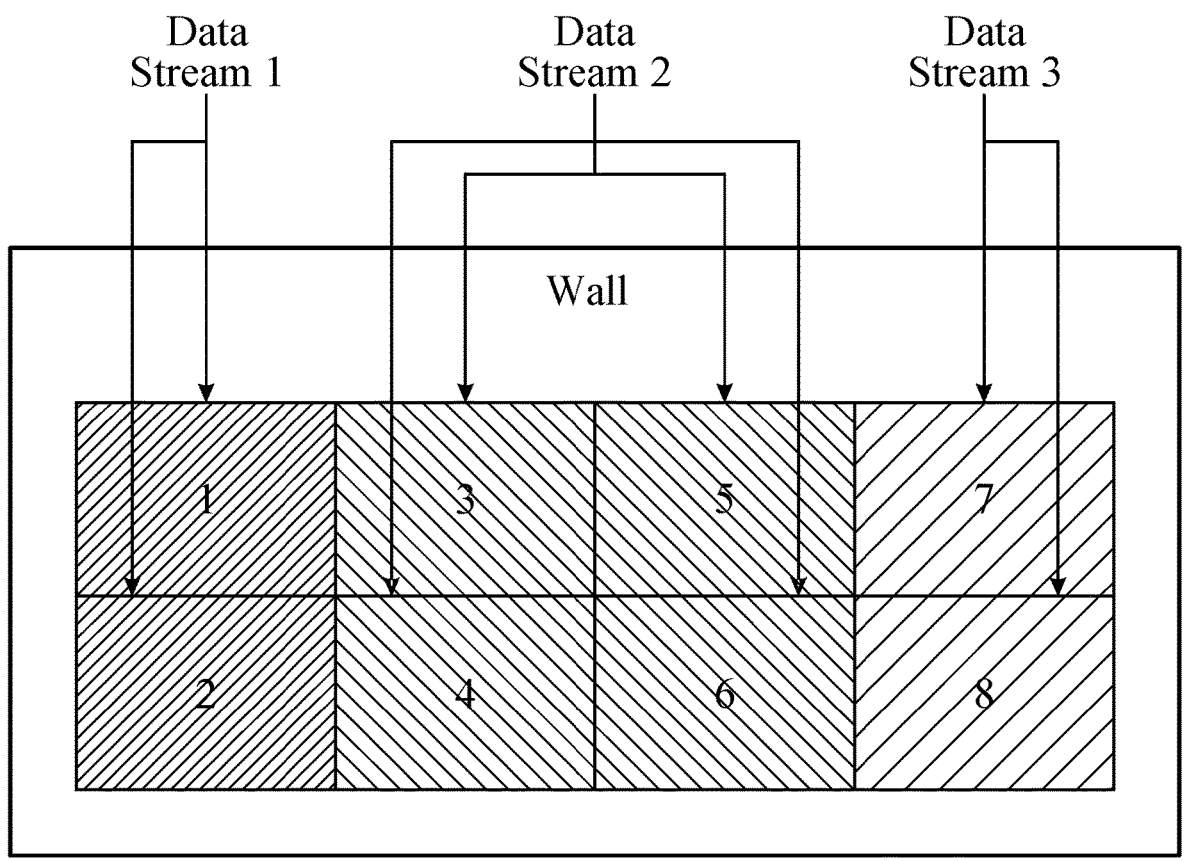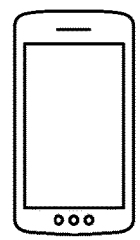
FIG. 17

| RSRP Value (dBm) | Subarray 1 | Subarray 2 | Subarray 3 | Subarray 4 | Subarray 5 | Subarray 6 | Subarray 7 | Subarray 8 |
|---|---|---|---|---|---|---|---|---|
| UE 1 | -80 | -80 | -80 | -80 | -90 | -90 | -100 | -100 |
| UE 2 | -100 | -100 | -90 | -90 | -80 | -80 | -80 | -80 |
| UE 3 | -90 | -90 | -90 | -90 | -100 | -100 | -110 | -110 |

FIG. 28B

|  | UE 1 | UE 2 | UE 3 |
|---|---|---|---|
| H-MIMO Without Combiner | Subarray 1~2 | Subarray 3~4 | Subarray 5~8 |
| H-MIMO With Combiner | Subarray 1~4 | Subarray 1~4 | Subarray 5~8 |

FIG. 29B

Option 1

| Number of Paired UEs | UE ID for Subarray 1 | UE ID for Subarray 2 | UE ID for Subarray 3 | UE ID for Subarray 4 | UE ID for Subarray 5 | UE ID for Subarray 6 | UE ID for Subarray 7 | UE ID for Subarray 8 |
|---|---|---|---|---|---|---|---|---|

Option 2

| Number of Paired UEs | ID of Paired UE 1 | ID of Paired UE 2 | ID of Paired UE 3 | UE Index for Subarray 1 | UE Index for Subarray 2 | UE Index for Subarray 3 | UE Index for Subarray 4 | UE Index for Subarray 5 | UE Index for Subarray 6 | UE Index for Subarray 7 | UE Index for Subarray 8 |
|---|---|---|---|---|---|---|---|---|---|---|---|

UE Indexes represent the Position in the Indicated UE ID Sequence

FIG. 30A

| Number of Paired UEs | ID of Paired UE 1 | ID of Paired UE 2 | ID of Paired UE 3 | Subarray Allocation for UE 1 | Subarray Allocation for UE 2 | Subarray Allocation for UE 3 |
|---|---|---|---|---|---|---|

FIG. 30B

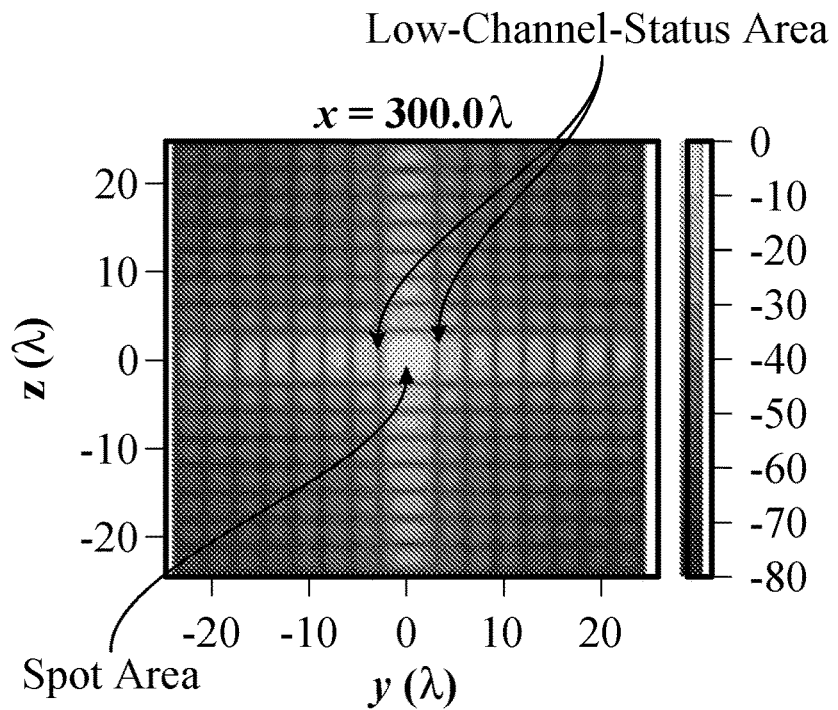
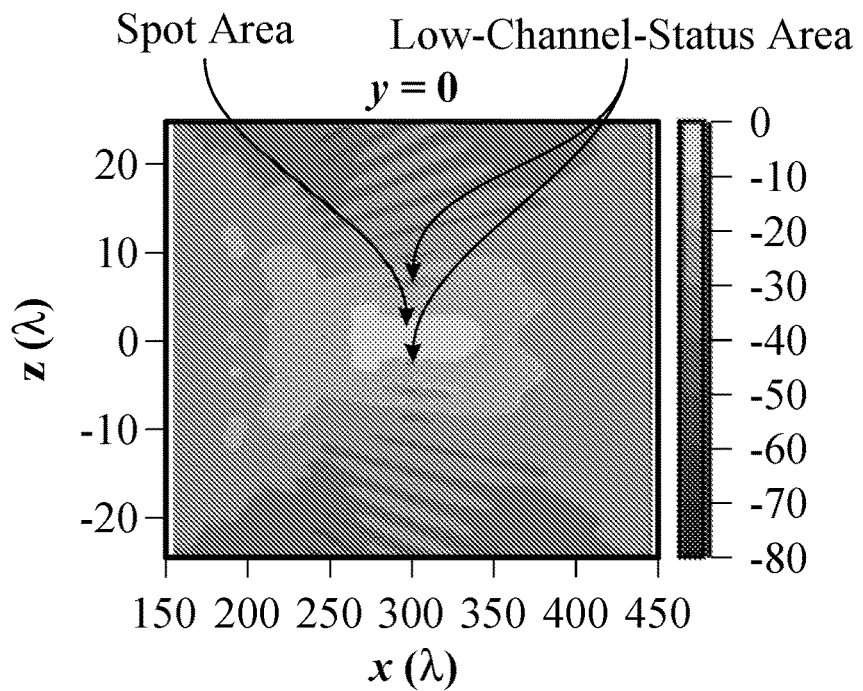
UE @ (3m, 0, 0) in Reactive Near Field
FIG. 32

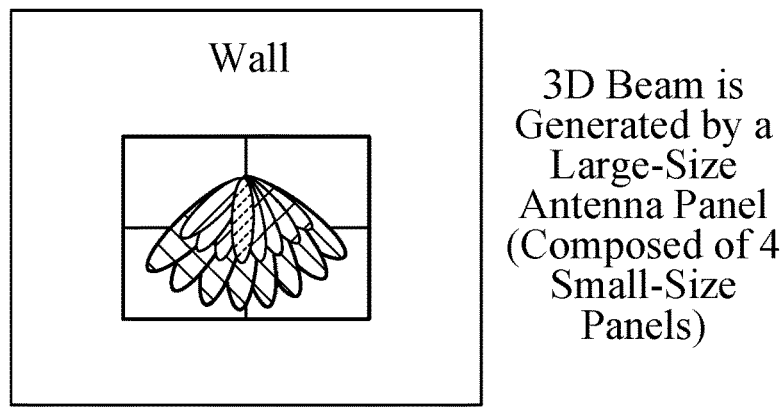
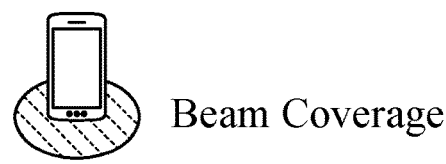
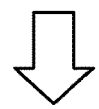
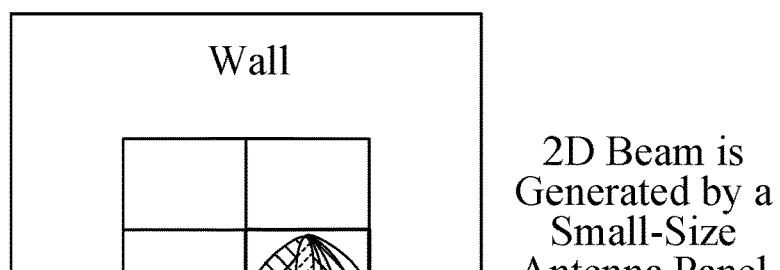
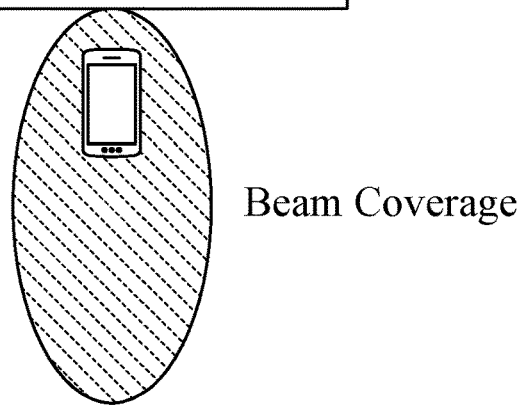
FIG. 36

BEAM DETERMINATION IN HOLOGRAPHIC MIMO SYSTEM

CROSS-REFERENCE TO RELATED APPLICATION(S)

This application is a national stage application under 35 U.S.C. 371 of PCT/CN2021/083245, filed Mar. 26, 2021, which is hereby expressly incorporated by reference herein in its entirety as if fully set forth below and for all applicable purposes.

BACKGROUND

Field of the Disclosure

Aspects of the present disclosure relate to wireless communications in holographic multiple input multiple output (MIMO) systems.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd generation partnership project (3GPP) long term evolution (LTE) systems, LTE advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., $5^{th}$ generation (5G) NR) is an example of an emerging telecommunication standard. The NR is a set of enhancements to the LTE mobile standard promulgated by the 3GPP. The NR is designed to better support mobile broadband Internet access by improving spectral efficiency, lowering costs, improving services, making use of new spectrum, and better integrating with other open standards using OFDMA with a cyclic prefix (CP) on a downlink (DL) and on an uplink (UL). To these ends, the NR supports beamforming, multiple input multiple output (MIMO) antenna technology, and carrier aggregation.

However, as the demand for mobile broadband access continues to increase, there exists a need for further improvements in the NR and the LTE technology. These improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved and desirable techniques for beam determination, multi-user transmission, and channel state variance information (CSVI) reporting in a holographic multiple input multiple output (MIMO) system.

Certain aspects provide a method for wireless communication performed by a user equipment (UE). The method generally includes receiving a configuration for reporting subarray grouping information (SGI); monitoring for first beam swept transmissions sent from multiple subarrays of a holographic MIMO antenna panel of a network entity; and transmitting the SGI to the network entity, in accordance with the configuration, where the SGI indicates one or more subarray groups determined based on the first beam swept transmissions.

Certain aspects provide a method for wireless communication performed by a network entity. The method generally includes sending, to a UE, a configuration for reporting SGI; sending first beam swept transmissions from multiple subarrays of a holographic MIMO antenna panel of the network entity; and receiving the SGI from the UE, where the SGI indicates one or more subarray groups determined based on the first beam swept transmissions.

Certain aspects provide an apparatus for wireless communications. The apparatus generally includes a processor configured to: receive a configuration for reporting SGI; monitor for first beam swept transmissions sent from multiple subarrays of a holographic MIMO antenna panel of a network entity; and transmit the SGI to the network entity, in accordance with the configuration, where the SGI indicates one or more subarray groups determined based on the first beam swept transmissions.

Certain aspects provide an apparatus for wireless communications. The apparatus generally includes a processor configured to: send, to a UE, a configuration for reporting SGI; send first beam swept transmissions from multiple subarrays of a holographic MIMO antenna panel of the network entity; and receive the SGI from the UE, where the SGI indicates one or more subarray groups determined based on the first beam swept transmissions.

Certain aspects provide an apparatus for wireless communications. The apparatus generally includes means for receiving a configuration for reporting SGI; means for monitoring for first beam swept transmissions sent from multiple subarrays of a holographic MIMO antenna panel of a network entity; and means for transmitting the SGI to the network entity, in accordance with the configuration, where the SGI indicates one or more subarray groups determined based on the first beam swept transmissions.

Certain aspects provide an apparatus for wireless communications. The apparatus generally includes means for sending, to a UE, a configuration for reporting SGI; means for sending first beam swept transmissions from multiple subarrays of a holographic MIMO antenna panel of the network entity; and means for receiving the SGI from the UE, where the SGI indicates one or more subarray groups determined based on the first beam swept transmissions.

Certain aspects provide a computer-readable medium for wireless communications. The computer-readable medium includes instructions that, when executed by a processing system, cause the processing system to perform operations generally including receiving a configuration for reporting SGI; monitoring for first beam swept transmissions sent from multiple subarrays of a holographic MIMO antenna panel of a network entity; and transmitting the SGI to the network entity, in accordance with the configuration, where the SGI indicates one or more subarray groups determined based on the first beam swept transmissions.

Certain aspects provide a computer-readable medium for wireless communications. The computer-readable medium includes instructions that, when executed by a processing system, cause the processing system to perform operations generally including sending, to a UE, a configuration for reporting SGI; sending first beam swept transmissions from multiple subarrays of a holographic MIMO antenna panel of the network entity; and receiving the SGI from the UE, where the SGI indicates one or more subarray groups determined based on the first beam swept transmissions.

Certain aspects provide a method for wireless communication performed by a UE. The method generally includes monitoring for first beam swept transmissions sent from multiple subarrays of a holographic MIMO antenna panel of a network entity; transmitting a first report to the network entity indicating channel gains for one or more of the subarrays calculated based on the first beam swept transmissions; and receiving subarray partition information (SPI) from the network entity indicating one or more subarrays allocated to the UE based on the reported channel gains.

Certain aspects provide a method for wireless communication performed by a network entity. The method generally includes sending, to a UE, first beam swept transmissions from multiple subarrays of a holographic MIMO antenna panel of the network entity; receiving, from the UE, a first report indicating channel gains for one or more of the subarrays calculated based on the first beam swept transmissions; and sending SPI to the UE indicating one or more subarrays allocated to the UE based on the reported channel gains.

Certain aspects provide an apparatus for wireless communications. The apparatus generally includes a processor configured to: monitor for first beam swept transmissions sent from multiple subarrays of a holographic MIMO antenna panel of a network entity; transmit a first report to the network entity indicating channel gains for one or more of the subarrays calculated based on the first beam swept transmissions; and receive SPI from the network entity indicating one or more subarrays allocated to the UE based on the reported channel gains.

Certain aspects provide an apparatus for wireless communications. The apparatus generally includes a processor configured to: send, to a UE, first beam swept transmissions from multiple subarrays of a holographic MIMO antenna panel of the network entity; receive, from the UE, a first report indicating channel gains for one or more of the subarrays calculated based on the first beam swept transmissions; and send SPI to the UE indicating one or more subarrays allocated to the UE based on the reported channel gains.

Certain aspects provide an apparatus for wireless communications. The apparatus generally includes means for monitoring for first beam swept transmissions sent from multiple subarrays of a holographic MIMO antenna panel of a network entity; means for transmitting a first report to the network entity indicating channel gains for one or more of the subarrays calculated based on the first beam swept transmissions; and means for receiving SPI from the network entity indicating one or more subarrays allocated to the UE based on the reported channel gains.

Certain aspects provide an apparatus for wireless communications. The apparatus generally includes means for sending, to a UE, first beam swept transmissions from multiple subarrays of a holographic MIMO antenna panel of the network entity; means for receiving, from the UE, a first report indicating channel gains for one or more of the subarrays calculated based on the first beam swept transmissions; and means for sending SPI to the UE indicating one or more subarrays allocated to the UE based on the reported channel gains.

Certain aspects provide a computer-readable medium for wireless communications. The computer-readable medium includes instructions that, when executed by a processing system, cause the processing system to perform operations generally including monitoring for first beam swept transmissions sent from multiple subarrays of a holographic MIMO antenna panel of a network entity; transmitting a first report to the network entity indicating channel gains for one or more of the subarrays calculated based on the first beam swept transmissions; and receiving SPI from the network entity indicating one or more subarrays allocated to the UE based on the reported channel gains.

Certain aspects provide a computer-readable medium for wireless communications. The computer-readable medium includes instructions that, when executed by a processing system, cause the processing system to perform operations generally including sending, to a UE, first beam swept transmissions from multiple subarrays of a holographic MIMO antenna panel of the network entity; receiving, from the UE, a first report indicating channel gains for one or more of the subarrays calculated based on the first beam swept transmissions; and sending SPI to the UE indicating one or more subarrays allocated to the UE based on the reported channel gains.

Certain aspects provide a method for wireless communication performed by a UE. The method generally includes receiving, from a network entity, a configuration for reporting CSVI; monitoring for one or more transmissions sent from a holographic MIMO antenna panel of the network entity; and transmitting a report including the CSVI to the network entity, in accordance with the configuration, where the CSVI indicates a variance relative to one or more CSI metrics.

Certain aspects provide a method for wireless communication performed by a network entity. The method generally includes sending a UE a configuration for reporting CSVI; sending one or more transmissions to the UE from a holographic MIMO antenna panel of the network entity; and receiving, from the UE, a report including the CSVI to the network entity, in accordance with the configuration, where the CSVI indicates a variance relative to one or more CSI metrics.

Certain aspects provide an apparatus for wireless communications. The apparatus generally includes a processor configured to: receive, from a network entity, a configuration for reporting CSVI; monitor for one or more transmissions sent from a holographic MIMO antenna panel of the network entity; and transmit a report including the CSVI to the network entity, in accordance with the configuration, where the CSVI indicates a variance relative to one or more CSI metrics.

Certain aspects provide an apparatus for wireless communications. The apparatus generally includes a processor configured to: send a UE a configuration for reporting CSVI; send one or more transmissions to the UE from a holographic MIMO antenna panel of the network entity; and receive, from the UE, a report including the CSVI to the network entity, in accordance with the configuration, where the CSVI indicates a variance relative to one or more CSI metrics.

Certain aspects provide an apparatus for wireless communications. The apparatus generally includes means for receiving, from a network entity, a configuration for reporting CSVI; means for monitoring for one or more transmissions sent from a holographic MIMO antenna panel of the network entity; and means for transmitting a report including the CSVI to the network entity, in accordance with the configuration, where the CSVI indicates a variance relative to one or more CSI metrics.

Certain aspects provide an apparatus for wireless communications. The apparatus generally includes means for sending a UE a configuration for reporting CSVI; means for sending one or more transmissions to the UE from a holographic MIMO antenna panel of the network entity; and means for receiving, from the UE, a report including the CSVI to the network entity, in accordance with the configuration, where the CSVI indicates a variance relative to one or more CSI metrics.

Certain aspects provide a computer-readable medium for wireless communications. The computer-readable medium includes instructions that, when executed by a processing system, cause the processing system to perform operations generally including receiving, from a network entity, a configuration for reporting CSVI; monitoring for one or more transmissions sent from a holographic MIMO antenna panel of the network entity; and transmitting a report including the CSVI to the network entity, in accordance with the configuration, where the CSVI indicates a variance relative to one or more CSI metrics.

Certain aspects provide a computer-readable medium for wireless communications. The computer-readable medium includes instructions that, when executed by a processing system, cause the processing system to perform operations generally including sending a UE a configuration for reporting CSVI; sending one or more transmissions to the UE from a holographic MIMO antenna panel of the network entity; and receiving, from the UE, a report including the CSVI to the network entity, in accordance with the configuration, where the CSVI indicates a variance relative to one or more CSI metrics.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

FIGS. 6A and 6B illustrate examples of SSB patterns for different subcarrier spacings (SCSs), in accordance with certain aspects of the present disclosure.

FIG. 17 illustrates example subarray groups, in accordance with certain aspects of the present disclosure.

FIG. 28B illustrates example reference signal receive power (RSRP) values of subarrays, in accordance with certain aspects of the present disclosure.

FIG. 29B illustrates example subarray partitioning result for multiple UEs, in accordance with certain aspects of the present disclosure.

FIG. 30A illustrates example subarray partition information (SPI) indicating UE indexes representing a position in an identification (ID) sequence, in accordance with certain aspects of the present disclosure.

FIG. 30B illustrates example SPI indicating that one subarray list is given to each UE, in accordance with certain aspects of the present disclosure.

FIG. 32 illustrates an example channel state report indicating a channel gain fluctuation in a near field, in accordance with certain aspects of the present disclosure.

FIG. 36 illustrates example beam management to change from 3D beam to 2D beam based on a CSVI report, in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
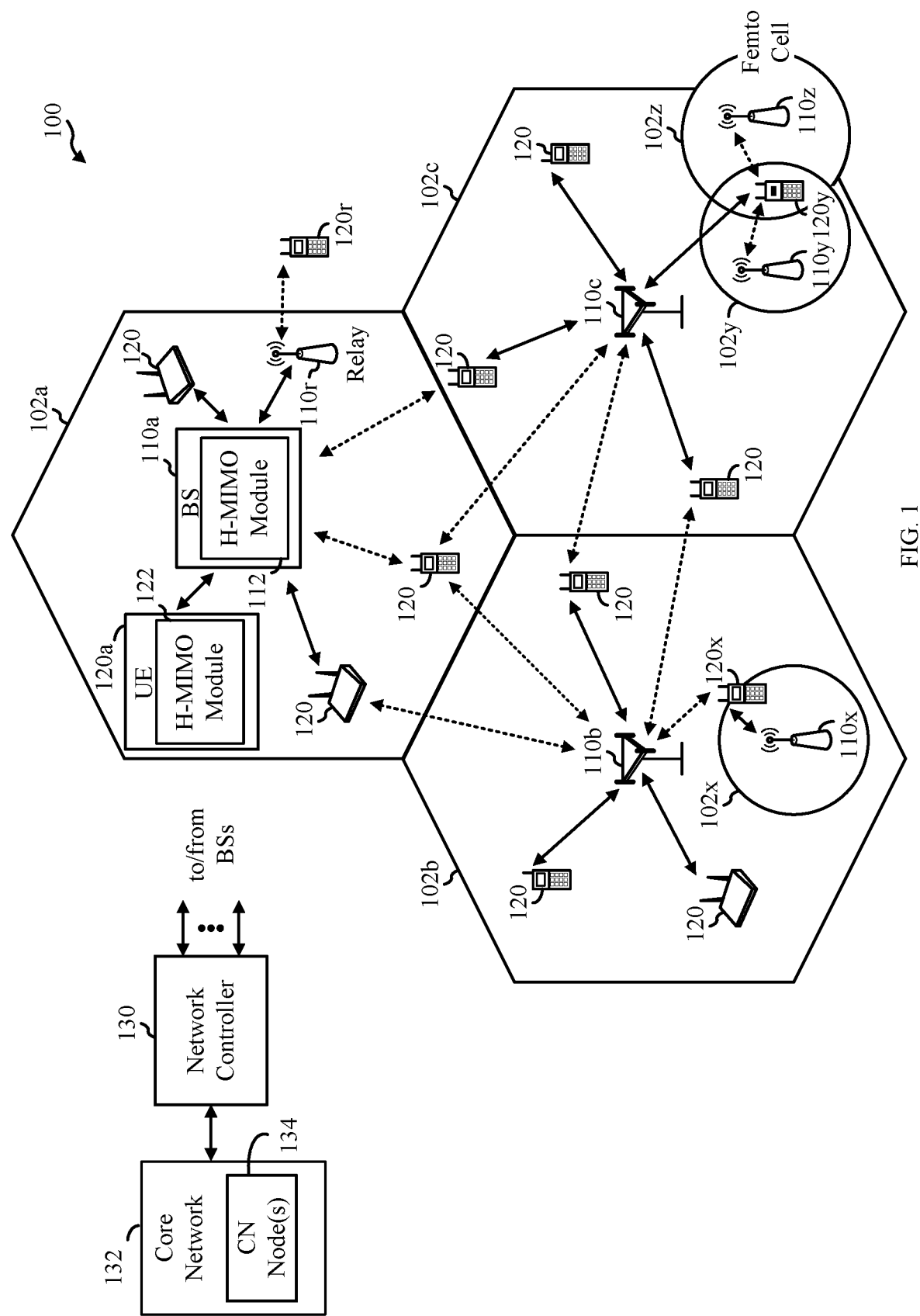
FIG. 1 is a block diagram conceptually illustrating an example wireless communication network, in accordance with certain aspects of the present disclosure.

Aspects of the present disclosure provide apparatus, methods, processing systems, and computer readable mediums for performing various functions in a holographic multiple input multiple output (MIMO) system, such as beam determination, multi-user transmission, and channel state variance information (CSVI) reporting.

While the following description provides examples of beam determination techniques, multi-user transmission techniques, and CSVI reporting techniques in a holographic MIMO in wireless communication systems, changes may be made in the function and arrangement of elements discussed without departing from the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies. While aspects may be described herein using terminology commonly associated with 3$^{rd}$ generation (3G), 4G, and/or new radio (e.g., 5G new radio (NR)) wireless technologies, aspects of the present disclosure can be applied in other generation-based communication systems.

NR access may support various wireless communication services, such as enhanced mobile broadband (eMBB) targeting wide bandwidth, millimeter wave mmW, massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from an extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

NR supports beamforming and beam direction may be dynamically configured. Multiple input multiple output (MIMO) transmissions with precoding may also be supported. MIMO configurations in a downlink (DL) may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

Example Wireless Communications System

FIG. 1 illustrates an example wireless communication network 100, in which aspects of the present disclosure may be performed. For example, the wireless communication network 100 may include one or more base stations (BSs) 110 and/or one or more user equipments (UEs) 120 configured to execute beam determination techniques, multi-user transmission techniques, and/or channel state variance information (CSVI) reporting techniques in a holographic multiple input multiple output (MIMO) system.

Figure 13:
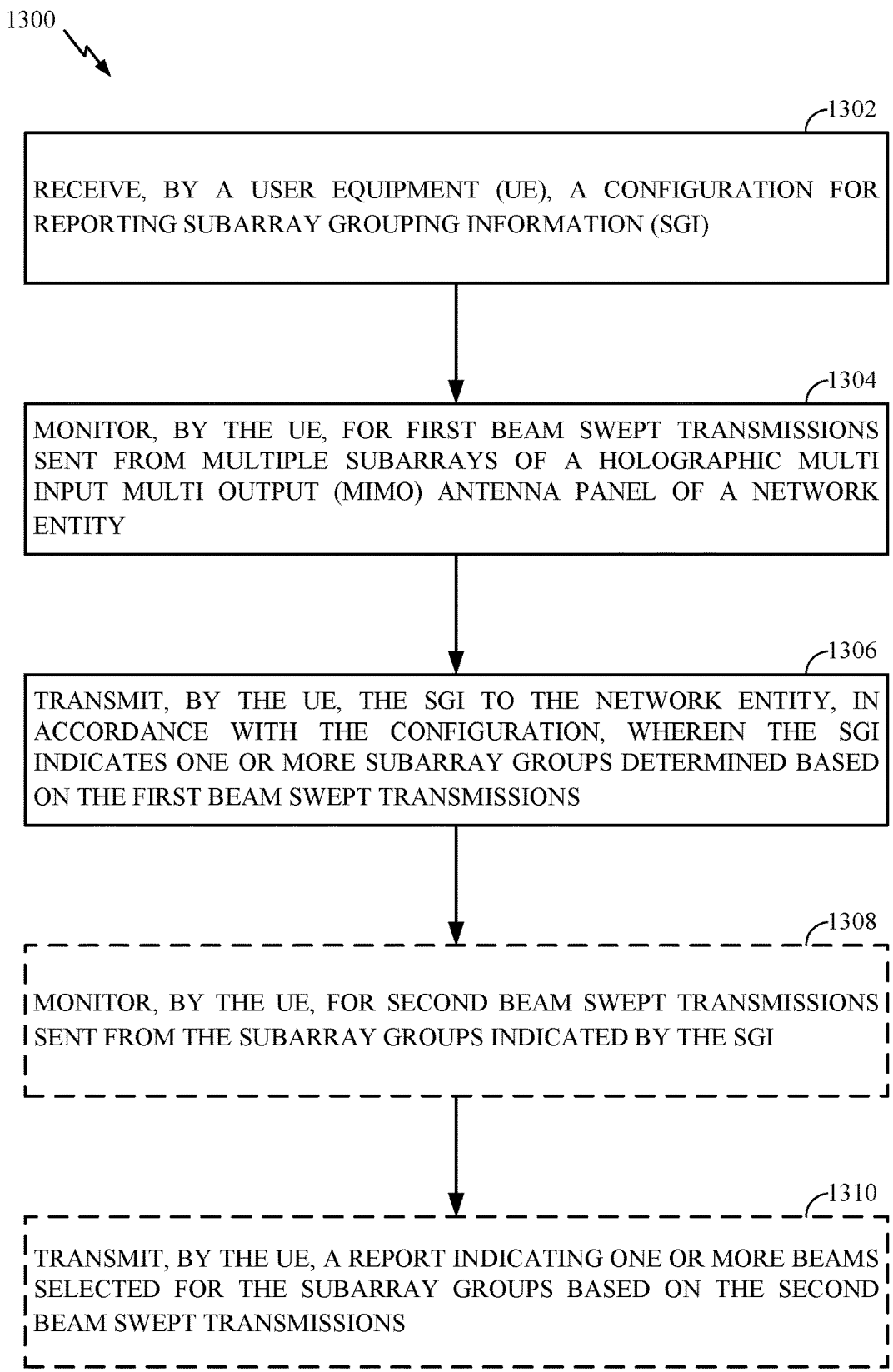
FIG. 13 is a flow diagram illustrating example beam determination operations for wireless communication by a UE, in accordance with certain aspects of the present disclosure.
Figure 24:
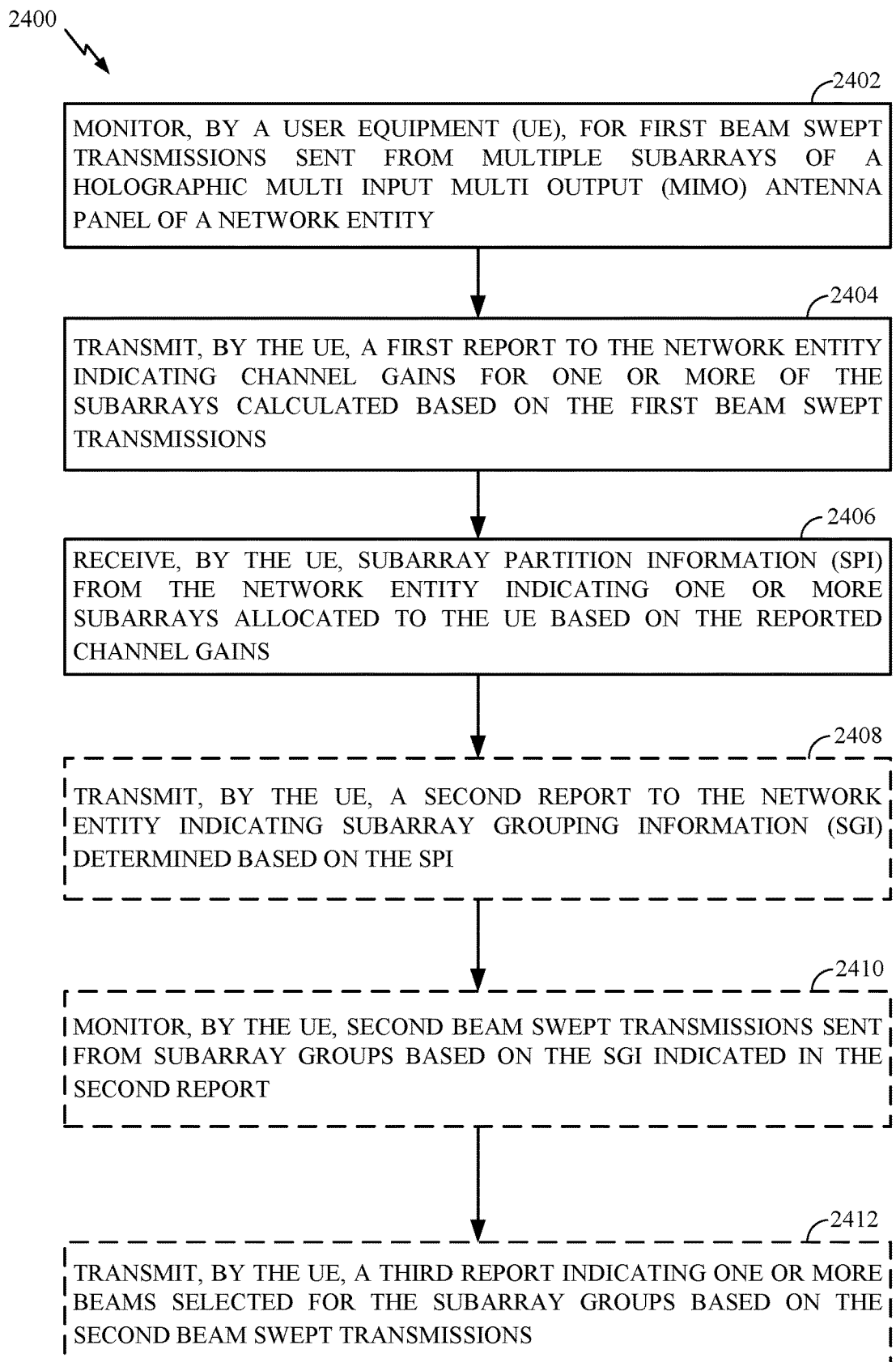
FIG. 24 is a flow diagram illustrating example multi-user transmission operations for wireless communication by a UE, in accordance with certain aspects of the present disclosure.
Figure 33:
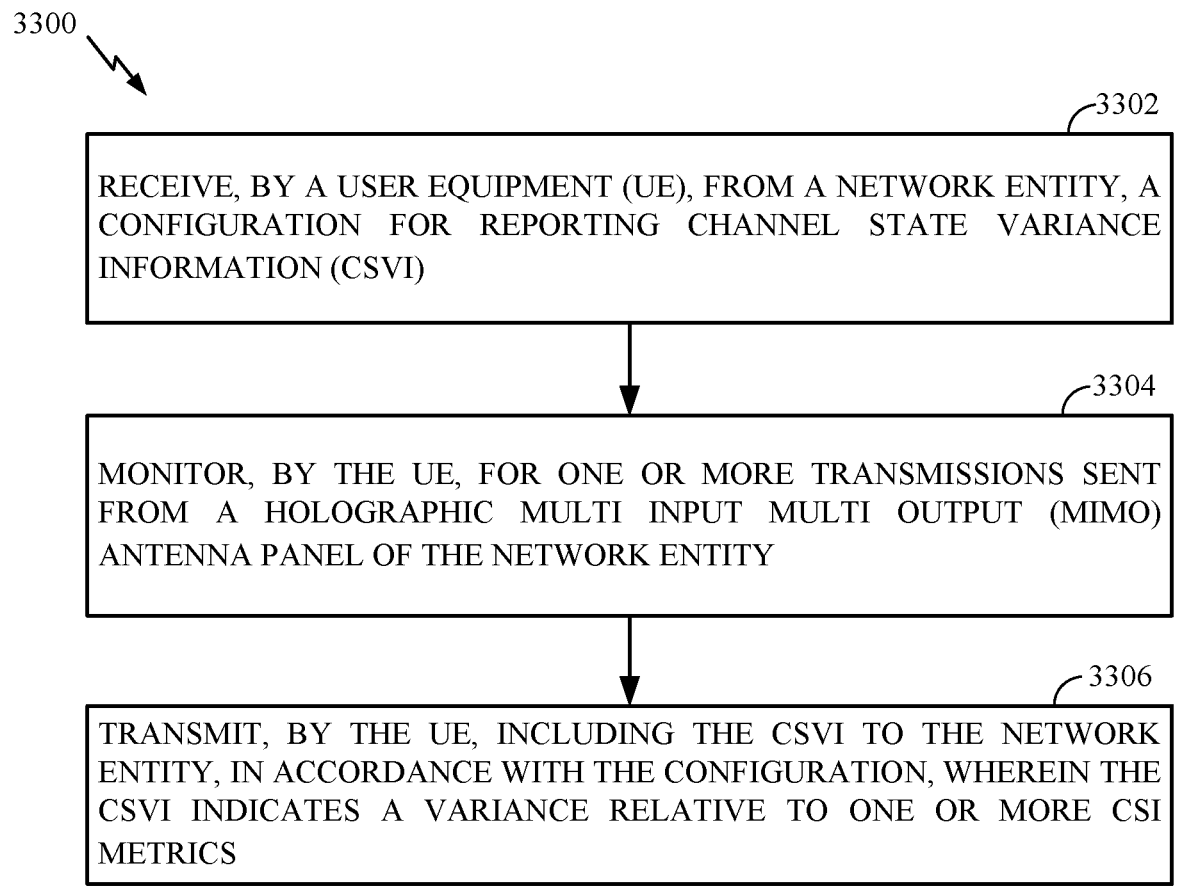
FIG. 33 is a flow diagram illustrating example channel state variance information (CSVI) reporting operations for wireless communication by a UE, in accordance with certain aspects of the present disclosure.

As shown in FIG. 1, a UE 120a includes an H-MIMO manager 122 that may be configured to perform operations 1300 of FIG. 13, 2400 of FIG. 24, and/or 3300 of FIG. 33. In one example, the H-MIMO manager 122 may operate as a beam determination manager to perform operations 1300 of FIG. 13. In another example, the H-MIMO manager 122 may operate as a multi-user transmission manager to perform operations 2400 of FIG. 24. In another example, the H-MIMO manager 122 may operate as a CSVI reporting manager to perform operations 3300 of FIG. 33.

Figure 14:
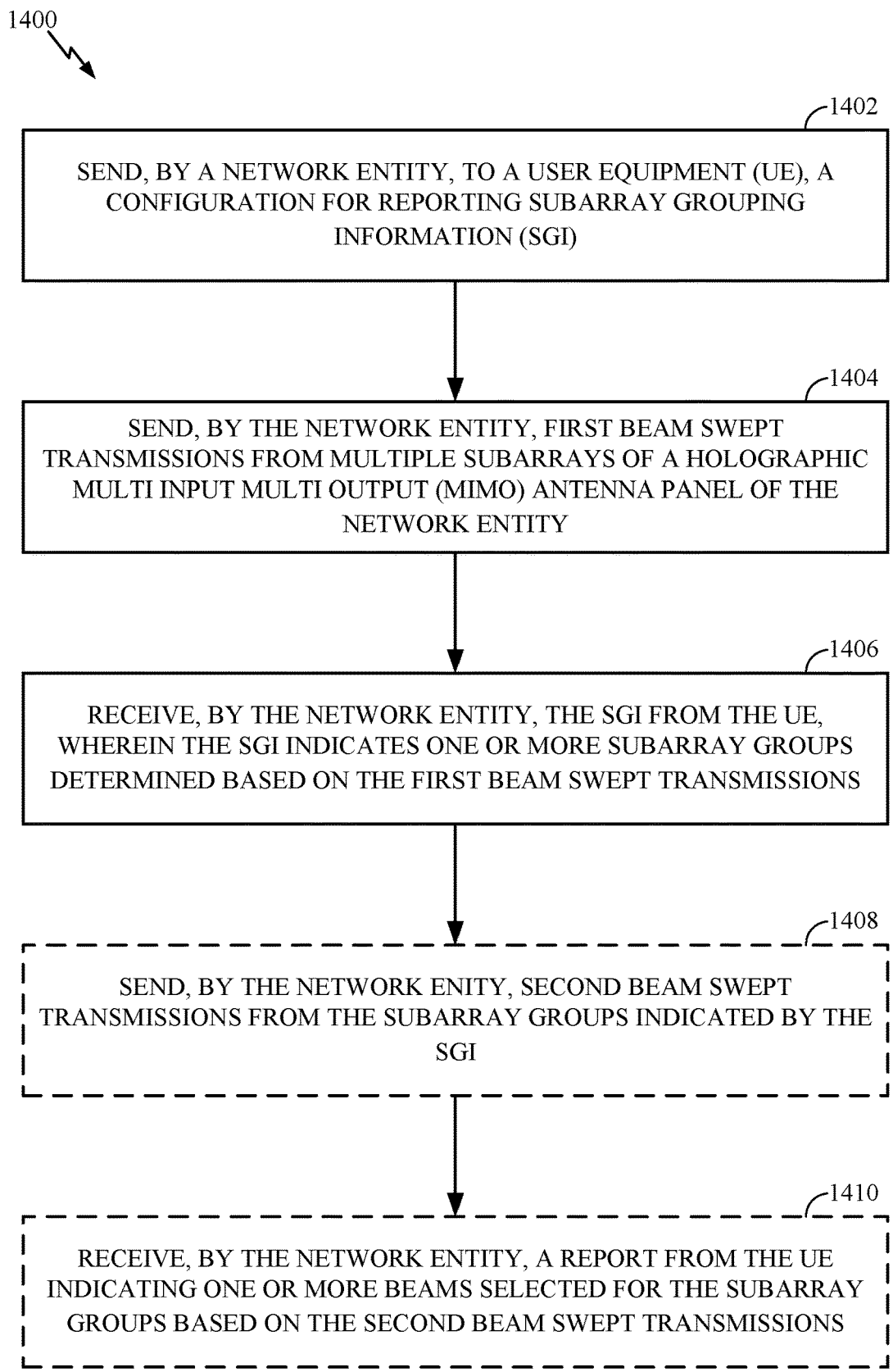
FIG. 14 is a flow diagram illustrating example beam determination operations for wireless communication by a network entity, in accordance with certain aspects of the present disclosure.
Figure 25:
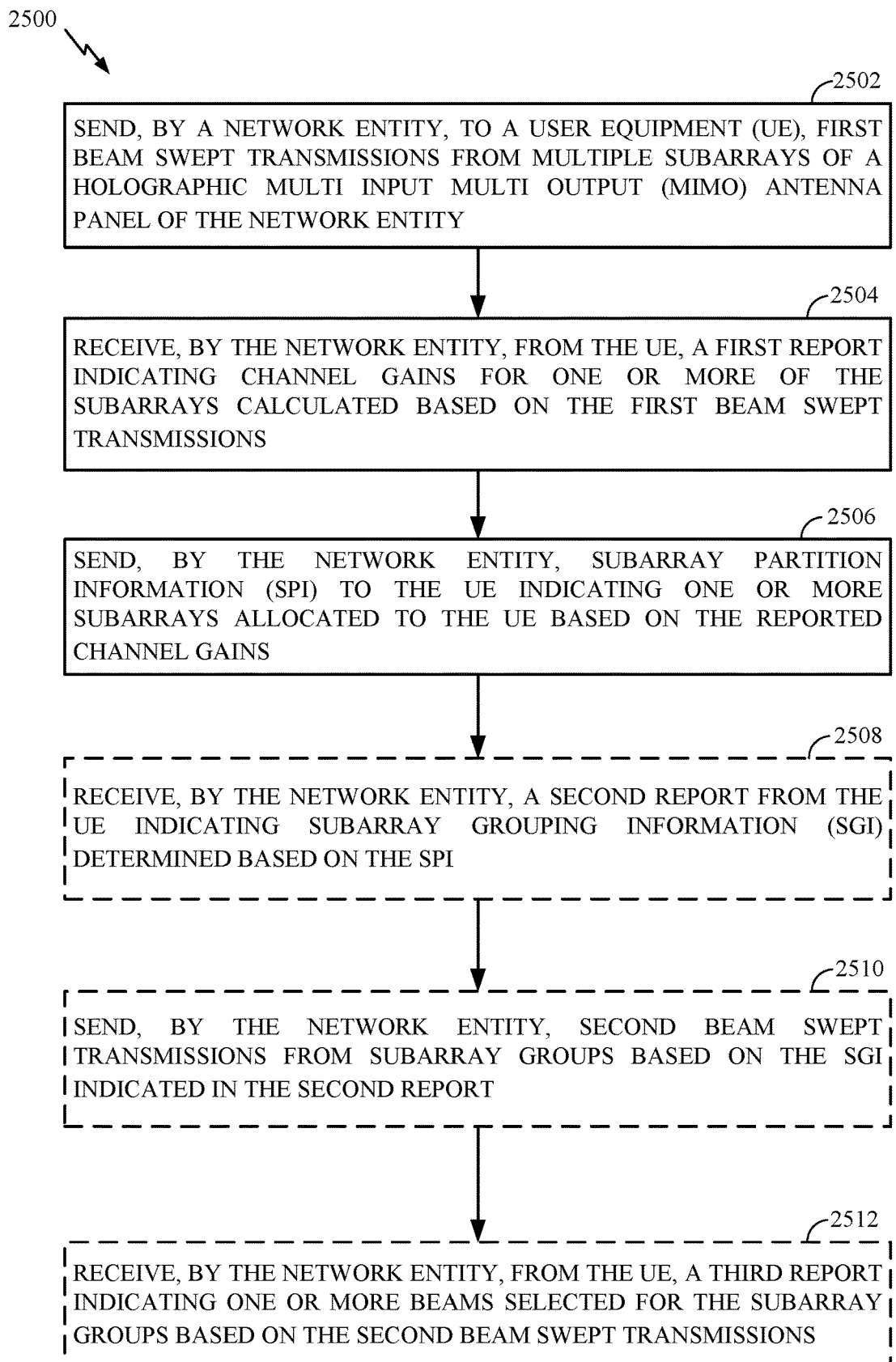
FIG. 25 is a flow diagram illustrating example multi-user transmission operations for wireless communication by a network entity, in accordance with certain aspects of the present disclosure.
Figure 34:
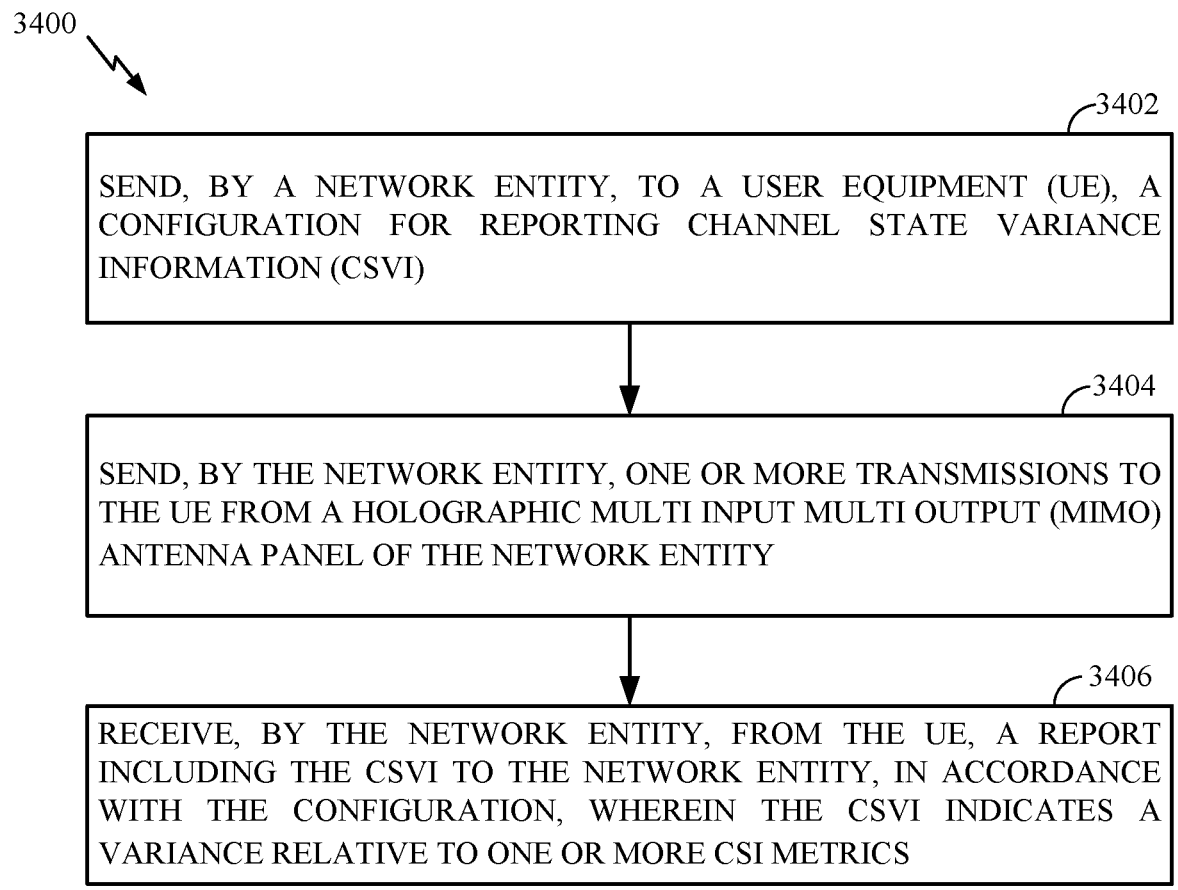
FIG. 34 is a flow diagram illustrating example CSVI reporting operations for wireless communication by a network entity, in accordance with certain aspects of the present disclosure.

As shown in FIG. 1, a BS 110a includes an H-MIMO manager 112 that may be configured to perform operations 1400 of FIG. 14, 2500 of FIG. 25, and/or 3400 of FIG. 34. In one example, the H-MIMO manager 112 may operate as a beam determination manager to perform operations 1400 of FIG. 14. In another example, the H-MIMO manager 112 may operate as a multi-user transmission manager to perform operations 2500 of FIG. 25. In another example, the H-MIMO manager 112 may operate as a CSVI reporting manager to perform operations 3400 of FIG. 34.

The wireless communication network 100 may be a new radio (NR) system (e.g., a 5$^{th}$ generation (5G) NR network). As shown in FIG. 1, the wireless communication network 100 may be in communication with a core network 132. The core network 132 may in communication with one or more BSs 110a-z (each also individually referred to herein as a BS 110 or collectively as BSs 110) and/or UEs 120a-y (each also individually referred to herein as a UE 120 or collectively as UEs 120) in the wireless communication network 100 via one or more interfaces.

The BS 110 may provide communication coverage for a particular geographic area, sometimes referred to as a "cell", which may be stationary or may move according to the location of a mobile BS 110. In some examples, multiple BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. The BS 110 may support one or multiple cells.

The BSs 110 communicate with the UEs 120 in the wireless communication network 100. The UEs 120 (e.g., 120x, 120y, etc.) may be dispersed throughout the wireless communication network 100, and each UE 120 may be stationary or mobile. The wireless communication network 100 may also include relay stations (e.g., a relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between the UEs 120, to facilitate communication between wireless devices.

A network controller 130 may be in communication with a set of BSs 110 and provide coordination and control for these BSs 110 (e.g., via a backhaul). In aspects, the network controller 130 may be in communication with the core network 132 (e.g., a 5G core network (5GC)), which provides various network functions such as access and mobility management, session management, user plane function, policy control function, authentication server function, unified data management, application function, network exposure function, network repository function, network slice selection function, etc.

Figure 2:
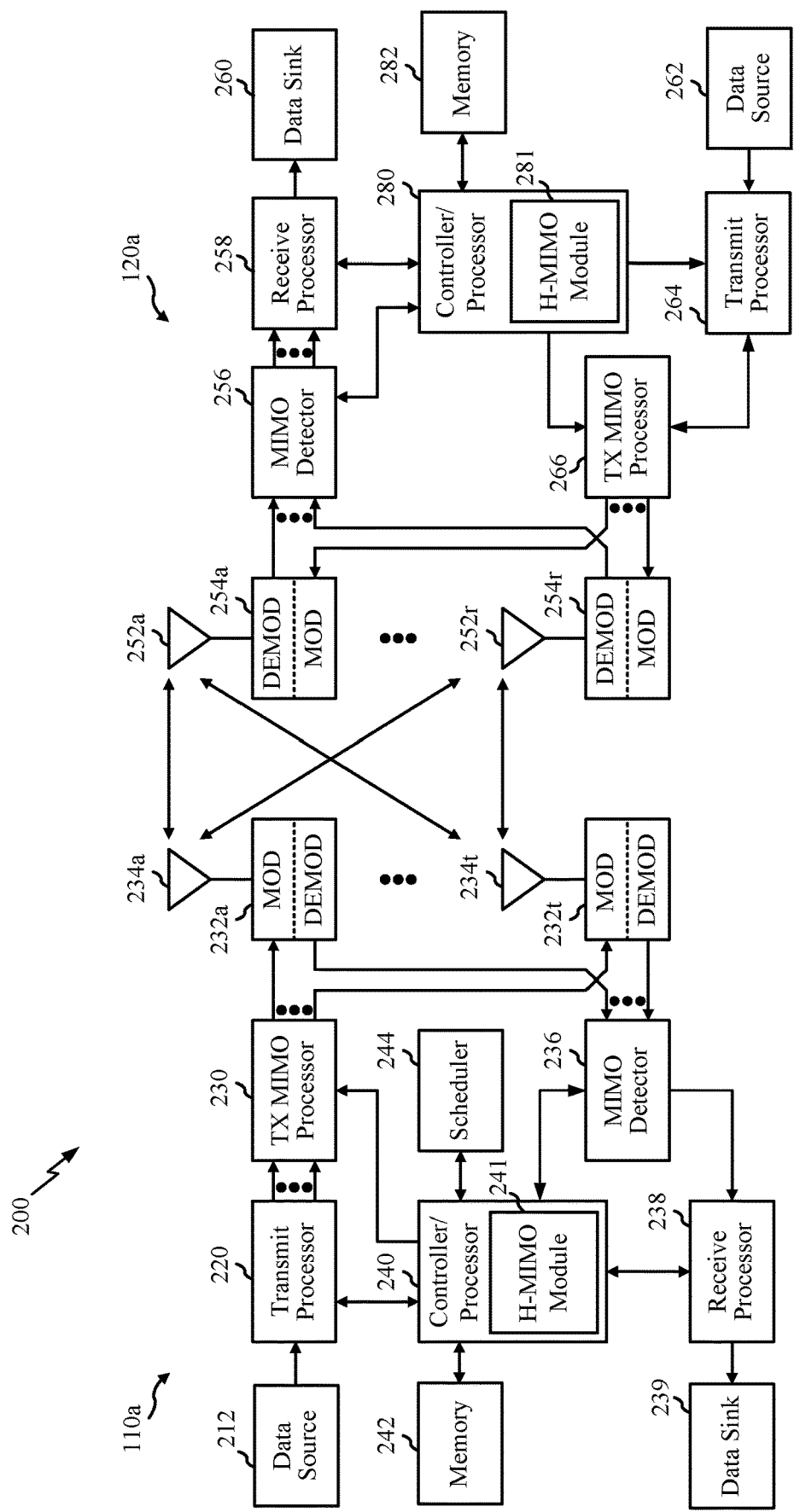
FIG. 2 is a block diagram conceptually illustrating a design of an example base station (BS) and a user equipment (UE), in accordance with certain aspects of the present disclosure.

FIG. 2 illustrates example components of a BS 110a and a UE 120a (e.g., in the wireless communication network 100 of FIG. 1).

At the BS 110a, a transmit processor 220 may receive data from a data source 212 and control information from a controller/processor 240. The control information may be for a physical broadcast channel (PBCH), a physical control format indicator channel (PCFICH), a physical hybrid ARQ (automatic repeat request) indicator channel (PHICH), a physical downlink control channel (PDCCH), a group common PDCCH (GC PDCCH), etc. The data may be for a physical downlink shared channel (PDSCH), etc. A medium access control-control element (MAC-CE) is a MAC layer communication structure that may be used for control command exchange between wireless nodes. The MAC-CE may be carried in a shared channel such as a PDSCH, a physical uplink shared channel (PUSCH), or a physical sidelink shared channel (PSSCH).

The transmit processor 220 may process (e.g., encode and symbol map) the data and control information to obtain data symbols and control symbols, respectively. The transmit processor 220 may also generate reference symbols, such as for a primary synchronization signal (PSS), a secondary synchronization signal (SSS), and a channel state information reference signal (CSI-RS). A transmit multiple-input multiple-output (MIMO) processor 230 may perform spatial processing (e.g., precoding) on data symbols, control symbols, and/or reference symbols, if applicable, and may provide output symbol streams to modulators (MODs) in transceivers 232a-232t. Each MOD in transceivers 232a-232t may process a respective output symbol stream (e.g., for orthogonal frequency division multiplexing (OFDM), etc.) to obtain an output sample stream. Each MOD in transceivers 232a-232t may further process (e.g., convert to analog, amplify, filter, and upconvert) the output sample stream to obtain a downlink (DL) signal. The DL signals from the MODs in transceivers 232a-232t may be transmitted via antennas 234a-234t, respectively.

At the UE 120a, antennas 252a-252r may receive DL signals from the BS 110a and may provide received signals to demodulators (DEMODs) in transceivers 254a-254r, respectively. Each DEMOD in the transceiver 254 may condition (e.g., filter, amplify, downconvert, and digitize) a respective received signal to obtain input samples. Each DEMOD in the transceiver 254 may further process the input samples (e.g., for OFDM, etc.) to obtain received symbols. A MIMO detector 256 may obtain received symbols from all the DEMODs in the transceivers 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On an uplink (UL), at the UE 120a, a transmit processor 264 may receive and process data (e.g., for a PUSCH) from a data source 262 and control information (e.g., for a physical uplink control channel (PUCCH) from the controller/processor 280. The transmit processor 264 may also generate reference symbols for a reference signal (e.g., for a sounding reference signal (SRS)). The symbols from the transmit processor 264 may be precoded by a transmit MIMO processor 266 if applicable, further processed by the MODs in transceivers 254a-254r (e.g., for SC-FDM, etc.), and transmitted to the BS 110a. At the BS 110a, the UL signals from the UE 120a may be received by the antennas 234, processed by the DEMODs in transceivers 232, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

Memories 242 and 282 may store data and program codes for the BS 110a and the UE 120a, respectively. A scheduler 244 may schedule the UE 120a for data transmission on a DL and/or an UL.

Antennas 252, processors 266, 258, 264, and/or controller/processor 280 of the UE 120a and/or antennas 234, processors 220, 230, 238, and/or controller/processor 240 of the BS 110a may be used to perform the various techniques and methods described herein for beam determination, multi-user transmission, and CSVI reporting in a holographic MIMO system. For example, as shown in FIG. 2, the controller/processor 240 of the BS 110a has an H-MIMO manager 241 that may be configured to perform the operations 1400 of FIG. 14, 2500 of FIG. 25, and/or 3400 of FIG. 34. As shown in FIG. 2, the controller/processor 280 of the UE 120a has an H-MIMO manager 281 that may be configured to perform the operations 1300 of FIG. 13, 2400 of FIG. 24, and/or 3300 of FIG. 33. Although shown at the controller/processor, other components of the UE 120a and the BS 110a may be used to perform the operations described herein.

NR may utilize OFDM with a cyclic prefix (CP) on the UL and the DL. The NR may support half-duplex operation using time division duplexing (TDD). The OFDM and single-carrier frequency division multiplexing (SC-FDM) partition system bandwidth into multiple orthogonal subcarriers, which are also commonly referred to as tones, bins, etc. Each subcarrier may be modulated with data. Modulation symbols may be sent in a frequency domain with the OFDM and in a time domain with the SC-FDM. The spacing between adjacent subcarriers may be fixed, and a total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. The NR may support a base subcarrier spacing (SCS) of 15 KHz and other SCS may be defined with respect to the base SCS (e.g., 30 kHz, 60 kHz, 120 kHz, 240 kHz, etc.).

Figure 3:
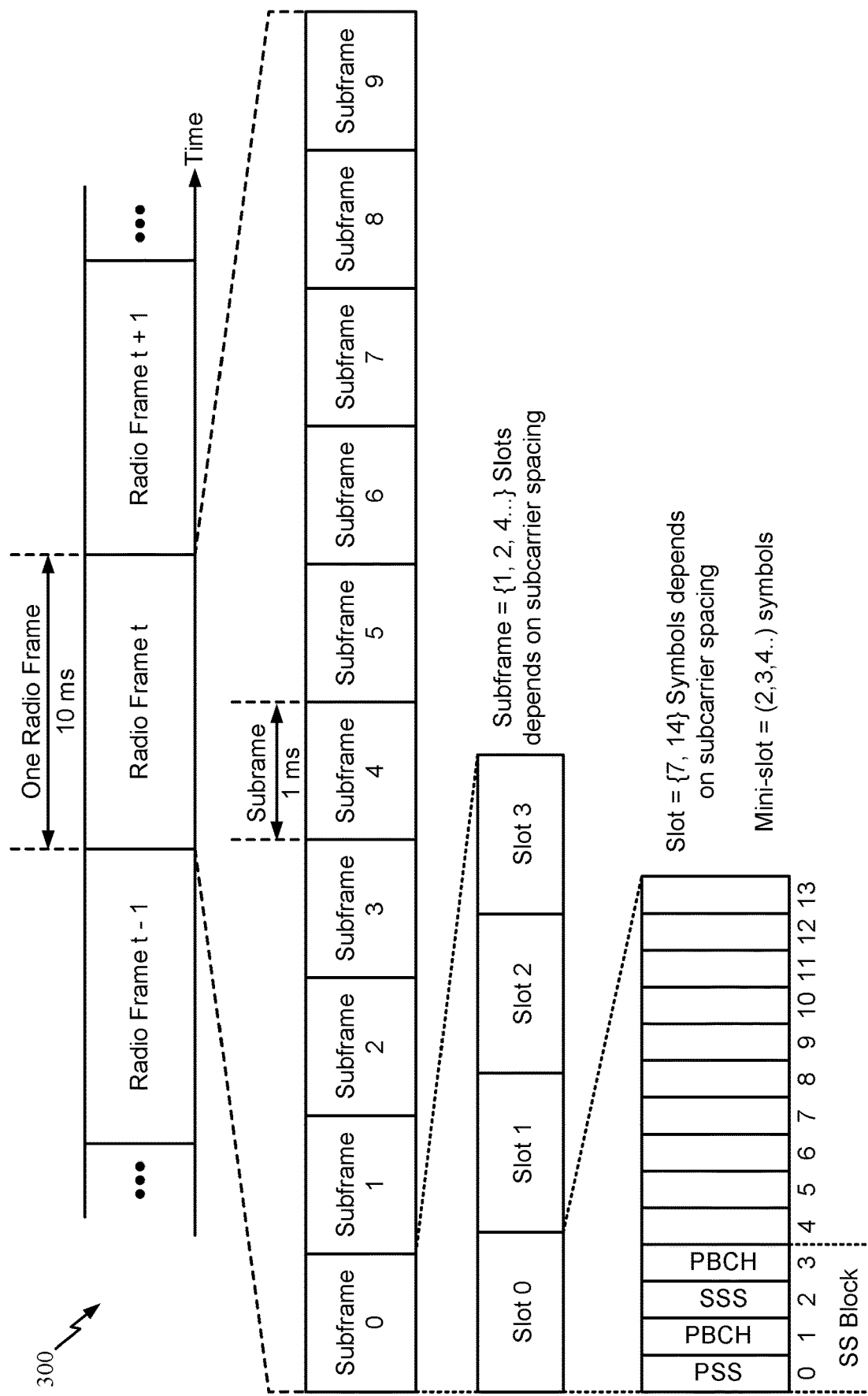
FIG. 3 is an example frame format for certain wireless communication systems (e.g., a new radio (NR)), in accordance with certain aspects of the present disclosure.

FIG. 3 is a diagram showing an example of a frame format 300 for NR. A transmission timeline for each of DL and UL may be partitioned into units of radio frames. Each radio frame may have a predetermined duration (e.g., 10 ms), and may be partitioned into 10 subframes, each of 1 ms, with indices of 0 through 9. Each subframe may include a variable number of slots (e.g., 1, 2, 4, 8, 16, . . . slots) depending on a SCS. Each slot may include a variable number of symbol periods (e.g., 7, 12, or 14 symbols) depending on the SCS. Symbol periods in each slot may be assigned indices. A sub-slot structure may refer to a transmit time interval having a duration less than a slot (e.g., 2, 3, or 4 symbols). Each symbol in a slot may be configured for a link direction (e.g., a DL, an UL, or a flexible) for data transmission, and the link direction for each subframe may be dynamically switched. The link directions may be based on the slot format. Each slot may include DL/UL data as well as DL/UL control information.

In NR, a synchronization signal block (SSB) is transmitted. In certain aspects, SSBs may be transmitted in a burst where each SSB in the burst corresponds to a different beam direction for UE-side beam management (e.g., including beam selection and/or beam refinement). The SSB includes a PSS, a SSS, and a two symbol PBCH. The SSB can be transmitted in a fixed slot location, such as the symbols 0-3 as shown in FIG. 3. The PSS and the SSS may be used by UEs for cell search and acquisition. The PSS may provide half-frame timing, a synchronization signal (SS) may provide a CP length and frame timing. The PSS and the SSS may provide cell identity. The PBCH carries some basic system information, such as DL system bandwidth, timing information within radio frame, SS burst set periodicity, system frame number, etc. The SSBs may be organized into SS bursts to support beam sweeping. Further system information such as, remaining minimum system information (RMSI), system information blocks (SIBs), other system information (OSI) can be transmitted on a PDSCH in certain subframes.

The SSB can be transmitted up to sixty-four times, for example, with up to sixty-four different beam directions for mmWave. The multiple transmissions of the SSB are referred to as a SS burst set. The SSBs in an SS burst set may be transmitted in the same frequency region, while the SSBs in different SS bursts sets can be transmitted at different frequency regions.

Figure 4:
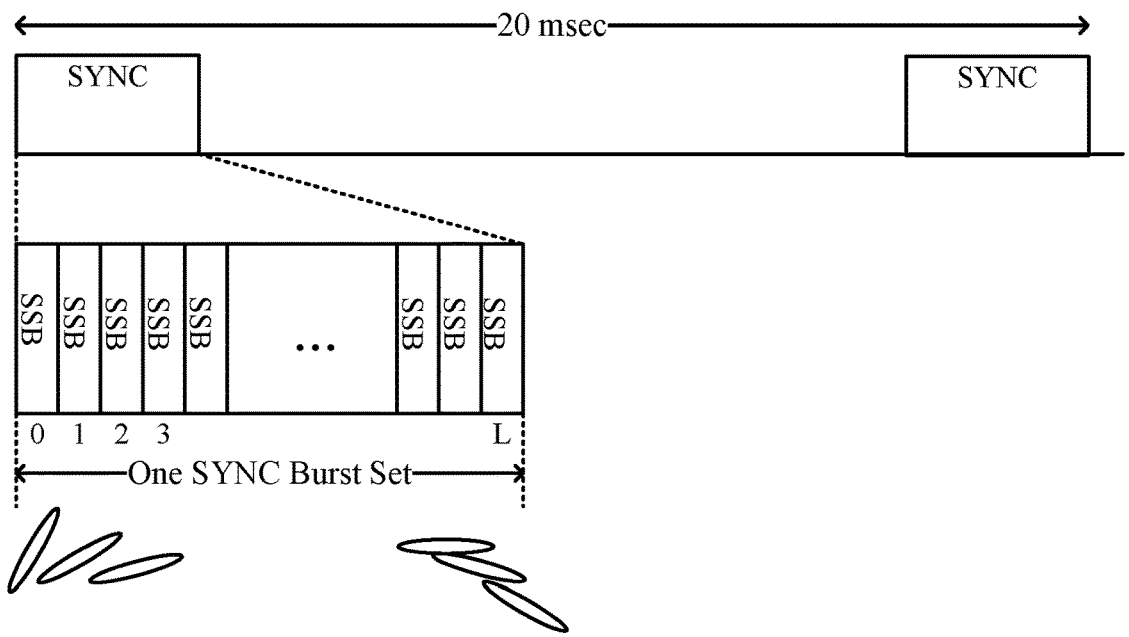
FIG. 4 illustrates how different synchronization signal blocks (SSBs) may be sent using different beams, in accordance with certain aspects of the present disclosure.

As illustrated in FIG. 4, SSBs may be organized into SS burst sets to support beam sweeping. Each SSB within a burst set may be transmitted using a different beam, which may help a UE quickly acquire both transmit (Tx) and receive (Rx) beams (particular for mmW applications). A physical cell identity (PCI) may still be decoded from a PSS and a SSS of the SSB.

Certain deployment scenarios may include one or both NR deployment options. Some may be configured for a non-standalone (NSA) and/or a standalone (SA) option. A standalone cell may need to broadcast both a SSB and a remaining minimum system information (RMSI), for example, with a SIB1 and a SIB2. A non-standalone cell may only need to broadcast the SSB, without broadcasting the RMSI. In a single carrier in NR, multiple SSBs may be sent in different frequencies, and may include the different types of SSBs.

Example Control Resource Sets (CORESETs)

A control resource set (CORESET) for an orthogonal frequency division multiple access (OFDMA) system (e.g., a wireless communications system transmitting a physical downlink control channel (PDCCH) using OFDMA waveforms) may include one or more control resource (e.g., time and frequency resources) sets, configured for conveying the PDCCH, within a system bandwidth (e.g., a specific area on a new radio (NR) downlink (DL) resource grid) and a set of parameters used to carry the PDCCH/downlink control information (DCI). For example, a CORESET may by similar in area to a long term evolution (LTE) PDCCH area (e.g., the first 1,2,3,4 orthogonal frequency division multiplexing (OFDM) symbols in a subframe).

Within each CORESET, one or more search spaces (e.g., a common search space (CSS), a UE-specific search space (USS), etc.) may be defined for a given UE. The search spaces are areas or portions where a communication device (e.g., a user equipment (UE)) may look for control information.

In certain aspects, a CORESET may be a set of time and frequency domain resources, defined in units of resource element groups (REGs). Each REG may include a fixed number (e.g., twelve) tones/subcarriers in one symbol period (e.g., a symbol period of a slot), where one tone in one symbol period is referred to as a resource element (RE). A fixed number of REGs, such as six, may be included in a control channel element (CCE). Sets of CCEs may be used to transmit new radio PDCCHs (NR-PDCCHs), with different numbers of CCEs in the sets used to transmit NR-PDCCHs using differing aggregation levels. Multiple sets of CCEs may be defined as search spaces for UEs, and accordingly a NodeB or other base station (BS) may transmit an NR-PDCCH to a UE by transmitting the NR-PDCCH in a set of CCEs that is defined as a decoding candidate within a search space for the UE. The UE may receive the NR-PDCCH by searching in search spaces for the UE and decoding the NR-PDCCH transmitted by the NodeB.

As noted above, different aggregation levels may be used to transmit sets of CCEs. The aggregation levels may be defined as a number of CCEs that consist of a PDCCH candidate and may include aggregation levels 1, 2, 4, 8, and 18, which may be configured by a radio resource control (RRC) configuration of a search space set (SS-set). A CORESET may be linked with the SS-set within the RRC configuration. For each aggregation level, the number of PDCCH candidates may be RRC configurable.

Operating characteristics of a NodeB or other BS in an NR communications system may be dependent on a frequency range (FR) in which the NR communications system operates. A FR may include one or more operating bands (e.g., "n1" band, "n2" band, "n7" band, and "n41" band), and the NR communications system (e.g., one or more NodeBs and UEs) may operate in one or more operating bands. The FRs and the operating bands are described in more detail in "Base Station (BS) radio transmission and reception" TS38.104 (Release 15), which is available from the 3GPP website.

As described above, a CORESET is a set of time and frequency domain resources. The CORESET can be configured for conveying a PDCCH within a system bandwidth. A UE may determine the CORESET and monitors the CORESET for control channels. During initial access, the UE may identify an initial CORESET (CORESET #0) configuration from a field (e.g., pdcchConfigSIB1) in a maser information block (MIB). This initial CORESET may then be used to configure the UE (e.g., with other CORESETs and/or bandwidth parts via dedicated (UE-specific) signaling. When the UE detects a control channel in the CORESET, the UE attempts to decode the control channel and communicates with the transmitting BS (e.g., the transmitting cell) according to the control data provided in the control channel (e.g., transmitted via the CORESET).

In some cases, CORESET #0 may include different numbers of resource blocks (RBs). For example, in some cases, CORESET #0 may include one of 24, 48, or 96 RBs. For other CORESETSs, a 45-bit bitmap may be used to configure available RB-groups, where each bit in the bitmap is with respect to 6-RBs within a bandwidth part (BWP) and a most significant bit corresponds to the first RB-group in the BWP.

According to aspects of the present disclosure, when a UE is connected to a cell (or a BS), the UE may receive a MIB. The MIB can be in a synchronization signal and physical broadcast channel (SS/PBCH) block (e.g., in the PBCH of the SS/PBCH block) on a synchronization raster (sync raster). In some scenarios, the sync raster may correspond to an SSB. From the frequency of the sync raster, the UE may determine an operating band of the cell. Based on a cell's operation band, the UE may determine a minimum channel bandwidth and a subcarrier spacing (SCS) of the channel. The UE may then determine an index from the MIB (e.g., four bits in the MIB, conveying an index in a range 0-15).

Given this index, the UE may look up or locate a CORESET configuration (this initial CORESET configured via the MIB is generally referred to as CORESET #0). This may be accomplished from one or more tables of CORESET configurations. These configurations (including single table scenarios) may include various subsets of indices indicating valid CORESET configurations for various combinations of minimum channel bandwidth and subcarrier spacing (SCS). In some arrangements, each combination of minimum channel bandwidth and SCS may be mapped to a subset of indices in the table.

Alternatively or additionally, the UE may select a search space CORESET configuration table from several tables of CORESET configurations. These configurations can be based on a minimum channel bandwidth and SCS. The UE may then look up a CORESET configuration (e.g., a Type0-PDCCH search space CORESET configuration) from the selected table, based on the index. After determining the CORESET configuration (e.g., from the single table or the selected table), the UE may then determine the CORESET to be monitored (as mentioned above) based on the location (in time and frequency) of the SS/PBCH block and the CORESET configuration.

Figure 5:
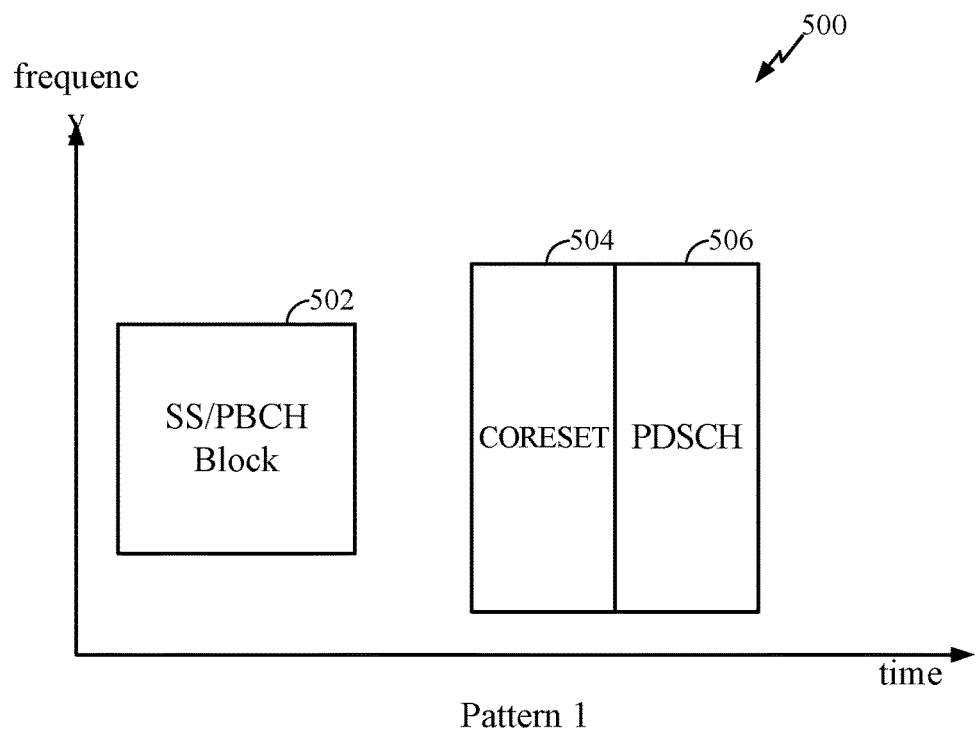
FIG. 5 shows a transmission resource mapping, in accordance with certain aspects of the present disclosure.

FIG. 5 shows a transmission resource mapping 500, according to aspects of the present disclosure. In the transmission resource mapping 500, a BS (e.g., the BS 110a as shown in FIG. 1) transmits an SS/PBCH block 502. The SS/PBCH block 502 includes a MIB conveying an index to a table that relates time and frequency resources of a CORESET 504 to time and frequency resources of the SS/PBCH block 502.

The BS may also transmit control signaling. In some scenarios, the BS may also transmit a PDCCH to a UE (e.g., the UE 120a as shown in FIG. 1) in the (time/frequency resources of the) CORESET 504. The PDCCH may schedule a PDSCH 506. The BS then transmits the PDSCH 506 to the UE. The UE may receive the MIB in the SS/PBCH block 502, determine the index, look up a CORESET configuration based on the index, and determine the CORESET 504 from the CORESET configuration and the SS/PBCH block 502. The UE may then monitor the CORESET 504, decode the PDCCH in the CORESET 504, and receive the PDSCH 506 that was allocated by the PDCCH.

In certain aspects, different CORESET configurations may have different parameters that define a corresponding CORESET. For example, each CORESET configuration may indicate a number of resource blocks (e.g., 24, 48, or 96), a number of symbols (e.g., 1-3), as well as an offset (e.g., 0-38 RBs) that indicates a location in a frequency.

Further, REG bundles may be used to convey CORESETs. REGs in an REG bundle may be contiguous in a frequency and/or a time domain. In certain cases, the time domain may be prioritized before the frequency domain. REG bundle sizes may include: 2, 3, or 6 for interleaved mapping and 6 for non-interleaved mapping.

As noted above, sets of CCEs may be used to transmit new radio PDCCHs (NR-PDCCHs), with different numbers of CCEs in the sets used to transmit NR-PDCCHs using differing aggregation levels.

FIGS. 6A and 6B illustrates SS burst set locations within 5 ms half-frame, for SS with 15 kHz and 30 kHz SCS. A maximum number of SSB index values L values are shown for each SCS. The figures also show how there are 2 (band specific) mapping options for 30 kHz SCS. For example, in NR Rel-15/16, 64 SSBs may be supported in 5 ms, in every 20 ms.

Example Beamforming and Holographic MIMO

A wireless communication system may include base stations (BSs) and user equipments (UEs). The BSs or the UEs may be equipped with multiple antennas, which may be used to employ techniques such as new radio (NR) multiple input multiple output (MIMO) communications and/or beamforming.

Beamforming refers to a technique that may be used at a transmitting device (e.g., a BS) or a receiving device (e.g., a UE) to shape or steer an antenna beam (e.g., a transmit beam or a receive beam) along a spatial path between the BS and the UE. The beamforming may always point towards a direction of the receiving device.

A beamformed transmission may point in a direction. In one example, the direction may be depicted by azimuth angle of arrival (AoA) and/or azimuth angle of departure (AoD). In another example, the direction may be depicted by zenith angle of arrival (ZoA) and/or zenith angle of departure (ZoD).

NR MIMO communications may employ multipath signal propagation by transmitting or receiving multiple signals via different spatial layers. A BS may transmit the multiple signals via different antennas. Similarly, a UE may receive the multiple signals via the different antennas. NR MIMO communication techniques may include a single-user MIMO (SU-MIMO) where the multiple spatial layers may be transmitted to a same UE, and a multiple-user MIMO (MU-MIMO) where the multiple spatial layers may be transmitted to multiple UEs.

Figure 7:
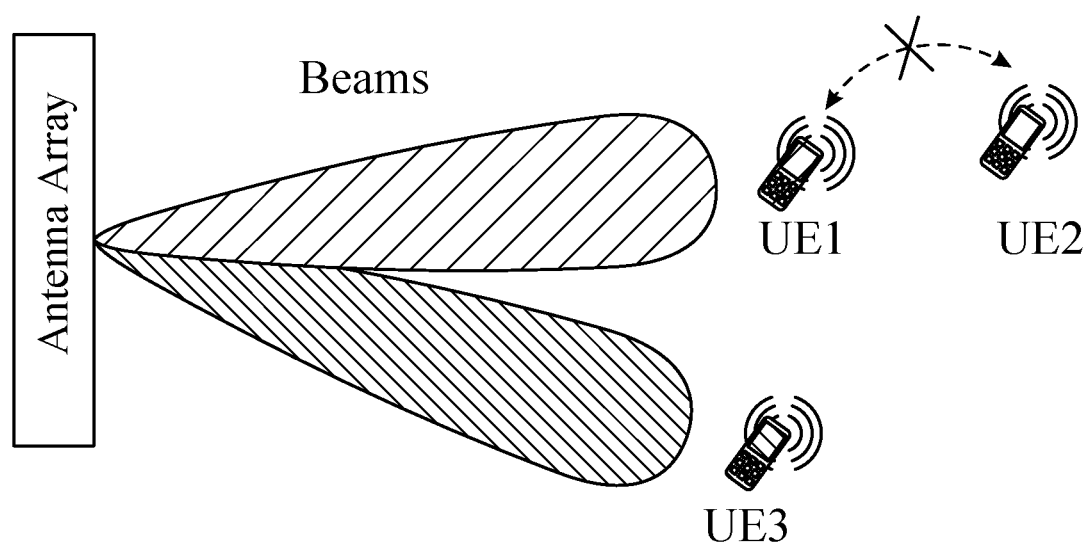
FIG. 7 illustrates example two-dimensional (2D) beamforming, in accordance with certain aspects of the present disclosure.

FIG. 7 illustrates an example of two-dimensional (2D) beamforming via NR MIMO. As illustrated, two beams from an antenna array may be used to reach 3 UEs (such as UE1, UE2, and UE3). Although NR MIMO communication operation offers significant increases in a data throughput and a link range without an additional bandwidth or an increased transmit power, a NR MIMO system may have some limitations. For instance, when there are multiple UEs present in a same direction but at different distances, such as UE1 and UE2, the NR MIMO system may be unable to distinguish between such UEs.

The 2D beamforming may not enable two or more UEs with same or substantially similar azimuth and zenith to be paired for MU-MIMO co-transmission. Accordingly, this may limit MU pairing opportunity and reduce MU diversity gain, resulting in a lower order MU-MIMO and a lower spectral inefficiency.

The 2D beamforming may also cause a low transmission power utilization efficiency. Although 2D beams may cover a whole area of a certain angle, but a target UE may only locate at one spot area with a certain distance from a BS. Accordingly, the transmission power landing at the areas with other distances may be wasted.

Figure 8:
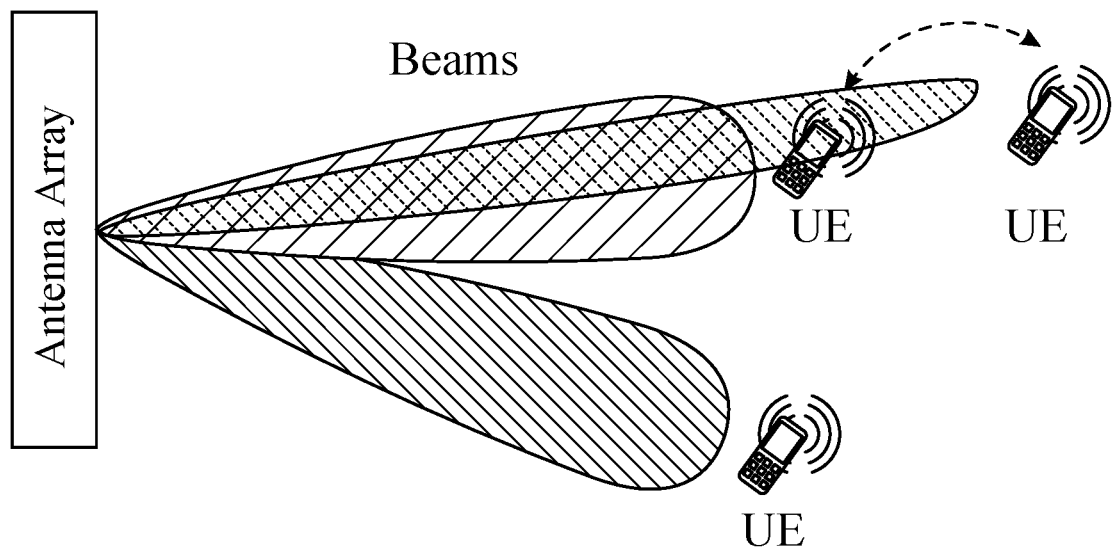
FIG. 8 illustrates example 3D beamforming, in accordance with certain aspects of the present disclosure.

FIG. 8 illustrates an example of 3D beamforming. An antenna array may have a nearby coverage area (such as a near field) and a faraway coverage area (such as a far field). When a distance of the coverage area is sufficiently short relative to a size of an antenna panel of the antenna array, a beam generated within this area may have holographic characteristics. The beam may be a 3D or a holographic beam that may be capable of distinguishing between a direction and a distance of UEs. The holographic beam may cover a certain angular range and a certain distance range.

The 3D beamforming may enable two or more UEs with same or substantially similar direction and different distances to be paired for MU-MIMO co-transmission. Accordingly, this may enhance MU pairing opportunity and increase MU diversity gain, resulting in a higher order MU-MIMO and improved spectral inefficiency.

The 3D beamforming may also cause a high transmission power utilization efficiency. 3D beams may cover an area of a target UE in terms of both direction and distance. Accordingly, the transmission power landing at the areas with other angles or distances may be minimized and the transmission power utilization efficiency may be improved.

Holographic MIMO may be a system where a BS may utilize one or more 3D beams to transmit one or more data streams. The holographic MIMO may utilize an integration of a large number of antenna elements into a limited surface area (e.g., on a side of a building). The holographic MIMO may enable a transmitter with such an antenna array to discriminate a distance away from itself (and receiving UEs). The holographic MIMO may have some advantages over NR MIMO. For instance, the holographic MIMO may allow pairing of multiple UEs in a same direction for MU-MIMO.

The holographic MIMO may include an active surface and a passive surface holographic MIMO. In the active surface holographic MIMO, a radio frequency (RF) generator positioned at a back side of a surface with radiating elements may generate a RF signal. The RF signal may propagate through a steerable distribution network to the radiating elements that generate a beam directed towards a receiving user (e.g., a UE). In the passive surface holographic MIMO, a RF transmitter and a surface with reflecting elements may be at different locations. The RF transmitter may generate and send a RF signal towards the surface. The surface may reflect the RF signal using steerable reflecting elements that generate a beam directed towards a receiving user (e.g., a UE).

Holographic beam forming (HBF) uses passive electronically steered antennas that may use no active amplification internally. Using the HBF, beamforming may be accomplished using a hologram (as opposed to how a traditional phased array operates). The HBF may have great advantage to serve UEs that may be within a certain range from an antenna array referred to as a near field area.

Figure 9:
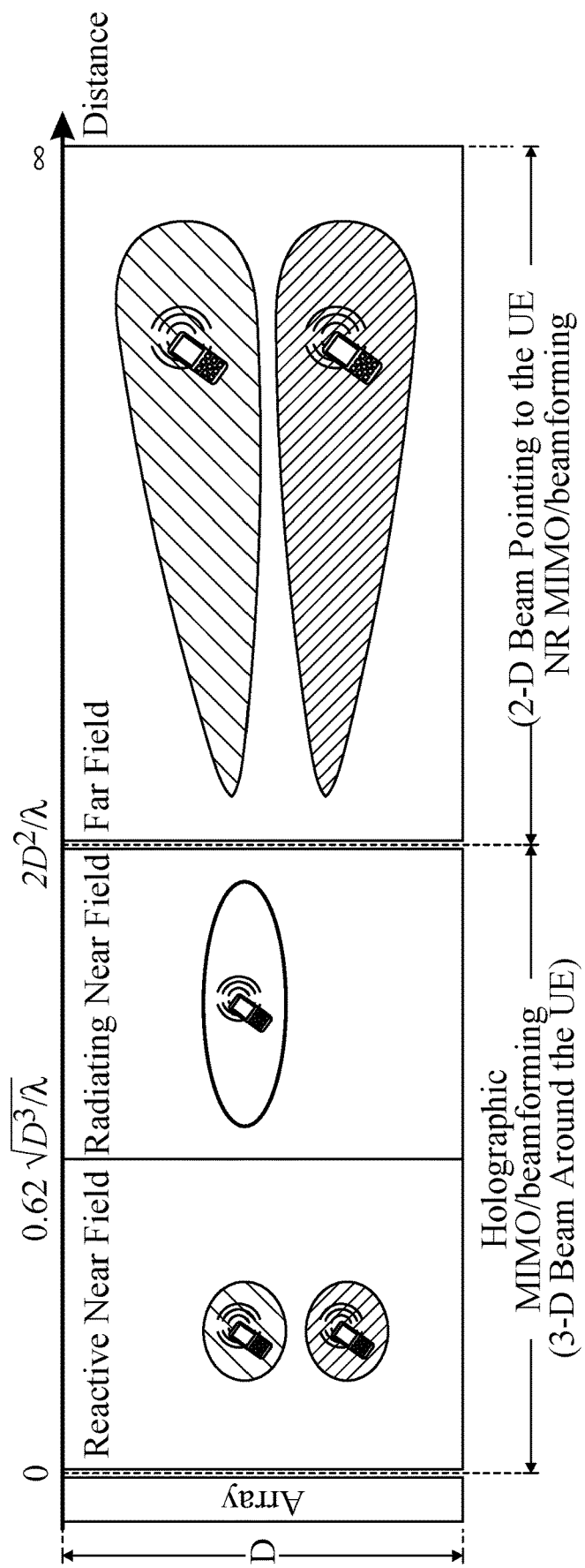
FIG. 9 illustrates example holographic beamforming and NR beamforming, in accordance with certain aspects of the present disclosure.

As illustrated in FIG. 9, HBF transmission characteristics in a near-field may change from reactive to radiating. In the near-field, beam focusing may be possible and coding mechanisms in a MIMO may be able to exploit this situation resulting in significant spectral efficiencies.

A partitioning distance of a near field (such as a reactive near field and a radiating near field) and a far field may depends on an antenna panel size (D) and a wavelength ($\lambda$). A coverage of the near field may be extended, for example, by increasing the D and/or reducing the $\lambda$, and thereby increasing a carrier frequency. In one example, the reactive near field may be from 0 to $0.62\sqrt{D^3/\lambda}$. In one example, the radiating near field may be from $0.62\sqrt{D^3/\lambda}$ to $2D^2/\lambda$. In one example, the far field may be from $2D^2/\lambda$ to infinite ($\infty$).

As noted above, holographic MIMO antenna arrays may provide a 3D coverage. This may be used to generate more beam candidates in relation to 2D coverage provided by NR MIMO, potentially significantly more than the 64 SSBs supported in NR Rel. 15/16 (in a 5 ms half-frame, in every 20 ms).

Figure 10:
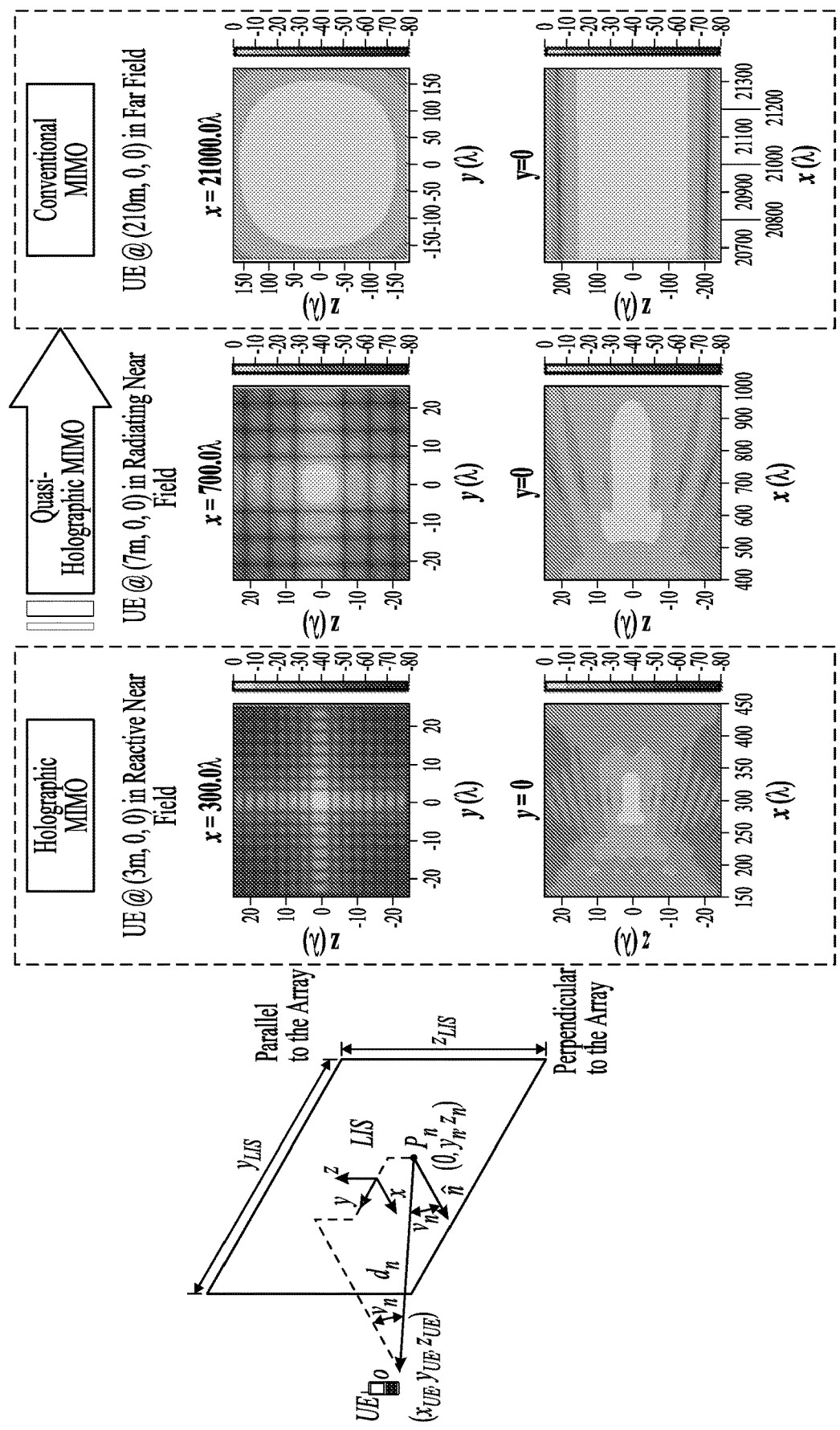
FIG. 10 illustrates example beam patterns in different fields, in accordance with certain aspects of the present disclosure.

Holographic MIMO and other MIMO (such as Quasi-holographic MIMO and conventional MIMO) may generate different beams. Various beam patterns, as illustrated in FIG. 10, are shown in different fields when a carrier frequency ($f_c$) may be equal to 30 GHz ($\lambda$=1 cm), a uniform planar array (UPA) may be equal to 200×200 (=40,000) elements, an inter-antenna distance is (d) may be equal to $\lambda/2$, and an aperture size may be equal to 1 m×1 m.

A holographic MIMO antenna panel (e.g., a large antenna panel) may include a group of subarrays (e.g., small size subarrays). Each subarray may have its own RF channel. Each subarray may use its RF channel to transmit one or more independent signals. The subarrays may have two configuration modes.

Figure 11A:
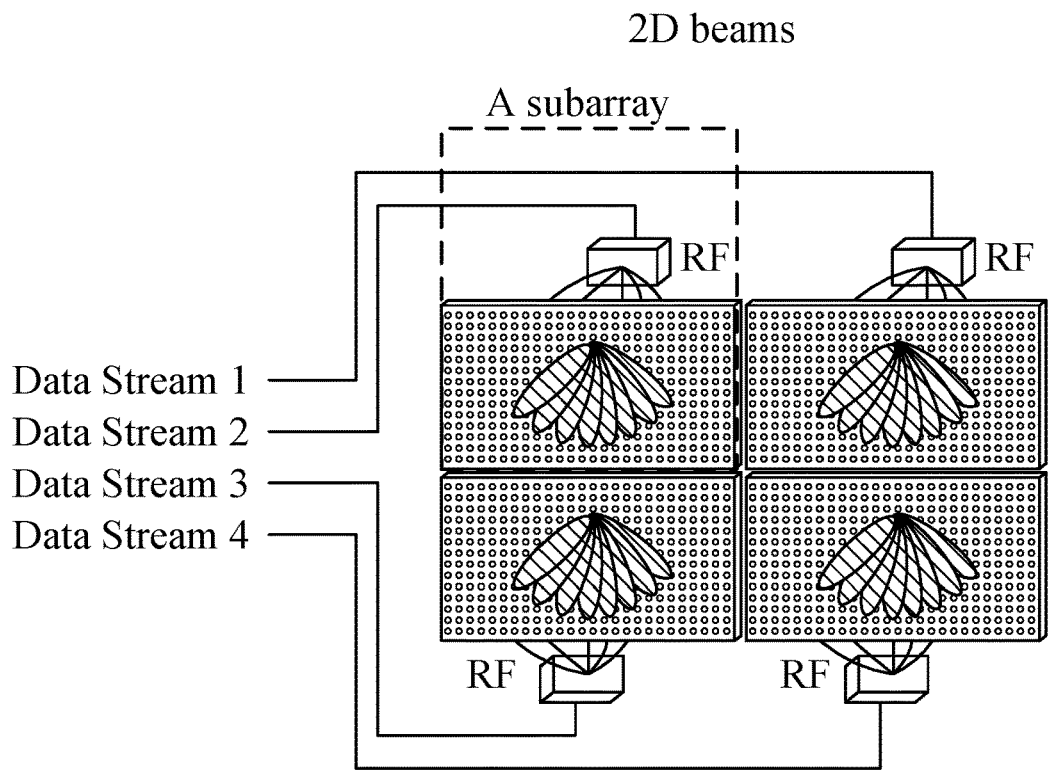
FIG. 11A illustrates an example configuration mode of subarrays of holographic multiple input multiple output (MIMO) antenna panel to generate a 2D beam, in accordance with certain aspects of the present disclosure.

In a first configuration mode (Mode 1), as illustrated in FIG. 11A, each subarray may generate beams and transmit signals independently. In this mode, different data streams may be inputted to each subarray. When a size of antenna panel may be small, a 2D beam may be generated by each subarray.

Figure 11B:
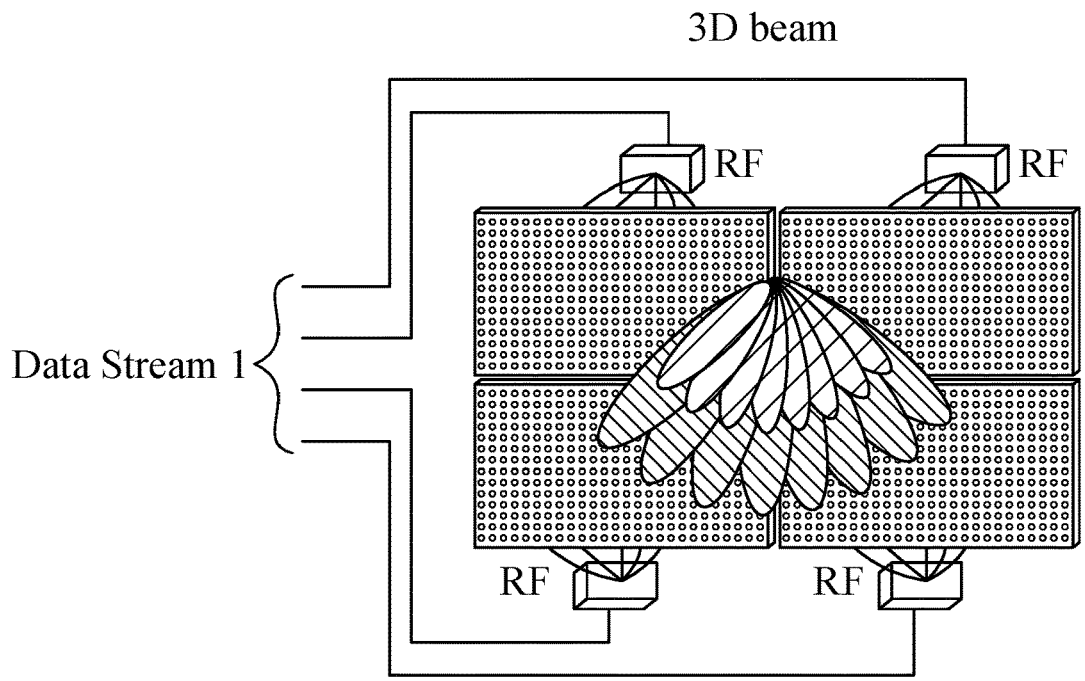
FIG. 11B illustrates an example configuration mode of subarrays of holographic MIMO antenna panel to generate a 3D beam, in accordance with certain aspects of the present disclosure.

In a second configuration mode (Mode 2), as illustrated in FIG. 11B, multiple subarrays may generate a beam jointly and transmit signals coherently. In this mode, a same data stream may be inputted to all subarrays. When a size of an antenna panel may be large, a 3D beam may be generated by all subarrays.

The 3D beam (shown in FIG. 11B) may have a higher beamforming gain than each 2D beam or a combined beam of multiple 2D beams (shown in FIG. 11A). Also, a number of data streams by a joint 3D beam may be less than a total number of data streams by separate 2D beams.

Example Beam Determination in Holographic MIMO System

As noted above, a holographic multiple input multiple output (MIMO) system may provide a three-dimensional (3D) coverage. In the holographic MIMO system, multiple subarrays of a holographic MIMO antenna panel may be used to jointly generate a beam to increase beamforming gain.

In such a system, a base station (BS) may be equipped with a holographic MIMO antenna panel that may include subarrays, which may be grouped to form subarray groups. The BS may determine beam weights of beams and their associated subarrays to serve one or more user equipments (UEs). In some cases, when the holographic MIMO antenna panel may include a large number (e.g. 16, 64) of subarrays, it may be challenging for the BS to determine optimal beam-subarray pairs and beam weights, due to the number of possible combinations.

The BS may implement one or more methods to determine optimal beam-subarray pairs and beam weights. For example, the BS may implement an exhaustive beam determination method to determine the optimal beam-subarray pairs and beam weights. Per this beam determination method, the BS may perform beam sweeping for each subarray group of the holographic MIMO antenna panel. Accordingly, the BS may have to perform a large number of beam sweeping occurrences, which may result in large radio resource consumption and increase latency.

Figure 12:
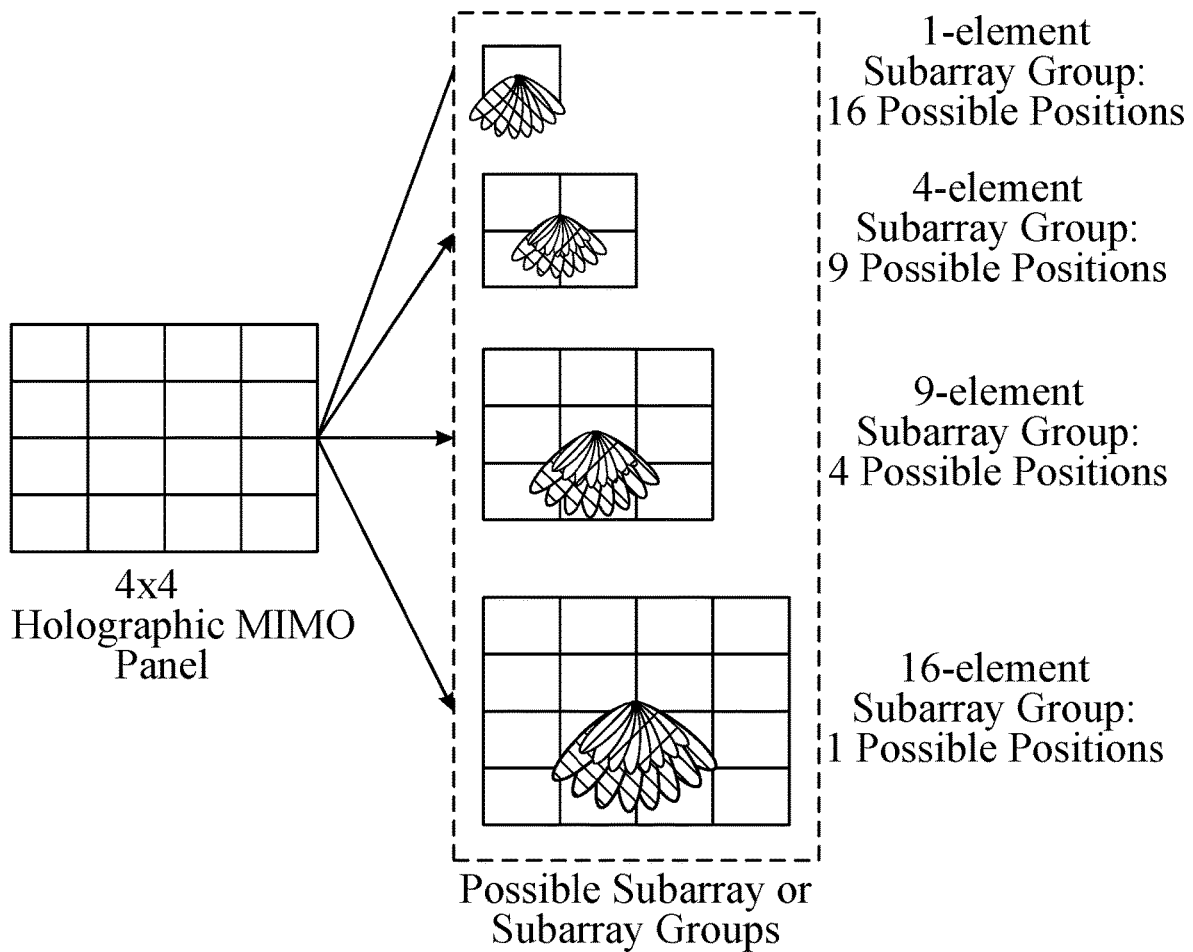
FIG. 12 illustrates example holographic MIMO antenna panel and subarray groups, in accordance with certain aspects of the present disclosure.

This overhead may be understood by considering the relatively simple example of FIG. 12, which illustrates 4 types of possible subarray groups of a 4×4 holographic MIMO antenna panel. Each subarray group may have multiple possible positions. For example, a 1 element subbary group may be located in any one of 16 locations. Assuming the N×N arrangements shown in FIG. 12, a 4 element array (N=2) can be located in any one of 9 locations, a 9 element array (N=3) may be located in any one of 4 locations, while a full 16 element group (N=4) occupies the entire panel. Thus, when a BS may perform beam sweeping of each possible position of each type of subarray group, a total number of beam sweeping occurrences may be equal to 30 (1+4+9+16). This high number of beam sweeping occurrences may cause large beam management latency and higher radio resource consumption.

Aspects of the present disclosure relate to a beam determination technique, which may be implemented by a BS to efficiently determine subarray grouping and beam weights for each subarray group based on a report from a UE. In other words, the report from the UE may indicate an initial set of subarray groups, in which more refined beam management may be performed.

For example, the BS may perform beam sweeping from each subarray of its holographic MIMO antenna panel, and the UE may determine and report subarray grouping information (SGI) to the BS based on the beam sweeping. When the BS sweeps beams at different channel state information reference signal (CSI-RS) resource sets for multiple subarrays, the UE may report grouping of the subarrays associated with these CSI-RS resource sets to the BS. The BS may then transmit an analog beam coherently by the grouped subarrays. The beam determination technique described herein may reduce a beam sweeping latency and a radio resource consumption, in comparison with an exhaustive beam determination method in which the beam sweeping is performed by all kinds of the subarray groups.

FIG. 13 is a flow diagram illustrating example operations 1300 for wireless communication, in accordance with certain aspects of the present disclosure. The operations 1300 may be performed, for example, by a UE (e.g., such as the UE 120a in the wireless communication network 100 of FIG. 1). The operations 1300 may be implemented as software components that are executed and run on one or more processors (e.g., the controller/processor 280 of FIG. 2). Further, transmission and reception of signals by the UE in operations 1300 may be enabled, for example, by one or more antennas (e.g., the antennas 252 of FIG. 2). In certain aspects, the transmission and/or reception of signals by the UE may be implemented via a bus interface of one or more processors (e.g., the controller/processor 280) obtaining and/or outputting signals.

The operations 1300 begin, at 1302, by receiving a configuration for reporting SGI. The UE receives the configuration using antenna(s) and receiver/transceiver components of the UE 120a shown in FIG. 1 or FIG. 2 and/or of the apparatus shown in FIG. 38.

At 1304, the UE monitors for first beam swept transmissions sent from multiple subarrays of a holographic MIMO antenna panel of a network entity. The UE monitors for the first beam swept transmissions using a processor of the UE 120a shown in FIG. 1 or FIG. 2 and/or of the apparatus shown in FIG. 38.

At 1306, the UE transmits the SGI to the network entity, in accordance with the configuration. The SGI indicates one or more subarray groups determined based on the first beam swept transmissions. The UE transmits the SGI using antenna(s) and transmitter/transceiver components of the UE 120a shown in FIG. 1 or FIG. 2 and/or of the apparatus shown in FIG. 38.

At 1308, the UE monitors for second beam swept transmissions sent from the one or more subarray groups indicated by the SGI. The UE monitors for the second beam swept transmissions using a processor of the UE 120a shown in FIG. 1 or FIG. 2 and/or of the apparatus shown in FIG. 38.

At 1310, the UE transmits a report indicating one or more beams selected for the one or more subarray groups based on the second beam swept transmissions. The UE transmits the report using antenna(s) and transmitter/transceiver components of the UE 120a shown in FIG. 1 or FIG. 2 and/or of the apparatus shown in FIG. 38.

FIG. 14 is a flow diagram illustrating example operations 1400 for wireless communication, in accordance with certain aspects of the present disclosure. The operations 1400 may be performed, for example, by a network entity (e.g., such as the BS 110a in the wireless communication network 100 of FIG. 1). The operations 1400 may be implemented as software components that are executed and run on one or more processors (e.g., the controller/processor 240 of FIG. 2). Further, transmission and reception of signals by the network entity in operations 1400 may be enabled, for example, by one or more antennas (e.g., the antennas 234 of FIG. 2). In certain aspects, the transmission and/or reception of signals by the network entity may be implemented via a bus interface of one or more processors (e.g., the controller/processor 240) obtaining and/or outputting signals.

The operations 1400 begin, at block 1402, by sending, to a UE, a configuration for reporting SGI. The network entity sends the configuration using antenna(s) and transmitter/transceiver components of the BS 110a shown in FIG. 1 or FIG. 2 and/or of the apparatus shown in FIG. 39.

At 1404, the network entity sends first beam swept transmissions from multiple subarrays of a holographic MIMO antenna panel of the network entity. The network entity sends the first beam swept transmissions using antenna(s) and transmitter/transceiver components of the BS 110a shown in FIG. 1 or FIG. 2 and/or of the apparatus shown in FIG. 39.

At 1406, the network entity receives the SGI from the UE. The SGI indicates one or more subarray groups determined based on the first beam swept transmissions. The network entity receives the SGI using antenna(s) and receiver/transceiver components of the BS 110a shown in FIG. 1 or FIG. 2 and/or of the apparatus shown in FIG. 39.

Figure 39:
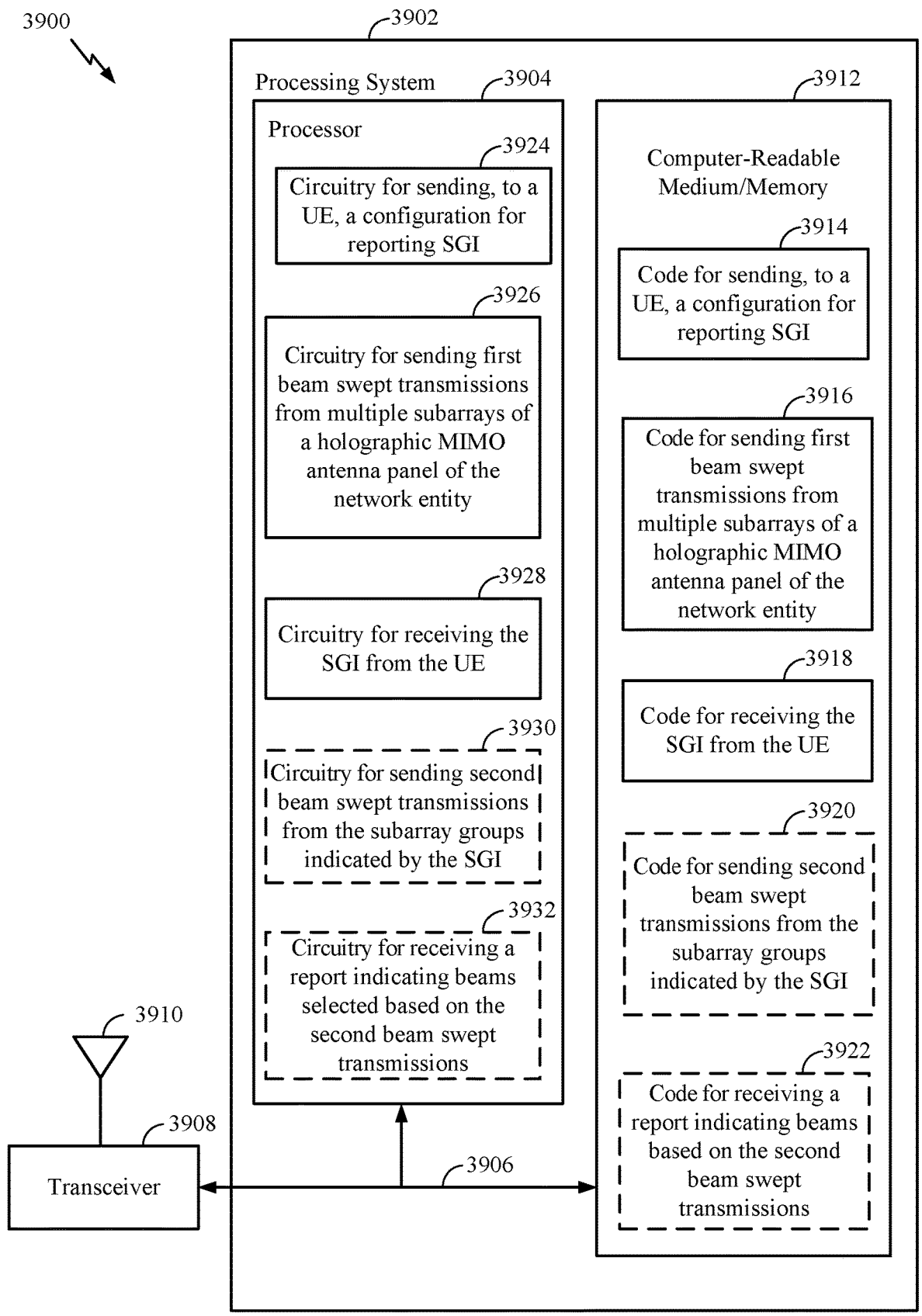
FIG. 39 illustrates a communications device that may include various components configured to perform operations for techniques disclosed herein, in accordance with certain aspects of the present disclosure.

At 1408, the network entity sends second beam swept transmissions from the subarray groups indicated by the SGL The network entity sends the second beam swept transmissions using antenna(s) and transmitter/transceiver components of the BS 110a shown in FIG. 1 or FIG. 2 and/or of the apparatus shown in FIG. 39.

At 1410, the network entity receives a report from the UE indicating one or more beams selected for the subarray groups based on the second beam swept transmissions. The network entity receives the report using antenna(s) and receiver/transceiver components of the BS 110a shown in FIG. 1 or FIG. 2 and/or of the apparatus shown in FIG. 39.

The operations shown in FIGS. 13 and 14 are further described with reference to FIGS. 15-21.

Figure 15:
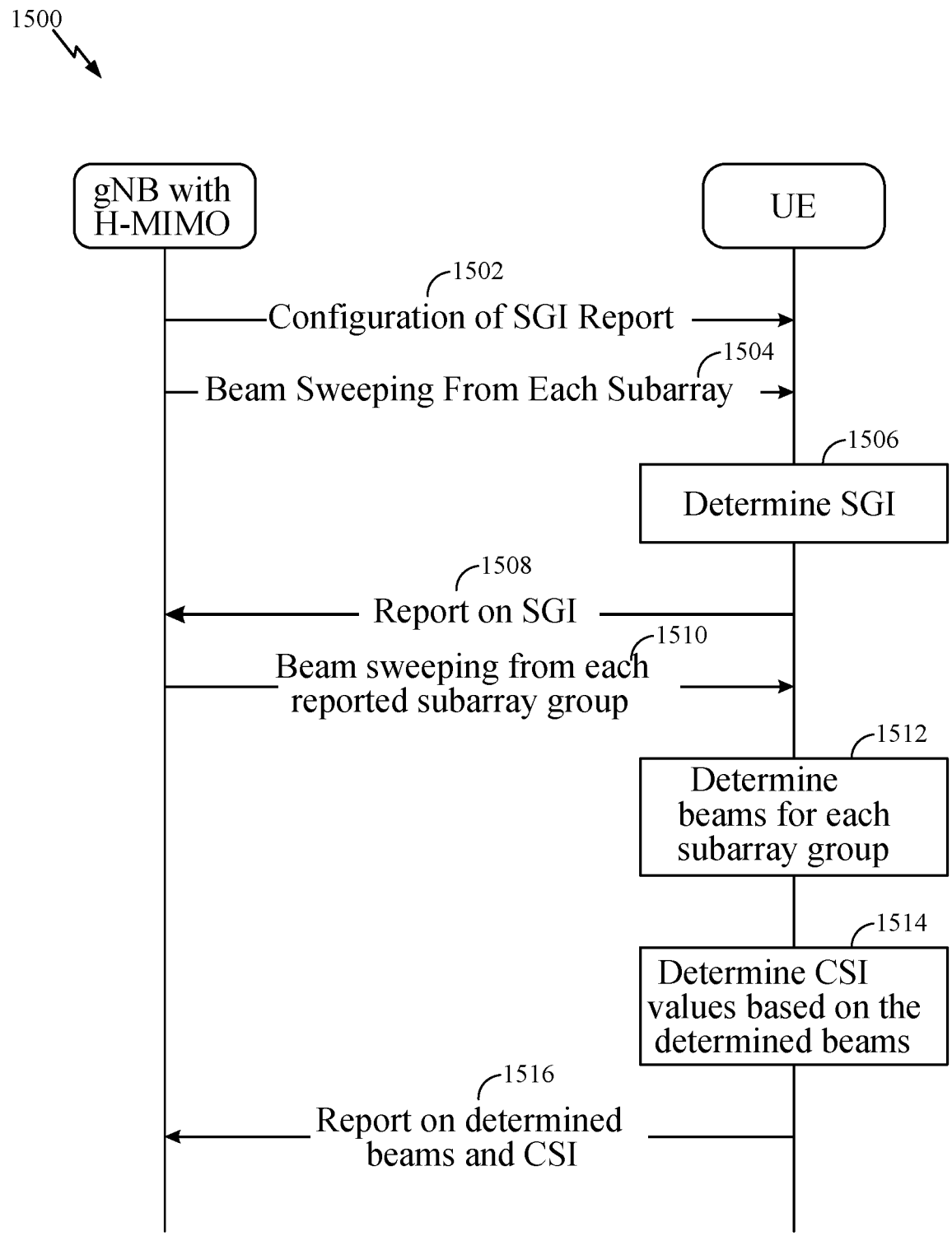
FIG. 15 is a call flow diagram illustrating example signaling for a beam determination in a holographic MIMO system, in accordance with certain aspects of the present disclosure.

As illustrated in FIG. 15, at 1502, a network entity (gNB with a holographic MIMO antenna panel, e.g., such as the BS 110a in the wireless communication network 100 of FIG. 1) sends a message indicating a configuration for reporting SGI (e.g., a SGI report) to a UE (e.g., such as the UE 120a in the wireless communication network 100 of FIG. 1). The message may be sent via radio resource control (RRC) signaling, a medium access control-control element (MAC-CE), or a downlink control information (DCI).

In certain aspects, the configuration for reporting the SGI may indicate a number of subarrays ($N_s$) associated with the holographic MIMO antenna panel and a maximum number of subarray groups (M). In some cases, the UE may previously report a maximum MIMO rank of the UE to the network entity. In such cases, the network entity may ensure that the maximum number of subarray groups is less than the reported maximum MIMO rank.

In certain aspects, the configuration for reporting the SGI may indicate information, which may assist the UE to recognize beams of each subarray associated with the holographic MIMO antenna panel. In some cases, the network entity may indicate such information to the UE via another signaling message. The information may include a number of swept beams for each subarray. The information may further include a pattern of subarrays (such as 2-by-2, 2-by-4, 4-by-4, etc.). The information may further include a subarray grouping restriction (such as a list of subarray groups (e.g., subarray 2, subarray 4) that may indicate that these two subarrays cannot be put into one subarray group).

At 1504, the network entity sends to the UE first beam swept transmissions from each of multiple subarrays of the holographic MIMO antenna panel (i.e., beam sweeping from each subarray). The first beam swept transmissions may be performed via synchronization signal block (SSB) or channel state information reference signal (CSI-RS) transmissions. The UE may monitor for the first beam swept transmissions.

Figure 16:
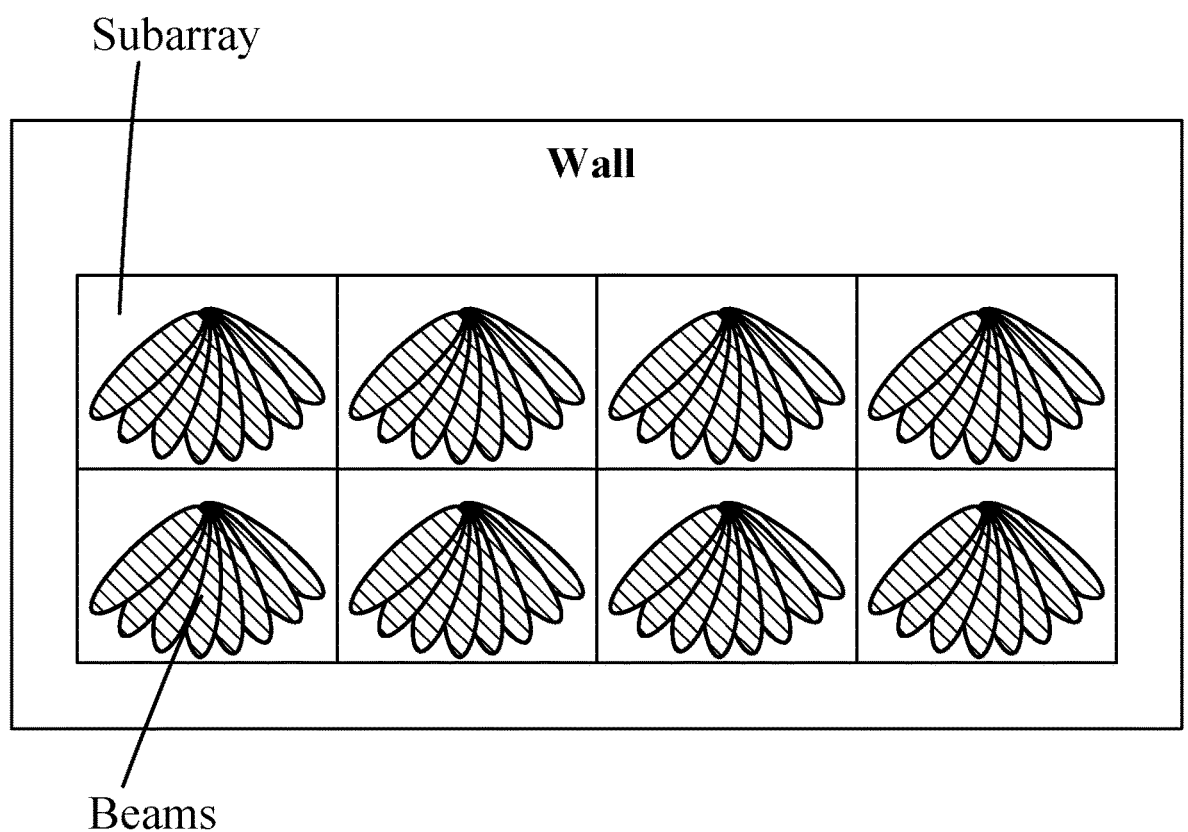
FIG. 16 illustrates example swept beams for each subarray in a subarray group, in accordance with certain aspects of the present disclosure.

In certain aspects, the holographic MIMO antenna panel may include subarrays positioned adjacent to each other, as illustrated in FIG. 16. In such a case, when beams of two subarrays positioned adjacent to each other are transmitted at a same time-frequency resource, mutual interference may occur. Accordingly, each beam of each subarray may be transmitted at orthogonal radio resources such as different time domain resources, different frequency domain resources, or orthogonal covering codes (e.g., OCC).

In certain aspects, the first beam swept transmissions may be used to determine the subarray grouping (i.e., the SGI) but not a data transfer beam, and therefore, the first beam swept transmissions may include beams that may have large beam width to decrease a total number of swept beams and a latency of beam sweeping.

At 1506, the UE determines the SGI based on the first beam swept transmissions in accordance with the configuration. The SGI may indicate one or more subarray groups. Each subarray group may indicate one or more subarrays of the holographic MIMO antenna panel.

In certain aspects, the UE may execute an algorithm, which may be based on a capability (or an intention) of the UE to determine the SGI. In certain aspects, the UE may determine the SGI based on a maximum number of simultaneously received data streams by the subarrays. In certain aspects, when the UE may be equipped with multiple receive (Rx) antennas (such as a uniform linear array (ULA) and a uniform planar array (UPA) antenna panel) to receive the beams of the first beam swept transmissions, the UE may group the subarrays and determine the SGI based on the used Rx antenna panels. The subarrays that may have different used Rx panels may not be grouped.

In one example, as illustrated in FIG. 17, a UE may determine to divide subarrays of a holographic MIMO antenna panel in three subarray groups based on first beam swept transmissions from the subarrays and in accordance with a configuration. Each subarray group may transmit one data stream, e.g. because the UE may have three Rx antennas or because rank=3 may maximize a sum data rate based on a current signal to noise ratio (SNR). SGI may indicate three subarray groups that may include a first subarray group, a second subarray group, and a third subarray group. The first subarray group (or subarray group 1) may include subarray 1 and subarray 2. The second subarray group (or subarray group 2) may include subarray 3, subarray 4, subarray 5 and subarray 6. The third subarray group (or subarray group 3) may include subarray 7 and subarray 8.

Returning to FIG. 15, at 1508, the UE sends a message to the network entity to indicate and/or report the SGI in accordance with the configuration. The message may be a physical-layer control message such as a channel state information (CSI) report.

In certain aspects, the message may only indicate the SGI. In certain aspects, the message may also indicate L1 measurement metrics (such as a reference signal receive power (RSRP)) and/or a selected beam of each subarray, in addition to the SGI. The network entity may use the RSRP and/or the selected beam of each subarray to determine a position of the UE. In certain aspects, the message may also indicate beam indexes. The inclusion of the beam indexes, RSRP value etc. in the message may increase a payload of the message. The network entity may use the RSRP values and/or the beam indexes to determine a beam sweeping direction and a field type (such as a far-field or a near-field) when sweeping beams from each reported subarray group indicated by the SGI.

Figure 18:
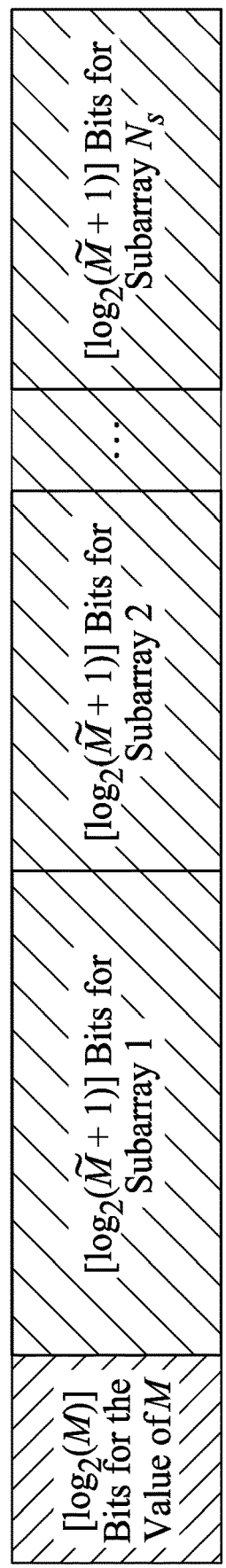
FIG. 18 illustrates an example of content associated with subarray grouping information (SGI), in accordance with certain aspects of the present disclosure.

In certain aspects, the SGI may include a value M to indicate a number of subarray groups, a group index for each subarray (where a value 0 may indicate that a subarray is not selected, a value 1 may indicate that a subarray is grouped in subarray group 1, . . . , a value $\tilde{M}$ may indicate that a subarray is grouped in subarray group $\tilde{M}$). In this way, as illustrated in FIG. 18, $N_s \lceil \log_2(\tilde{M}+1) \rceil$ bits may be needed to represent the SGI of all the subarrays.

In certain aspects, the SGI may include a value M to indicate a number of subarray groups, several values $\{\tilde{N}_1, \ldots, \tilde{N}_{\tilde{M}}\}$ to indicate a number of subarrays in each subarray group, a total number of selected subarrays (e.g., $\tilde{N}_s = \sum_{m=1}^{\tilde{M}} \tilde{N}_m$); a list $\{n_1, \ldots, n_{\tilde{N}_1}, \ldots, n_{\tilde{N}_s}\}$ to indicate selected subarray indexes of all subarray groups.

In certain aspects, when each subarray index may be represented by $\lceil \log_2 N_s \rceil$ bits, $\tilde{N}_s \lceil \log_2 N_s \rceil$ total bits may be needed to indicate indexes in lists; $\lceil \log_2(M) \rceil$ bits may be needed to indicate $\tilde{M}$, and $$\max_{\tilde{M},\tilde{N}_s} \left[ \log_2 \left( C_{\tilde{N}_s-1}^{\tilde{M}-1} \right) \right]$$

bits may be needed to indicate values $\{\tilde{N}_1, \ldots, \tilde{N}_{\tilde{M}}\}$ where a combinational number $C_m^n = m!/n!(m-n)!$ may be a number of possibilities of choosing n from m.

Figure 19:
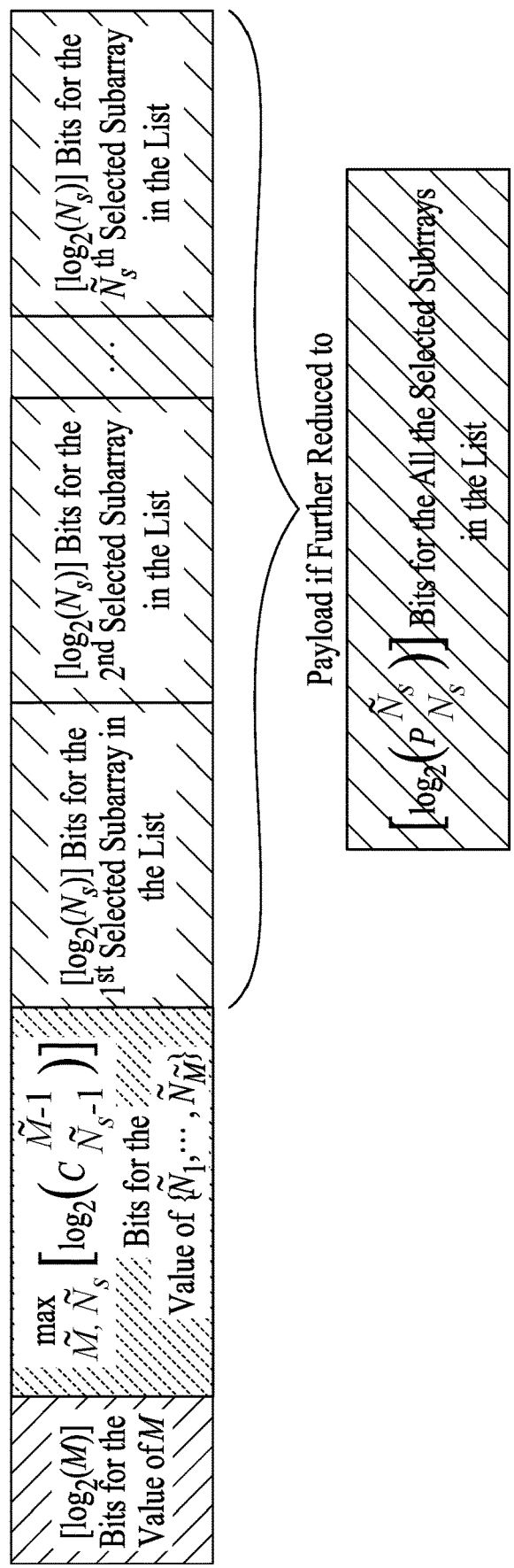
FIG. 19 illustrates another example of content associated with SGI, in accordance with certain aspects of the present disclosure.

In certain aspects, to reduce a payload of the message indicating the SGI, as illustrated in FIG. 19, a number of bits for a selected subarray list may be reduced to $\lceil \log_2 (P_{N_s}^{\tilde{N}_s}) \rceil$ where a queue number $P_m^n = m!/n!$ may be a number of possibilities of choosing n from m and queueing them.

Returning to FIG. 15, at 1510, the network entity sends second beam swept transmissions from the one or more subarray groups (i.e., each reported subarray group indicated by the SGI). The UE may monitor for the second beam swept transmissions.

In certain aspects, the subarrays in one subarray group may be combined as a joint panel. A same data stream may be inputted to each subarray within each subarray group.

In certain aspects, a size of the joint panel may be larger than an individual panel of one subarray, so a border between a near field and a far field may move further away from the joint panel, and the UE may be easy to locate in the near-field.

In certain aspects, the network entity may estimate a position of the UE based on the reported L1 measurement metrics and/or the reported selected beams of the subarrays, and then based on the estimated position of the UE may determine whether the UE may be located in the near-field or the far-field of the joint panel.

In certain aspects, when the UE may be located in the near-field or the far-field of the joint panel, the network entity may sweep 3D or 2D beams by the joint panel.

Figure 20:
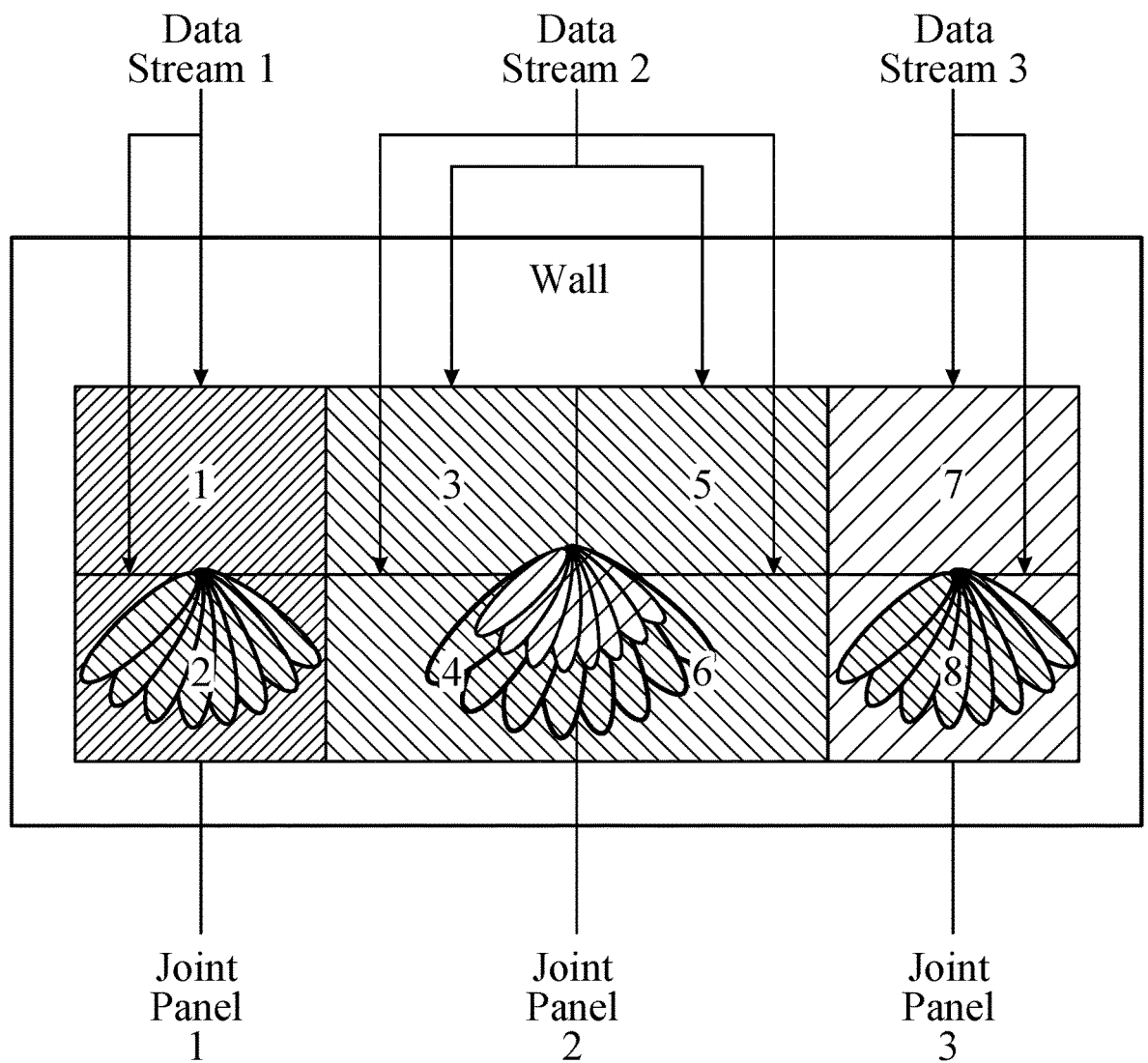
FIG. 20 illustrates example joint panels based on SGI, in accordance with certain aspects of the present disclosure.

In one example, as illustrated in FIG. 20, the network entity may generate three joint panels based on the SGI. The network entity may then sweep beams (i.e., send the second beam swept transmissions) from each joint panel. The three joint panels may include a first joint panel (or joint panel 1), a second joint panel (or joint panel 2), and a third joint panel (or joint panel 3). The first joint panel and the third joint panel may have a smaller size than the second joint panel. In one case, when the network entity may determine that the UE may be located in the far-field of the first joint panel and the third joint panel, the network entity may then sweep 2D beams from the first joint panel and the third joint panel. In another case, when the network entity may determine that the UE may be located in the near-field of the second joint panel, the network entity may then sweep 3D beams from the second joint panel.

Returning to FIG. 15, at 1512, the UE determines and/or selects one or more beams for the one or more subarray groups based on the second beam swept transmissions. In one example, since the swept beams of all joint panels/subarray groups may be different from the swept beams of the individual subarrays, the UE may measure and determine/select optimal beams from each joint panel.

At 1514, the UE determines CSI based on the one or more beams selected for the one or more subarray groups.

At 1516, the UE sends a report to the network entity indicating the selected one or more beams and the determined CSI. In one example, the UE may report the selected beams (e.g., in form of CSI-RS resource index) of each joint panel to the network entity, along with a legacy channel quality information (CQI), a precoding matrix indicator (PMI), a resource indicator (RI) or other CSI metrics based on the reported beams.

A beam determination technique described herein may have several advantages over a conventional technique to determine SGI. When a network entity may execute the conventional technique, a UE may report RSRPs of a best beam of each subarray. The network entity may then determine the SGI based on the RSRPs. (e.g., the network entity may include continuous subarrays with similar RSRPs into a subarray group). In comparison to this conventional technique, the beam determination technique described herein may provide a lower SGI report payload and an improved performance (i.e., a better subarray grouping result provided by the beam determination technique may lead to a higher beamforming gain and a higher data rate). The SGI report payload may be lower since reporting a RSRP value (per the conventional technique) costs more bits than reporting a group index value. The performance may be better because determining the optimal subarray grouping result relies on not only the RSRP values of each subarray (per the conventional technique), but also some other factors such as UE hardware implementation (i.e., Rx panels/beams) and suffered interference. Hence, the UE may prefer to include the subarrays that match different Rx panels into different subarray groups.

Figure 21:
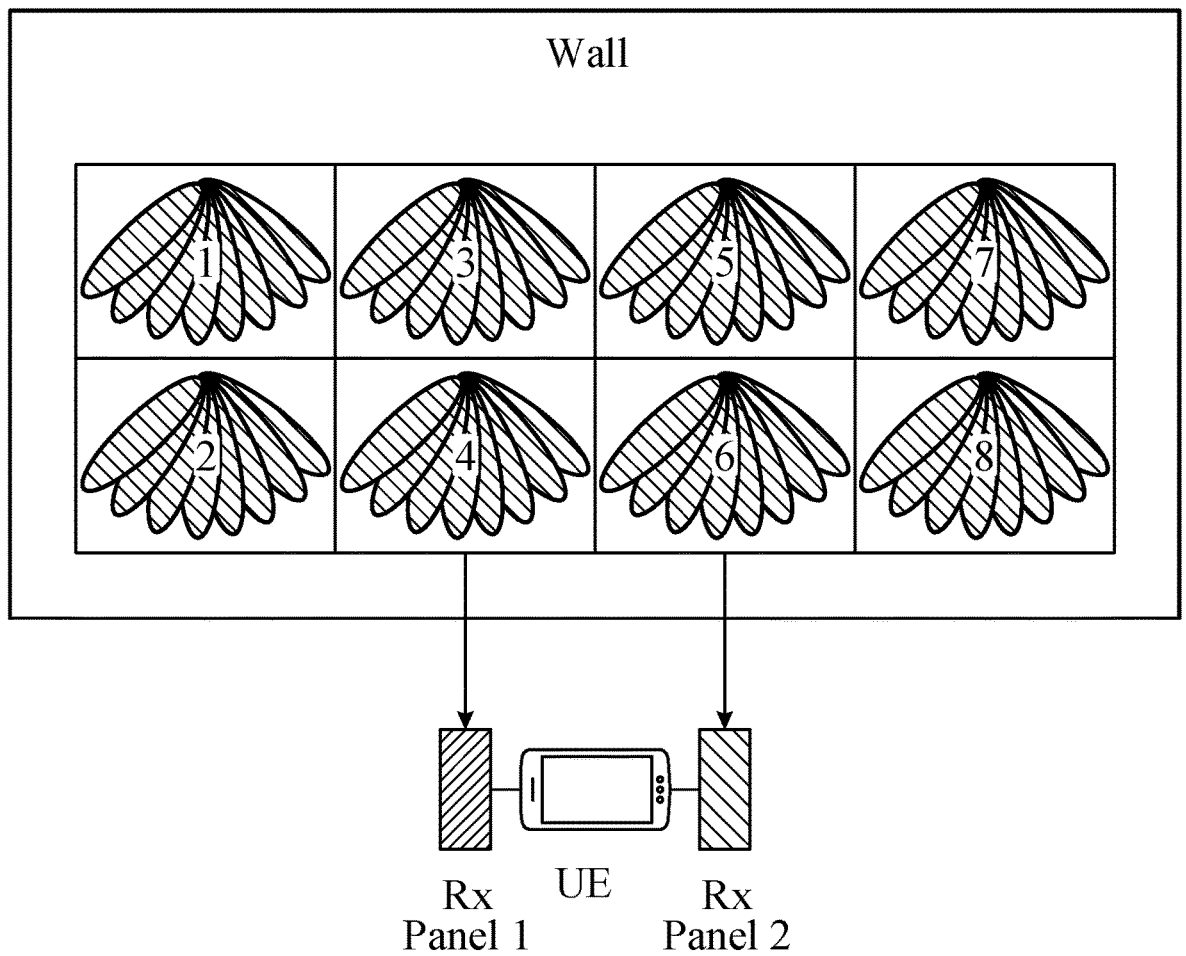
FIG. 21 illustrates example receive (Rx) panels receiving beams from subarrays in a subarray group, in accordance with certain aspects of the present disclosure.

In one example, as illustrated in FIG. 21, a UE (e.g., a mobile phone) may use two different Rx panels (such as Rx panel 1 and Rx panel 2) to receive beams sent from a subarray 4 and a subarray 6 of a holographic MIMO antenna panel of a network entity. The two Rx panels may face different directions (e.g., these two panels may be equipped at a top and a bottom of the mobile phone). In such a case, the two subarrays (i.e., the subarray 4 and the subarray 6) may not be suitable to be included in one subarray group (even though they may have similar RSRP values). This is because these two subarrays, which may correspond to different Rx panels, are used jointly to form a single beam, and no matter which Rx panel this beam points to, a signal from the subarray whose beam may not match this Rx panel may suffer from a higher propagation loss.

Example Multi-User Transmission in Holographic MIMO System

A conventional multiuser-MIMO (MU-MIMO) transmission technique may be based on a two-dimensional (2D) beamforming. As described with reference to FIG. 9, UEs located in the far field of a holographic MIMO antenna panel may be covered by 2D beams transmitting from the holographic MIMO antenna panel.

Figure 22:
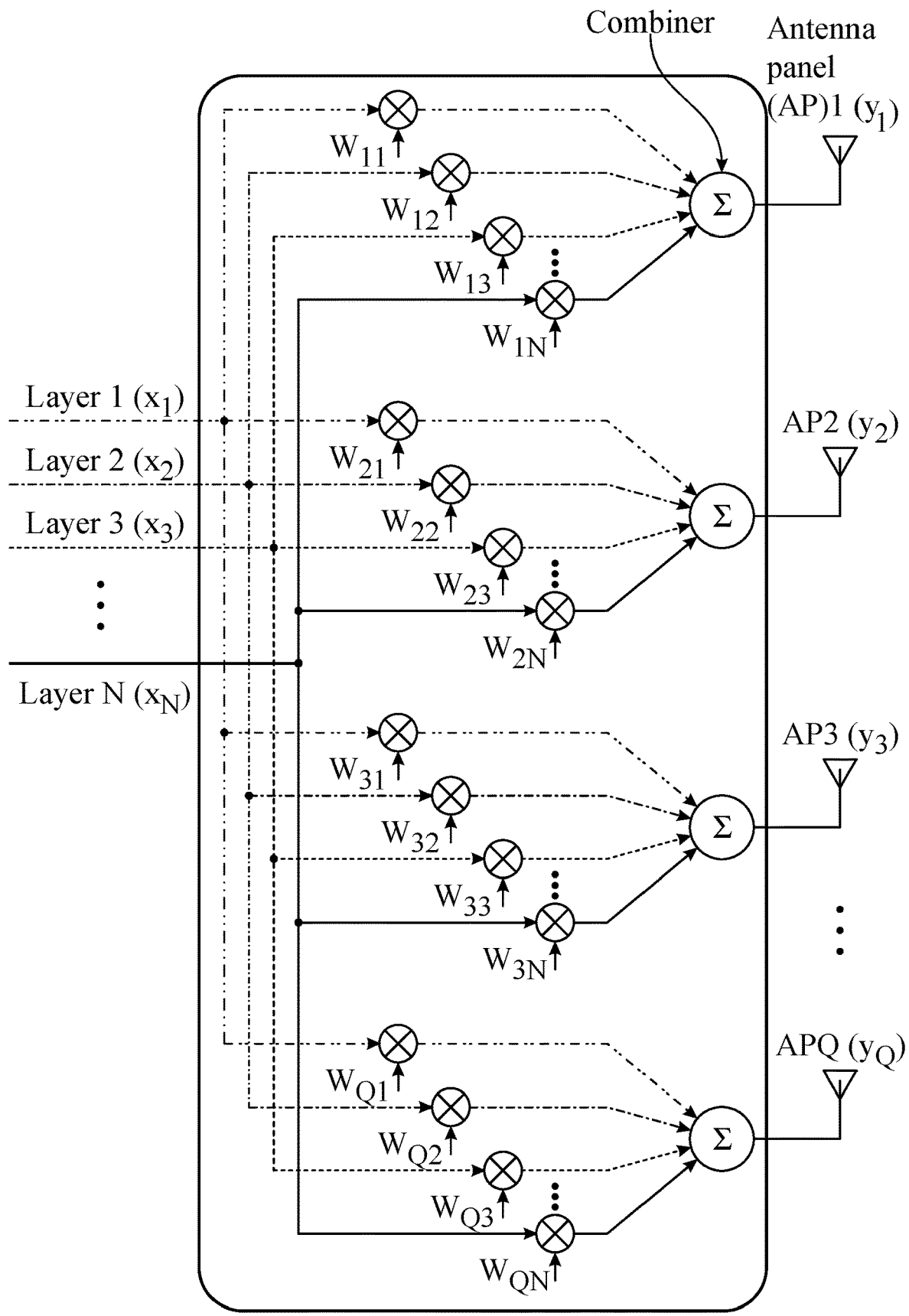
FIG. 22 illustrates an example combiner in a multiuser-MIMO (MU-MIMO) transmission system based on 2D beamforming, in accordance with certain aspects of the present disclosure.

The holographic MIMO antenna panel may be shared by all paired UEs. For example, when there are less number of antenna elements in the holographic MIMO antenna panel (i.e., the antenna elements are of a small or medium amount), to obtain sufficient beamforming gain, the network entity may use all the antenna elements to generate a beam. Also, in order to serve multiple UEs simultaneously using the holographic MIMO antenna panel, multiple radio frequency (RF) channels may be mixed using a combiner (as illustrated in FIG. 22) to form of a full connection (to all UEs).

The conventional MU-MIMO transmission technique may have some disadvantages. For example, the conventional MU-MIMO transmission technique may not be able to pair two UEs in a same or a similar direction. This may reduce a possibility of UE pairing success rate, and therefore also reduces a system throughput. In addition, the full connection may need the combiner to combine weighted RF channels, which may increase overall hardware cost.

Figure 23:
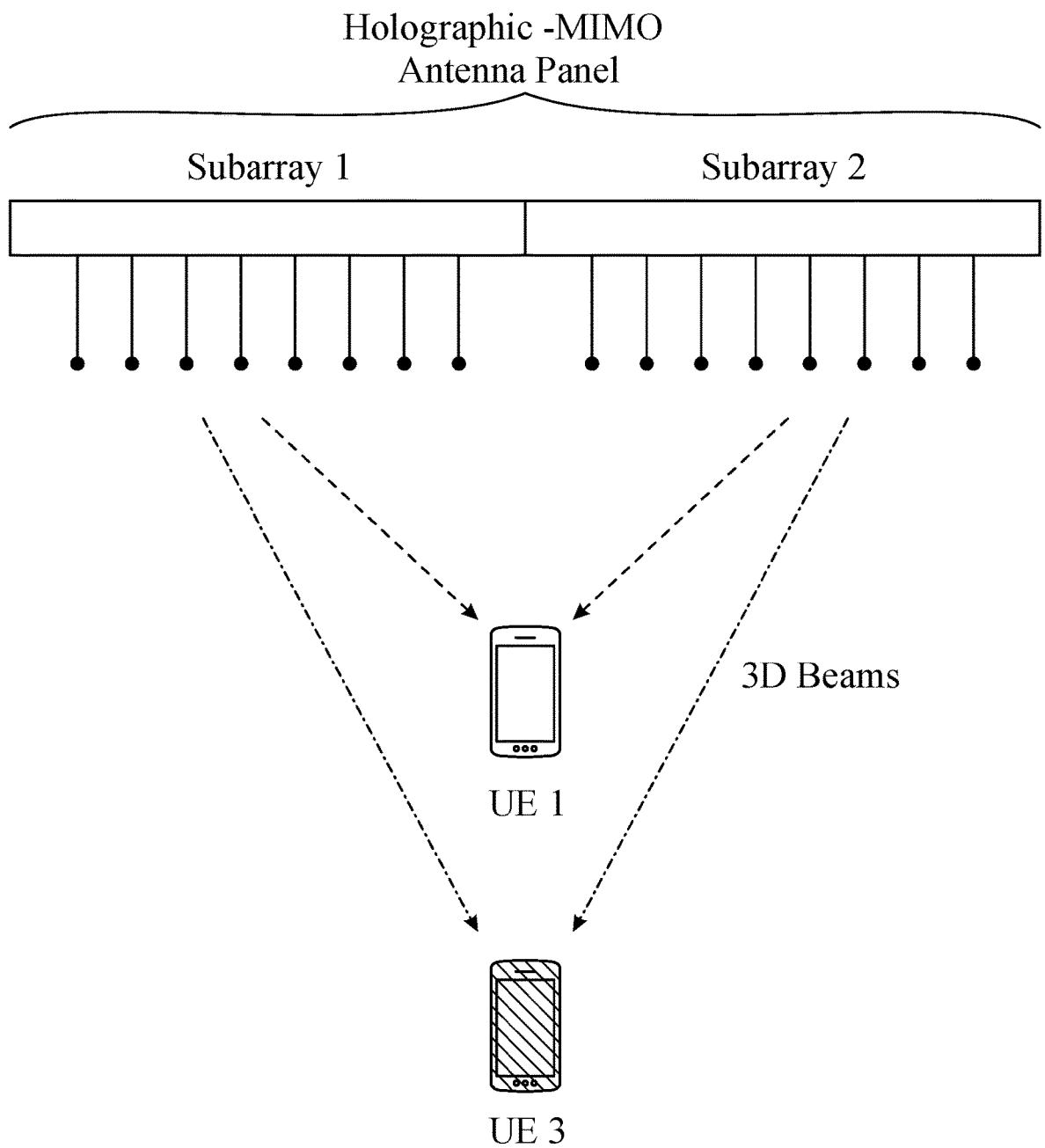
FIG. 23 illustrates an example holographic MU-MIMO transmission system based on flexible 2D/3D beamforming, in accordance with certain aspects of the present disclosure.

FIG. 23 illustrates an example holographic MU-MIMO transmission system based on flexible 2D/3D beamforming, allowing a base station to distinguish UEs at different distances in a same direction. The holographic MU-MIMO transmission system may include a holographic MIMO antenna panel, which may include multiple subarrays (such as subarray 1 and subarray 2). Each subarray may include small or medium number of antenna elements. UEs (such as UE 1 and UE 3) may locate in a near field of the holographic MIMO antenna panel.

The holographic MIMO antenna panel may generate 3D beams to pair these UEs, which are in a same direction. This may increase a possibility of UE pairing success rate, and therefore also increases a system throughput. Also, a beam of each UE may be unnecessarily transmitted from the whole holographic MIMO antenna panel. Accordingly, when beams of multiple UEs may be generated by different subarray groups of the holographic MIMO antenna panel, a combiner may not be unnecessary (or at least combiner complexity may be reduced). This may reduce overall hardware cost.

As noted above, holographic MU-MIMO transmission systems may present several challenges. For example, to enable a holographic MU-MIMO transmission, there may be a large number of choices/options for possible subarray partitioning (among UEs) and subarray grouping (for each UE). Therefore, if all possible subarray partitioning and subarray grouping results are tried using a conventional exhaustive beam sweeping, a whole timing latency and radio resource consumption may be very large.

Aspects of the present disclosure relate to a multi-user transmission technique, which may be implemented by a BS to determine subarray partitioning and subarray grouping to implement a holographic MU-MIMO transmission based on a report from a UE. For example, the BS may first determine subarray partition information (SPI) based on a subarray and beam selection report from UE, and then indicate the SPI to the UE. The UE may determine subarray grouping information (SGI) based on the SPI and then report the SGI to the BS. When the BS may sweep beams at different channel state information reference signal (CSI-RS) resource sets that are common to all UEs for multiple subarrays, the UE may then indicate a partition (allocation) of these CSI-RS resource sets to different UEs for beam determination.

FIG. 24 is a flow diagram illustrating example operations 2400 for wireless communication, in accordance with certain aspects of the present disclosure. The operations 2400 may be performed, for example, by a UE (e.g., such as the UE 120a in the wireless communication network 100 of FIG. 1). The operations 2400 may be implemented as software components that are executed and run on one or more processors (e.g., the controller/processor 280 of FIG. 2). Further, transmission and reception of signals by the UE in operations 2400 may be enabled, for example, by one or more antennas (e.g., the antennas 252 of FIG. 2). In certain aspects, the transmission and/or reception of signals by the UE may be implemented via a bus interface of one or more processors (e.g., the controller/processor 280) obtaining and/or outputting signals.

The operations 2400 begin, at 2402, by monitoring for first beam swept transmissions sent from multiple subarrays of a holographic MIMO antenna panel of a network entity. The UE monitors for the first beam swept transmissions using a processor of the UE 120a shown in FIG. 1 or FIG. 2 and/or of the apparatus shown in FIG. 40.

At 2404, the UE transmits a first report to the network entity indicating channel gains for one or more of the subarrays calculated based on the first beam swept transmissions. The UE transmits the first report using antenna(s) and transmitter/transceiver components of the UE 120a shown in FIG. 1 or FIG. 2 and/or of the apparatus shown in FIG. 40.

At 2406, the UE receives SPI from the network entity indicating one or more subarrays allocated to the UE based on the reported channel gains. The UE receives the SPI using antenna(s) and receiver/transceiver components of the UE 120a shown in FIG. 1 or FIG. 2 and/or of the apparatus shown in FIG. 40.

At 2408, the UE transmits a second report to the network entity indicating SGI determined based on the SPI. The UE transmits the second report using antenna(s) and transmitter/transceiver components of the UE 120a shown in FIG. 1 or FIG. 2 and/or of the apparatus shown in FIG. 40.

At 2410, the UE monitors for second beam swept transmissions sent from subarray groups based on the SGI indicated in the second report. The UE monitors for the second beam swept transmissions using a processor of the UE 120a shown in FIG. 1 or FIG. 2 and/or of the apparatus shown in FIG. 40.

At 2412, the UE transmits a third report indicating one or more beams selected for the subarray groups based on the second beam swept transmissions. The UE transmits the third report using antenna(s) and transmitter/transceiver components of the UE 120a shown in FIG. 1 or FIG. 2 and/or of the apparatus shown in FIG. 40.

FIG. 25 is a flow diagram illustrating example operations 2500 for wireless communication, in accordance with certain aspects of the present disclosure. The operations 2500 may be performed, for example, by a network entity (e.g., such as the BS 110a in the wireless communication network 100 of FIG. 1). The operations 2500 may be implemented as software components that are executed and run on one or more processors (e.g., the controller/processor 240 of FIG. 2). Further, transmission and reception of signals by the network entity in operations 2500 may be enabled, for example, by one or more antennas (e.g., the antennas 234 of FIG. 2). In certain aspects, the transmission and/or reception of signals by the network entity may be implemented via a bus interface of one or more processors (e.g., the controller/processor 240) obtaining and/or outputting signals.

The operations 2500 begin, at block 2502, by sending, to a UE, first beam swept transmissions from multiple subarrays of a holographic MIMO antenna panel of the network entity. The network entity sends the first beam swept transmissions using antenna(s) and transmitter/transceiver components of the BS 110a shown in FIG. 1 or FIG. 2 and/or of the apparatus shown in FIG. 41.

At 2504, the network entity receives a first report indicating channel gains for one or more of the subarrays calculated based on the first beam swept transmissions. The network entity receives the first report using antenna(s) and receiver/transceiver components of the BS 110a shown in FIG. 1 or FIG. 2 and/or of the apparatus shown in FIG. 41.

At 2506, the network entity sends SPI to the UE indicating one or more subarrays allocated to the UE based on the reported channel gains. The network entity sends the SPI using antenna(s) and transmitter/transceiver components of the BS 110a shown in FIG. 1 or FIG. 2 and/or of the apparatus shown in FIG. 41.

At 2508, the network entity receives a second report from the UE indicating SGI determined based on the SPI. The network entity receives the second report using antenna(s) and receiver/transceiver components of the BS 110a shown in FIG. 1 or FIG. 2 and/or of the apparatus shown in FIG. 41.

At 2510, the network entity sends second beam swept transmissions from subarray groups based on the SGI indicated in the second report. The network entity sends the second beam swept transmissions using antenna(s) and transmitter/transceiver components of the BS 110a shown in FIG. 1 or FIG. 2 and/or of the apparatus shown in FIG. 41.

At 2512, the network entity receives a third report indicating one or more beams selected for the subarray groups based on the second beam swept transmissions. The network entity receives the third report using antenna(s) and receiver/transceiver components of the BS 110a shown in FIG. 1 or FIG. 2 and/or of the apparatus shown in FIG. 41.

The operations shown in FIGS. 24 and 25 are further described with reference to FIGS. 26-31.

Figure 26:
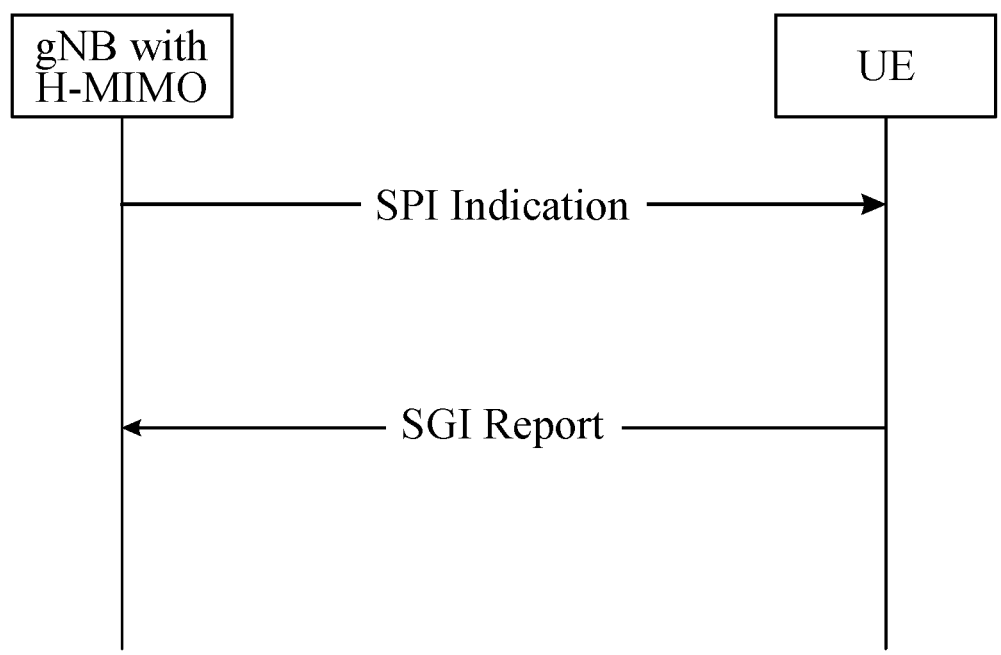
FIG. 26 is a call flow diagram illustrating example holographic MU-MIMO system, in accordance with certain aspects of the present disclosure.

As illustrated in FIG. 26, a network entity (gNB with a holographic MIMO antenna panel, e.g., such as the BS 110a in the wireless communication network 100 of FIG. 1) may send a SPI indication to a UE (e.g., such as the UE 120a in the wireless communication network 100 of FIG. 1). The UE may then generate and report SGI to the network entity.

Figure 27:
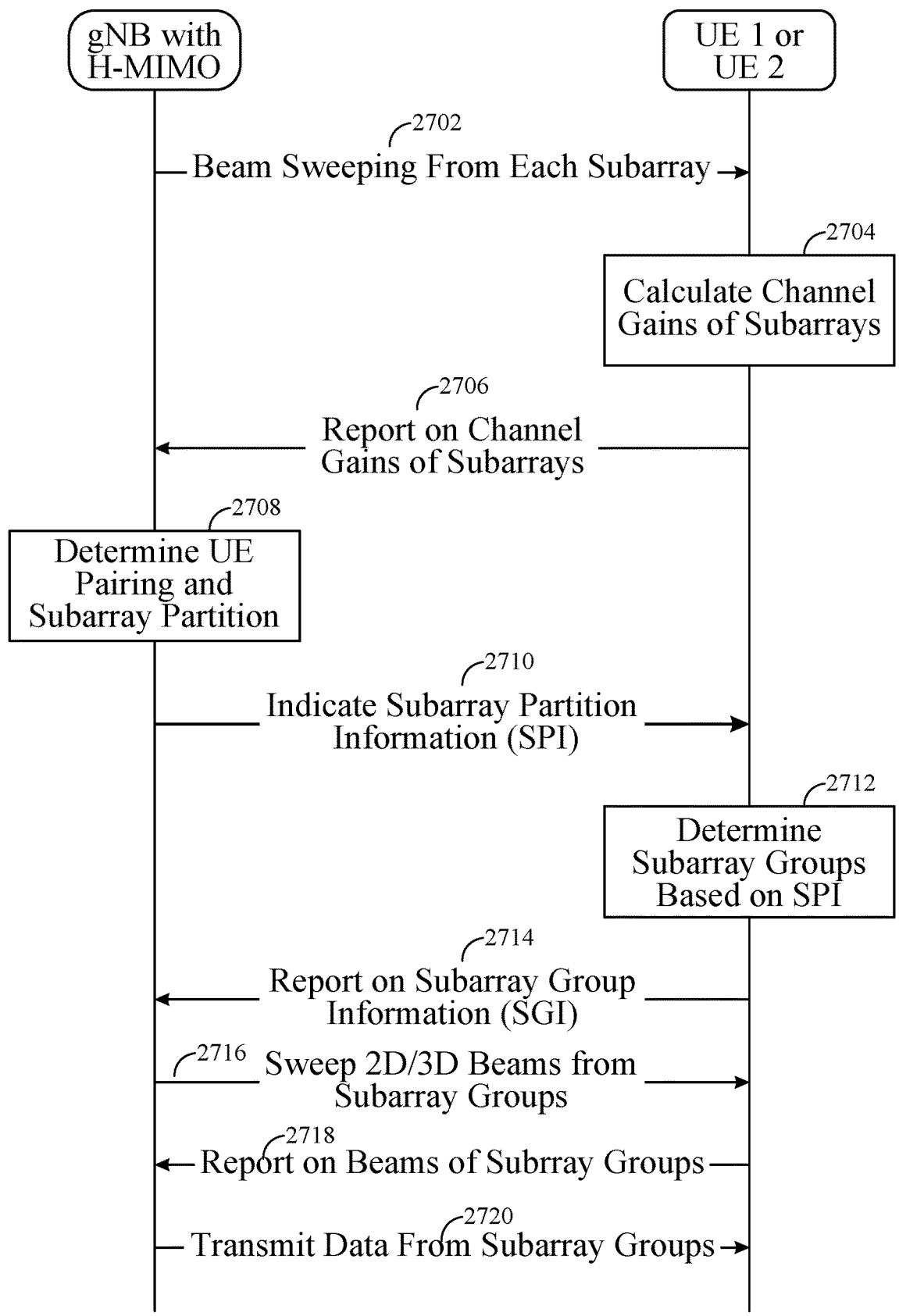
FIG. 27 is another call flow diagram illustrating example holographic MU-MIMO system, in accordance with certain aspects of the present disclosure.

As illustrated in FIG. 27, at 2702, a network entity (e.g., gNB) sends first beam swept transmissions from each of multiple subarrays of a holographic MIMO antenna panel of the network entity (i.e., beam sweeping from each subarray). One or more UEs (such as UE 1, UE 2, UE 3, etc.) may monitor for the first beam swept transmissions.

In certain aspects, the first beam swept transmissions may be synchronization signal blocks (SSBs) or channel state information reference signals (CSI-RSs) of each subarray. Each SSB or CSI-RS may be sent via different beams of each subarray. The CSI-RSs may be common to all UEs to reduce overall resource consumption.

In certain aspects, the subarrays of the holographic MIMO antenna panel may be indexed. The network entity may configure each UE with a number and a sequence of the subarrays that may be used for the first beam swept transmissions.

At 2704, the UE calculates channel gains for each subarray based on the first beam swept transmissions. In certain aspects, each subarray may sweep multiple beams corresponding to the first beam swept transmissions. The UE may calculate a largest channel gain corresponding to an optimal beam from each subarray. The UE may consider the calculated channel gain as a channel gain of the subarray.

Figure 28A:
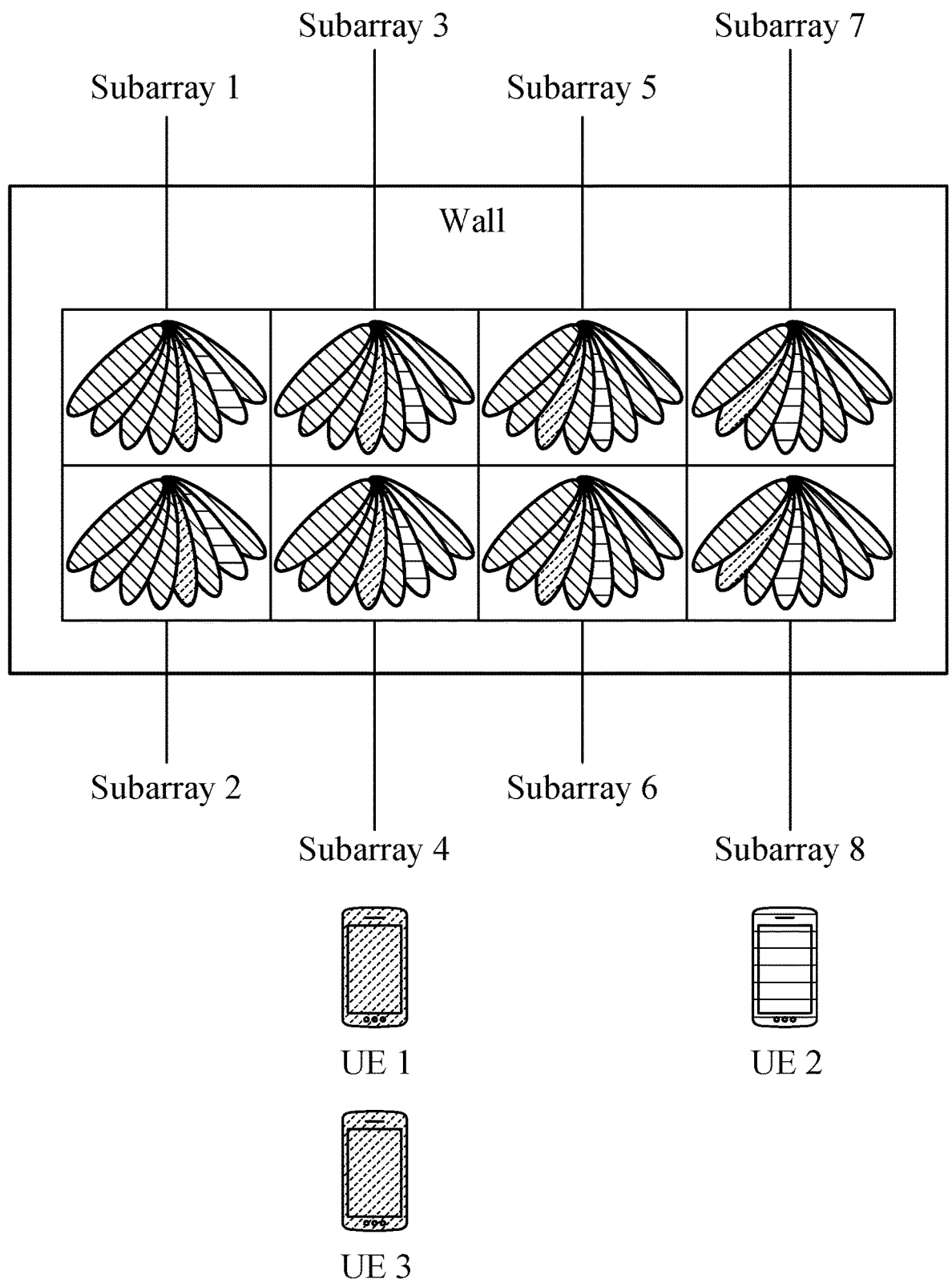
FIG. 28A illustrates example subarrays and UEs receiving beams from the subarrays, in accordance with certain aspects of the present disclosure.

In one example, as illustrated in FIG. 28A, each UE (i.e., UE 1, UE 2, and UE 3) may calculate channel gains of each subarray of 8 subarrays. In this example, UE 1 and UE 2 may have different optimal beams of each subarray. UE 1 and UE 3 may have a same optimal beam of each subarray.

At 2706, the UE sends a first report to the network entity indicating the channel gains of the subarrays. In certain aspects, each UE may indicate a channel status (i.e., the channel gains) of each subarray to the network entity. In one example, the UE may indicate the channel gain of each subarray individually to the network entity via the first report. In another example, the UE may indicate the channel gain of each subarray jointly (such as an absolute value and a list of relative values for each subarray) to the network entity via the first report.

In certain aspects, the UE may also indicate a corresponding optimal beam of each subarray (along with the channels gains of the subarrays) to the network entity. In certain aspects, the UE may determine an optimal subarray grouping result based on not only reference signal receive power (RSRP) values of each subarray (as illustrated in FIG. 28B), but also other factors such as a hardware implementation (i.e., Rx panels/beams) of the UE and suffered interference (in addition to the RSRP values). The network entity may use the RSRP values for subarray partitioning (i.e., SPI) but may not use them for subarray grouping (i.e., SGI).

At 2708, the network entity determines UE pairing and the SPI. In certain aspects, the network entity may pair UEs based on the reported channel gain in the first report. The network entity may then allocate the subarrays to each UE.

In one example case (of a holographic MIMO system without a combiner), the network entity may pair UEs whose preferred (e.g. with high RSRP) subarrays may be different (such as UE 1 and UE 2 in the example illustrated in FIG. 28A). In another example case (of the holographic MIMO system with the combiner), the network entity may pair UEs whose preferred subarrays may be same (such as UE 1 and UE 3 in the example illustrated in FIG. 28A).

Figure 29A:
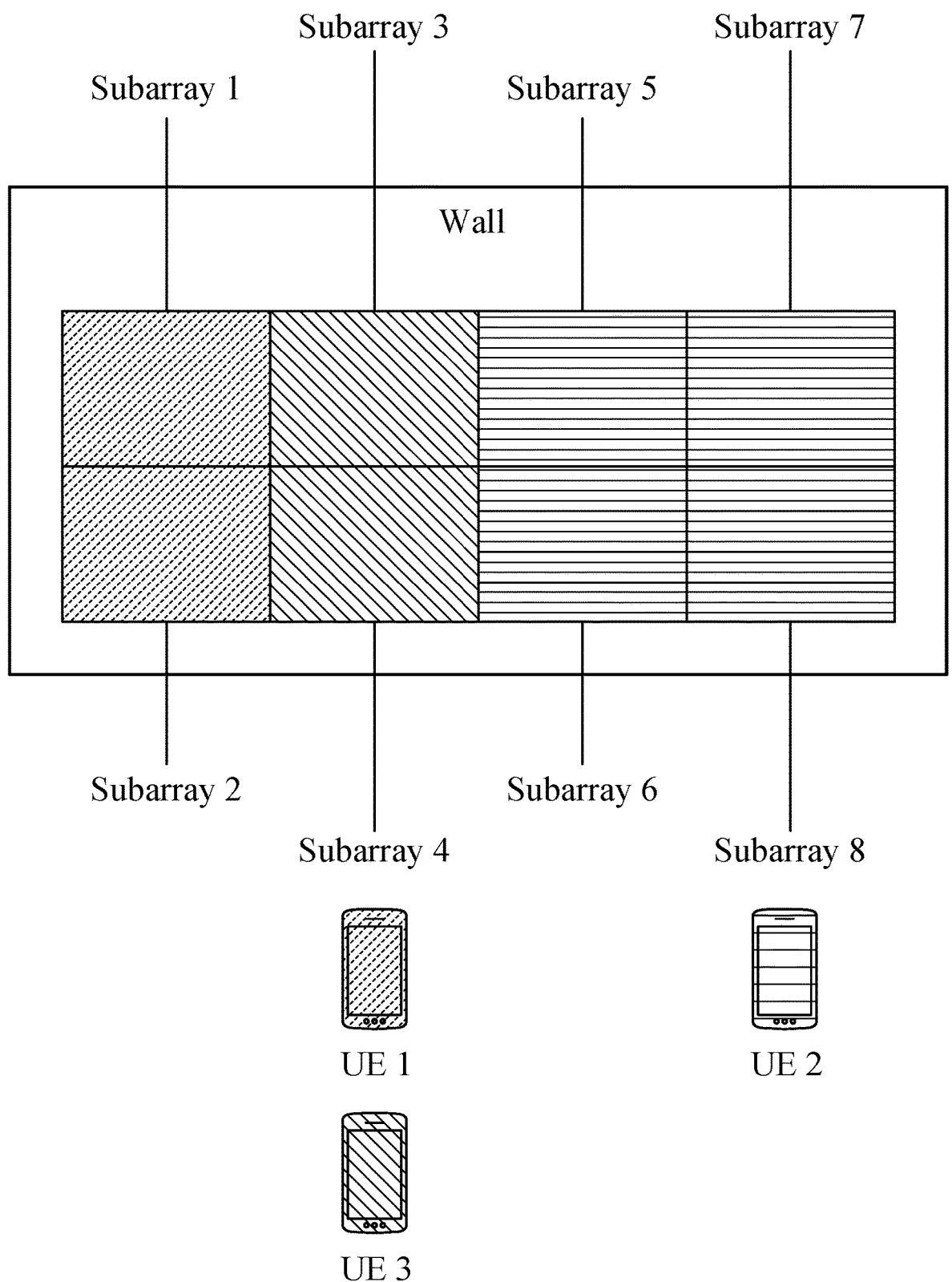
FIG. 29A illustrates example UE pairs based on channel gains for subarrays, in accordance with certain aspects of the present disclosure.

In certain aspects, when the holographic MIMO system is without the combiner, the SPI for multiple UEs may be different. For example, as illustrated in FIG. 29A, when UE 1, UE 2 and UE 3 may be paired, subarrays 1 to 2 may be allocated to UE 1, subarrays 3 to 4 may be allocated to UE 2, and subarrays 5 to 8 may be allocated to UE 3.

In certain aspects, when the holographic MIMO system is with the combiner, parts or all of the SPI for multiple UEs may be identical. For example, as illustrated in FIG. 29B, when UE 1, UE 2 and UE 3 may be paired, subarrays 1 to 4 may be allocated to UE1 and UE2 and subarrays 5 to 8 may be allocated to UE3.

At 2710, the network entity indicates the SPI to the UE. The SPI may indicate the one or more subarrays allocated to the UE.

In certain aspects, when the UE pairing is static, semi-static or dynamic, the network entity may send a message indicating the SPI to the UE via a radio resource control (RRC) signal, a medium access control-control element (MAC-CE) or a downlink control information (DCI).

In certain aspects, the network entity may send the message indicating the SPI via a dedicated signaling to each UE or a common signaling to all UEs. The common signaling forms may include a common DCI or a common MAC CE that may be addressed by a common radio network temporary identifier (RNTI).

In certain aspects, as noted above, the message indicating the SPI may be send via the dedicated signaling to a single UE. In this message, the SPI may indicate the one or more subarrays allocated to the UE. In one example, 1 bit indication (allocated or not allocated to the UE) may be given to each subarray. In another example, the allocated subarrays may be selected from m total subarrays and indexes of the allocated subarrays may be indicated to the UE. In some cases, the indexes of the allocated subarrays may be listed in a sequence. In some cases, the indexes of the allocated subarrays may be represented by a positive integer value n indicating a number of the allocated subarrays and a combinational value $C_m^n$ indicating a selecting result that may costs $\lceil \log_2 C_m^n \rceil$ bits where $C_m^n = m!/n!(m-n)!$ means a number of possibilities of choosing n from m.

In certain aspects, as noted above, the message indicating the SPI may be send via the common signaling to a group of paired UEs. In this message, the SPI may indicate how the subarrays are partitioned to all paired UEs. In some cases, each UE may be initially assigned with an ID, and in such cases, the SPI may indicate a UE ID of each subarray. In one example case (of the holographic MIMO system without the combiner), one UE ID indication may be given to each subarray (as illustrated in FIG. 30A). In another example case (of the holographic MIMO system regardless of the combiner), the one subarray list may be given to each UE (as illustrated in FIG. 30B).

In certain aspects, a transmit power by each subarray may be equal (e.g., for some hardware implementation or standard regulation). In one example case (of the holographic MIMO system with the combiner), when multiple data streams may be mixed at a certain subarray, the transmit power of each data stream may be a fraction of a regulated transmit power per subarray. Such transmit power information may be indicated in the SPI, which may be used by the UE to determine the SGI (or other beamforming related information).

In certain aspects, power split information may be indicated to the UE along with the SPI. In one example case (e.g., when the message indicating the SPI may be send via the dedicated signaling to the single UE), the message may also indicate the transmit power (e.g. full power, ½ power, ⅓ power, . . . ) of each indicated subarray in the SPI (in addition to the SPI). In another example case (e.g., when the message indicating the SPI may be send via the common signaling to the group of paired UEs), if the transmit power is evenly allocated to all the UEs that share a subarray, the UE may know the SPI to all UEs, so it may be unnecessary to additionally indicate the transmit power of each UE for the shared subarray to the UE. However, when the transmit power is not evenly allocated to all the UEs that may share the subarray, it may be necessary to additionally indicate to the UE the transmit power of each UE for the shared subarray.

Figure 31:
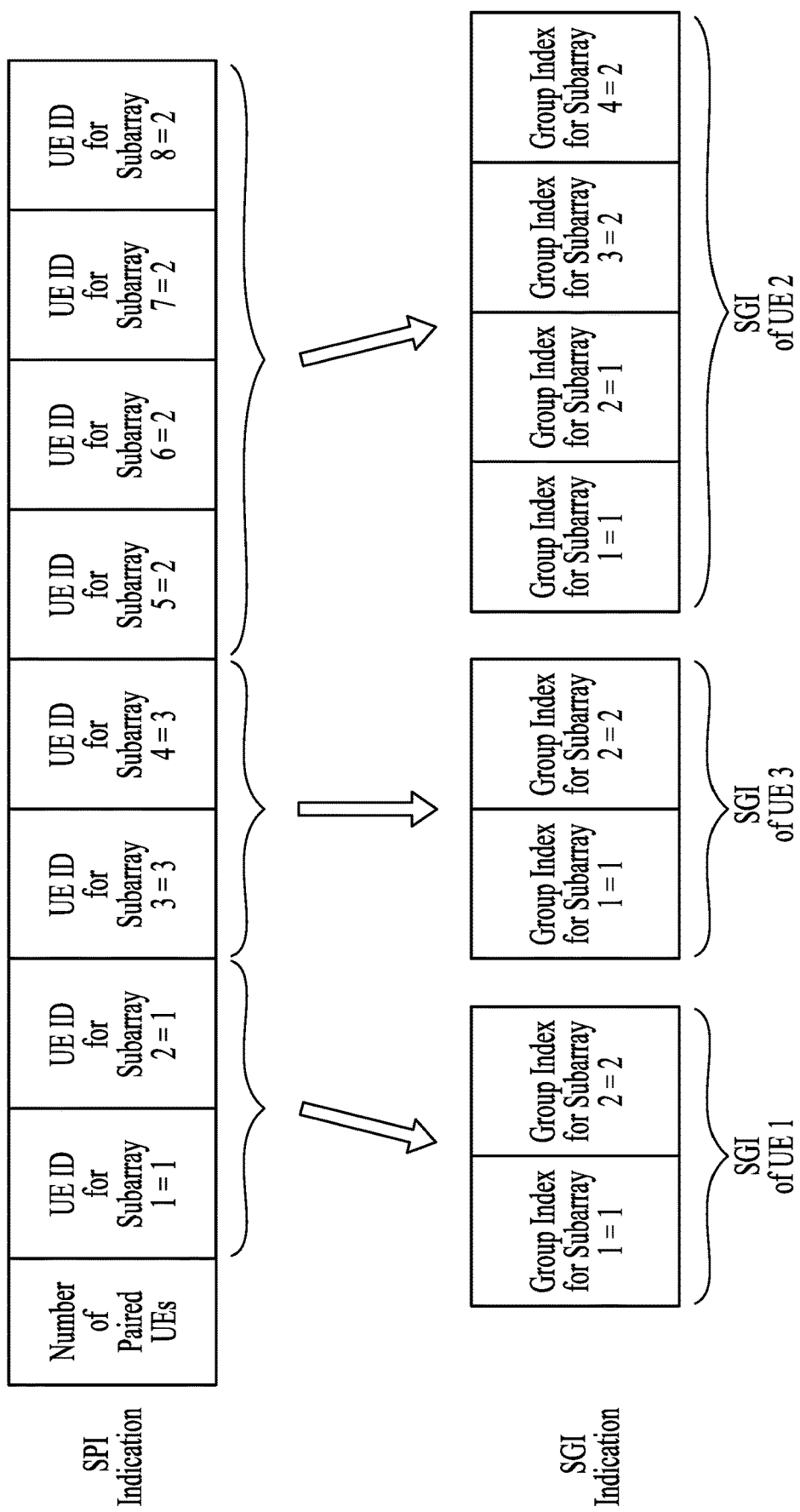
FIG. 31 illustrates an example SGI report based on SPI, in accordance with certain aspects of the present disclosure.

Returning to FIG. 27, at 2712, the UE determines the SGI for the subarrays that may be indicated by the SPI (as illustrated in FIG. 31). In one example case (of the holographic MIMO system without the combiner), each UE may have 2 Rx antennas (one polarization) or 4 Rx antennas (two polarization). In such a case, each UE may divide the allocated subarrays into two subarray groups.

At 2714, the UE sends a second report to the network entity indicating the SGI. At 2716, the network entity may send second beam swept transmissions from subarray groups based on the SGI. At 2718, the UE may send a third report indicating one or more beams selected for the subarray groups based on the second beam swept transmissions. At 2720, the network entity may send data via the reported one or more beams from the subarray groups.

A multi user transmission technique described herein may have several advantages. For example, the multi user transmission technique may avoid conventional exhaustive beam sweeping for determining SPI or SGI. Accordingly, this may greatly reduce a processing latency and a radio resource consumption. Also, by optimizing and indicating the SPI for simultaneous multi UE transmission, a sum data rate of a holographic MIMO system may be greatly improved. Furthermore, a BS may execute the multi user transmission technique to first send common CSI-RS to all UEs and then send messages to the UEs to indicate the SPI. This may reduce radio resource consumption and timing latency (in comparison to a conventional approach where the BS may send dedicated CSI-RS from a dedicated subset of subarrays to each UE).

Example Report on CSI Variance in Holographic MIMO System

In a holographic multiple input multiple output (MIMO) system, although 3D beams (as opposed to 2D beams) may concentrate transmission power in one spot area, the channel gain and received signal strength may fluctuate strongly around the spot area.

As illustrated in FIG. 32, when a user equipment (UE) is located close to holographic MIMO antenna panel (i.e., in a near field), the spot area may be an ellipsoid (with 2λ radius) in a plane parallel to the holographic MIMO antenna panel and about 80λ in the perpendicular direction. Since the holographic MIMO antenna panel may work at a high frequency spectrum (e.g., $f_{carrier}$=30 GHz, λ=0.01 meters; $f_{carrier}$=100 GHz, λ=3.3 mini-meters), the spot area may be very small. Also, when the UE may move around the spot area, it is quite often to pass or stay at a low channel status area.

Typically, when a UE sends a channel state information (CSI) report to a base station (BS), the channel gain and the received signal strength may be relatively steady in the CSI report, and thus the UE may only report an average value of the channel gain and the received signal strength. However, when the US is in the near field of the holographic MIMO antenna panel, even when the UE may move in a small area, the received signal strength may strongly fluctuate in the CSI report. Therefore, the average value of the received signal strength may not sufficiently represent a channel status. To address this issue, if the UE may report the CSI frequently (e.g., every minisecond) to the BS, a large overhead may significantly decrease a spectrum efficiency of a wireless system. However, when the BS may not have complete information on the channel status, the BS may make unsuitable beam management decisions, which may lead to a transmission failure or connection failure.

Aspects of the present disclosure relate to a technique, which may be implemented by a BS to flexibly determine a beam type (e.g., a 2D beam or a 3D beam) of a holographic MIMO antenna panel of the BS based on a report from a UE. For example, the UE may send the report indicating a channel status variance information (CSVI) to the BS, and the BS may then adjust between the 2D beam and the 3D beam based on the CSVI.

FIG. 33 is a flow diagram illustrating example operations 3300 for wireless communication, in accordance with certain aspects of the present disclosure. The operations 3300 may be performed, for example, by a UE (e.g., such as the UE 120a in the wireless communication network 100 of FIG. 1). The operations 3300 may be implemented as software components that are executed and run on one or more processors (e.g., the controller/processor 280 of FIG. 2). Further, transmission and reception of signals by the UE in operations 3300 may be enabled, for example, by one or more antennas (e.g., the antennas 252 of FIG. 2). In certain aspects, the transmission and/or reception of signals by the UE may be implemented via a bus interface of one or more processors (e.g., the controller/processor 280) obtaining and/or outputting signals.

The operations 3300 begin, at 3302, by receiving, from a network entity, a configuration for reporting CSVI. The UE receives the configuration using antenna(s) and receiver/transceiver components of the UE 120a shown in FIG. 1 or FIG. 2 and/or of the apparatus shown in FIG. 42.

At 3304, the UE monitors for one or more transmissions sent from a holographic MIMO antenna panel of the network entity. The UE monitors the one or more transmissions using a processor of the UE 120a shown in FIG. 1 or FIG. 2 and/or of the apparatus shown in FIG. 42.

At 3306, the UE transmits a report including the CSVI to the network entity, in accordance with the configuration. The CSVI indicates a variance relative to one or more CSI metrics. The UE transmits the CSVI using antenna(s) and transmitter/transceiver components of the UE 120a shown in FIG. 1 or FIG. 2 and/or of the apparatus shown in FIG. 42.

FIG. 34 is a flow diagram illustrating example operations 3400 for wireless communication, in accordance with certain aspects of the present disclosure. The operations 3400 may be performed, for example, by a network entity (e.g., such as the BS 110a in the wireless communication network 100 of FIG. 1). The operations 3400 may be implemented as software components that are executed and run on one or more processors (e.g., the controller/processor 240 of FIG. 2). Further, transmission and reception of signals by the network entity in operations 3400 may be enabled, for example, by one or more antennas (e.g., the antennas 234 of FIG. 2). In certain aspects, the transmission and/or reception of signals by the network entity may be implemented via a bus interface of one or more processors (e.g., the controller/processor 240) obtaining and/or outputting signals.

The operations 3400 begin, at block 3402, by sending a UE a configuration for reporting CSVI. The network entity sends the configuration using antenna(s) and transmitter/transceiver components of the BS 110a shown in FIG. 1 or FIG. 2 and/or of the apparatus shown in FIG. 43.

At 3404, the network entity sends one or more transmissions to the UE from a holographic MIMO antenna panel of the network entity. The network entity sends the one or more transmissions using antenna(s) and transmitter/transceiver components of the BS 110*a* shown in FIG. 1 or FIG. 2 and/or of the apparatus shown in FIG. 43.

At 3406, the network entity receives from the UE a report including the CSVI to the network entity, in accordance with the configuration. The CSVI indicates a variance relative to one or more CSI metrics. The network entity receives the report using antenna(s) and receiver/transceiver components of the BS 110*a* shown in FIG. 1 or FIG. 2 and/or of the apparatus shown in FIG. 43.

The operations shown in FIGS. 33 and 34 are further described with reference to FIGS. 35-37.

Figure 35:
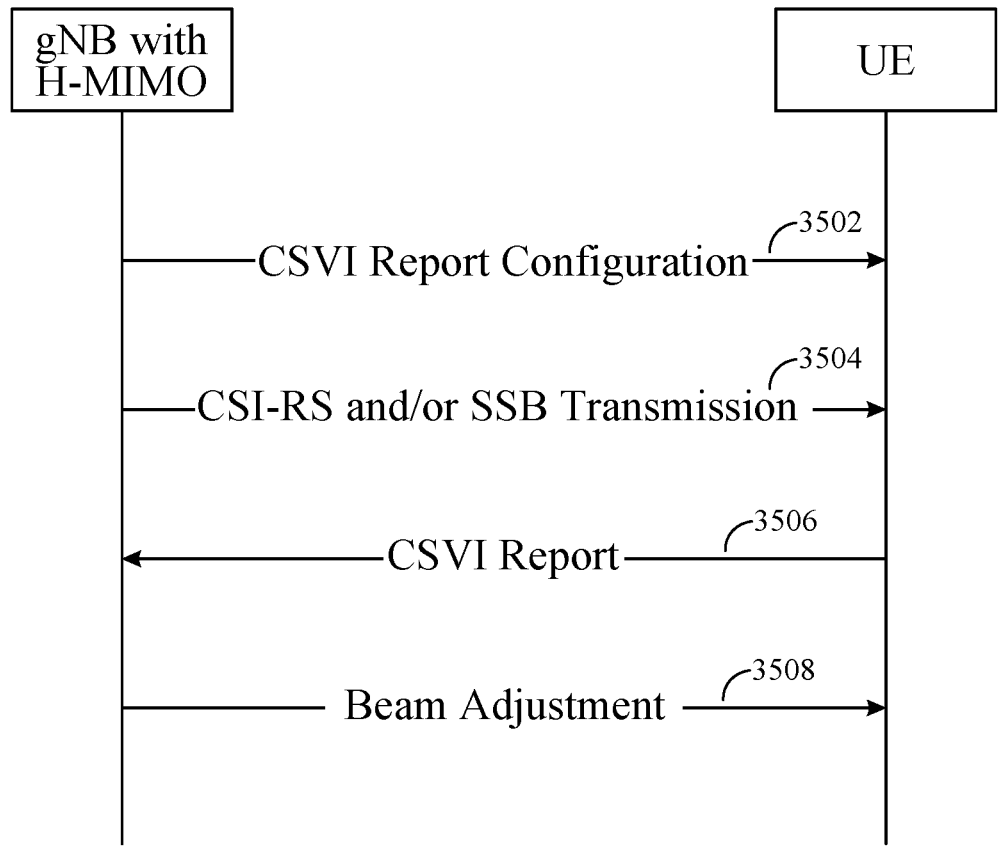
FIG. 35 is a call flow diagram illustrating example CSVI reporting in holographic MIMO system, in accordance with certain aspects of the present disclosure.

As illustrated in FIG. 35, at 3502, a network entity (gNB with a holographic MIMO antenna panel, e.g., such as the BS 110*a* in the wireless communication network 100 of FIG. 1) sends via a holographic MIMO antenna panel a message indicating a configuration for reporting CSVI to a UE (e.g., such as the UE 120*a* in the wireless communication network 100 of FIG. 1).

In certain aspects, the configuration for reporting the CSVI may indicate the UE to report CSI quantities including a variance relative to one or more CSI metrics. The one or more CSI metrics may include a physical layer (L1) reference signal receive power (RSRP) value and/or L1 signal to interference and noise ratio (SINR) value. The message may be sent via a radio resource control (RRC) signal, a medium access control-control element (MAC-CE), or a downlink control information (DCI).

At 3504, the network entity sends channel state information reference signal (CSI-RS) and synchronization signal block (SSB) transmissions to the UE.

In certain aspects, to enable the UE to measure the CSI variance value, the network entity may configure the UE with multiple CSI-RS or SSB transmissions and at least one CSI report. In one example, the network entity may configure the UE with periodic or semi-persistent CSI-RS resources. The UE may then calculate the CSI variance value based on the received signals associated with the CSI-RS transmissions. A period of the CSI-RS resources may be smaller than (e.g. a fraction of) a period of CSI reports. In some cases, when the network entity may configure the UE with one CSI report per CSI-RS resource, an uplink (UL) control channel overhead may be too high to impact on a downlink (DL) data channel resource and the DL throughput.

At 3506, the UE sends a report indicating the CSVI to the network entity in accordance with the configuration. The CSVI may indicate the CSI variance values relative to the one or more CSI metrics.

In certain aspects, the UE may calculate the CSI variance values based on statistics of all measured/calculated values in a CSI measurement period (e.g., a duration between sending two CSI reports to the network entity). In one example, when the measured/calculated L1-RSRP values or L1-SINR values may be $\{x_1, x_2, \ldots, x_N\}$, then a mean value may be $$\mu_x = \frac{1}{N}\sum_{n=1}^{N} x_n$$

and a variance value may be $$\rho_x = \sqrt{\frac{1}{N}\sum_{n=1}^{N}(x_n - \mu_x)^2}.$$

In certain aspects, the UE may quantize the CSI variance values based on a quantization rule, and then send the report indicating the quantized CSI variance values. The quantization rule may be indicated in the configuration for reporting the CSVI. In one example, a variance of L1 RSRP values may be quantized as a 7-bit value in a range [−140, −44] dBm with 1 dB step size. In another example, a variance of L1 SINR values may be quantized as a 7-bit value in a range [−23, 40] dB with 0.5 dB step size.

At 3508, the network entity determines beam management based on the CSVI. For example, the network entity may adjust the beam via the holographic MIMO antenna panel between a 2D beam and a 3D beam.

As illustrated in FIG. 36, when the network entity may determine based on the CSVI that the L1 RSRP or L1 SINR variance value may be larger than a first threshold, the network entity may then recognize that the UE is moving in relation to the holographic MIMO antenna panel and passing a weak-strength spot area. The network entity may then change the beam of the holographic MIMO antenna panel from the 3D beam to the 2D beam. The network entity may change from the 3D beam to the 2D beam by decreasing a size of used holographic MIMO antenna panel (e.g., by transmitting beams from a smaller part of antenna elements (e.g., a subarray) of the holographic MIMO antenna).

Figure 37:
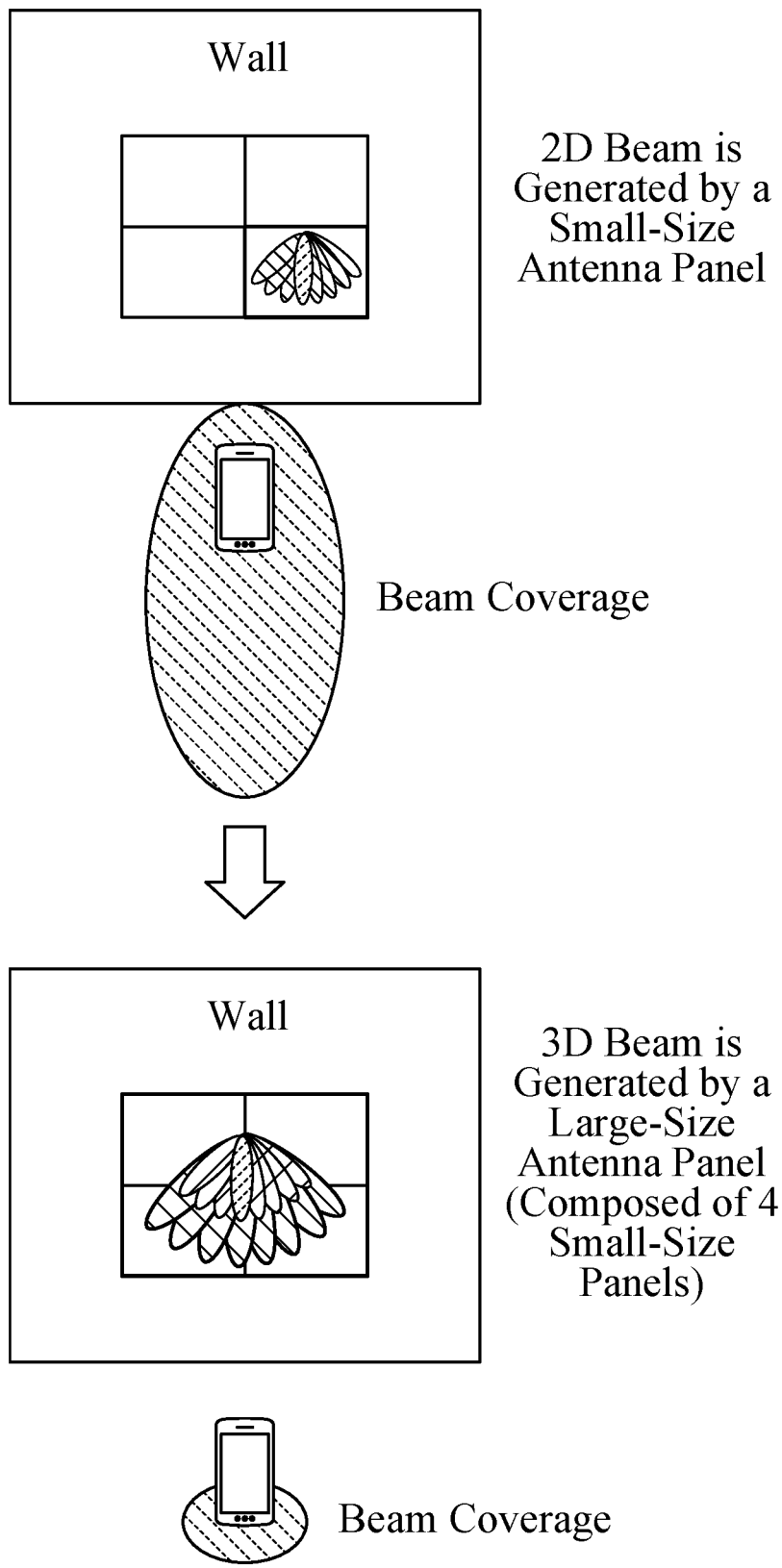
FIG. 37 illustrates example beam management to change from 2D beam to 3D beam based on a CSVI report, in accordance with certain aspects of the present disclosure.

As illustrated in FIG. 37, when the network entity may determine based on the CSVI that the L1 RSRP or L1 SINR variance value may be smaller than a second threshold, the network entity may then recognize that the UE is slowly moving (or not moving) in relation to the holographic MIMO antenna panel and there is no chance of the UE passing a weak-strength spot area. The network entity may then change the beam of the holographic MIMO antenna panel from the 2D beam to the 3D beam. The network entity may change from the 2D beam to the 3D beam by increasing a size of used holographic MIMO antenna panel (e.g., by transmitting beams from a larger part of antenna elements (e.g., the whole) of the holographic MIMO antenna).

In certain aspects, the network entity may transmit to the UE an indication of the beam adjustment. The network entity may then communicate with the UE in accordance with the indicated beam adjustment.

A technique described herein, which may enable a network entity to flexibly determine a beam type of its holographic MIMO antenna panel may have several advantages. In one example, when a UE may be moving fast in relation to the holographic MIMO antenna panel, the network entity may prefer a 2D beam, which may lead to a steadier channel status. This may also avoid a data transfer failure or connection failure. In another example, when the UE may be moving slowly or be in a static position in relation to the holographic MIMO antenna panel, the network entity may prefer a 3D beam, which may lead to a higher channel gain and a higher data transfer throughput.

Figure 38:
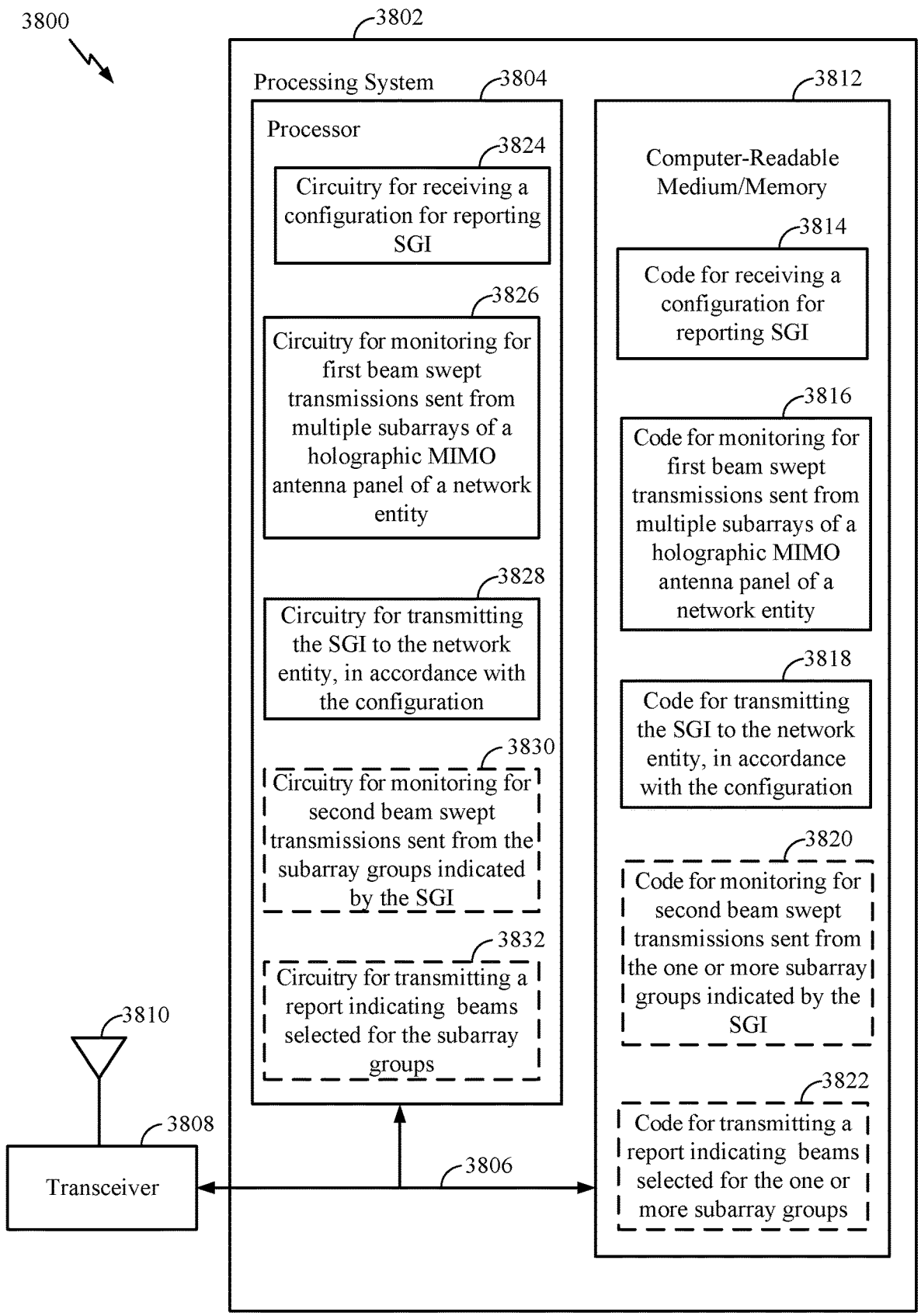
FIG. 38 illustrates a communications device that may include various components configured to perform operations for techniques disclosed herein, in accordance with certain aspects of the present disclosure.

Furthermore, a network entity is able to more accurately adjust a beam type of its holographic MIMO antenna panel based on CSVI instead of a report of movement speed of UE. This is because the network entity may not know a position or a movement trace of UE based on the movement speed of the UE, and thus the network entity may not have complete and accurate information related to the UE to determine required beam type adjustment. In comparison, the CSVI is a direct consequence of a beam coverage area size as well as the position or the movement trace of the UE. Accordingly, the network entity may have sufficient accurate information related to the UE based on the CSVI to determine the required beam type adjustment FIG. 38 illustrates a communications device 3800 that may include various components (e.g., corresponding to means-plus-function components) configured to perform operations for the techniques disclosed herein, such as the operations illustrated in FIG. 13. The communications device 3800 includes a processing system 3802 coupled to a transceiver 3808 (e.g., a transmitter and/or a receiver). The transceiver 3808 is configured to transmit and receive signals for the communications device 3800 via an antenna 3810, such as the various signals as described herein. The processing system 3802 is configured to perform processing functions for the communications device 3800, including processing signals received and/or to be transmitted by the communications device 3800.

The processing system 3802 includes a processor 3804 coupled to a computer-readable medium/memory 3812 via a bus 3806. In certain aspects, the computer-readable medium/memory 3812 is configured to store instructions (e.g., computer-executable code) that when executed by the processor 3804, cause the processor 3804 to perform the operations illustrated in FIG. 13, or other operations for performing the various techniques discussed herein. In certain aspects, computer-readable medium/memory 3812 stores code 3814 for receiving, code 3816 for monitoring, code 3818 for transmitting, code 3820 for monitoring, and code 3822 for transmitting. The code 3814 for receiving may include code for receiving a configuration for reporting SGI. The code 3816 for monitoring may include code for monitoring for first beam swept transmissions sent from multiple subarrays of a holographic MIMO antenna panel of a network entity. The code 3818 for transmitting may include code for transmitting the SGI to the network entity, in accordance with the configuration where the SGI indicates one or more subarray groups determined based on the first beam swept transmissions. The code 3820 for monitoring may include code for monitoring for second beam swept transmissions sent from the one or more subarray groups indicated by the SGI. The code 3822 for transmitting may include code for transmitting a report indicating one or more beams selected for the one or more subarray groups based on the second beam swept transmissions.

The processor 3814 may include circuitry configured to implement the code stored in the computer-readable medium/memory 3812, such as for performing the operations illustrated in FIG. 13, as well as other operations for performing the various techniques discussed herein. For example, the processor 3804 includes circuitry 3824 for receiving, circuitry 3826 for monitoring, circuitry 3828 for transmitting, circuitry 3830 for monitoring, and circuitry 3832 for transmitting. The circuitry 3824 for receiving may include circuitry for receiving a configuration for reporting SGI. The circuitry 3826 for monitoring may include circuitry for monitoring for first beam swept transmissions sent from multiple subarrays of a holographic MIMO antenna panel of a network entity. The circuitry 3828 for transmitting may include circuitry for transmitting the SGI to the network entity, in accordance with the configuration where the SGI indicates one or more subarray groups determined based on the first beam swept transmissions. The circuitry 3830 for monitoring may include circuitry for monitoring for second beam swept transmissions sent from the one or more subarray groups indicated by the SGI. The circuitry 3832 for transmitting may include circuitry for transmitting a report indicating one or more beams selected for the one or more subarray groups based on the second beam swept transmissions.

FIG. 39 illustrates a communications device 3900 that may include various components (e.g., corresponding to means-plus-function components) configured to perform operations for the techniques disclosed herein, such as the operations illustrated in FIG. 14. The communications device 3900 includes a processing system 3902 coupled to a transceiver 3908 (e.g., a transmitter and/or a receiver). The transceiver 3908 is configured to transmit and receive signals for the communications device 3900 via an antenna 3910, such as the various signals as described herein. The processing system 3902 is configured to perform processing functions for the communications device 3900, including processing signals received and/or to be transmitted by the communications device 3900.

The processing system 3902 includes a processor 3904 coupled to a computer-readable medium/memory 3912 via a bus 3906. In certain aspects, the computer-readable medium/memory 3912 is configured to store instructions (e.g., computer-executable code) that when executed by the processor 3904, cause the processor 3804 to perform the operations illustrated in FIG. 14, or other operations for performing the various techniques discussed herein. In certain aspects, computer-readable medium/memory 3912 stores code 3914 for sending, code 3916 for sending, code 3918 for receiving, code 3920 for sending, and code 3922 for receiving. The code 3914 for sending may include code for sending to a UE a configuration for reporting SGI. The code 3916 for sending may include code for sending first beam swept transmissions from multiple subarrays of a holographic MIMO antenna panel of the network entity. The code 3918 for receiving may include code for receiving the SGI from the UE where the SGI indicates one or more subarray groups determined based on the first beam swept transmissions. The code 3920 for sending may include code for sending second beam swept transmissions from the subarray groups indicated by the SGI. The code 3922 for receiving may include code for receiving a report from the UE indicating one or more beams selected for the subarray groups based on the second beam swept transmissions.

The processor 3914 may include circuitry configured to implement the code stored in the computer-readable medium/memory 3912, such as for performing the operations illustrated in FIG. 14, as well as other operations for performing the various techniques discussed herein. For example, the processor 3904 includes circuitry 3924 for sending, circuitry 3926 for sending, circuitry 3928 for receiving, circuitry 3930 for sending, and circuitry 3932 for receiving. The circuitry 3924 for sending may include circuitry for sending to a UE a configuration for reporting SGI. The circuitry 3926 for sending may include circuitry for sending first beam swept transmissions from multiple subarrays of a holographic MIMO antenna panel of the network entity. The circuitry 3928 for receiving may include circuitry for receiving the SGI from the UE where the SGI indicates one or more subarray groups determined based on the first beam swept transmissions. The circuitry 3930 for sending may include circuitry for sending second beam swept transmissions from the subarray groups indicated by the SGI. The circuitry 3932 for receiving may include circuitry for receiving a report from the UE indicating one or more beams selected for the subarray groups based on the second beam swept transmissions.

Figure 40:
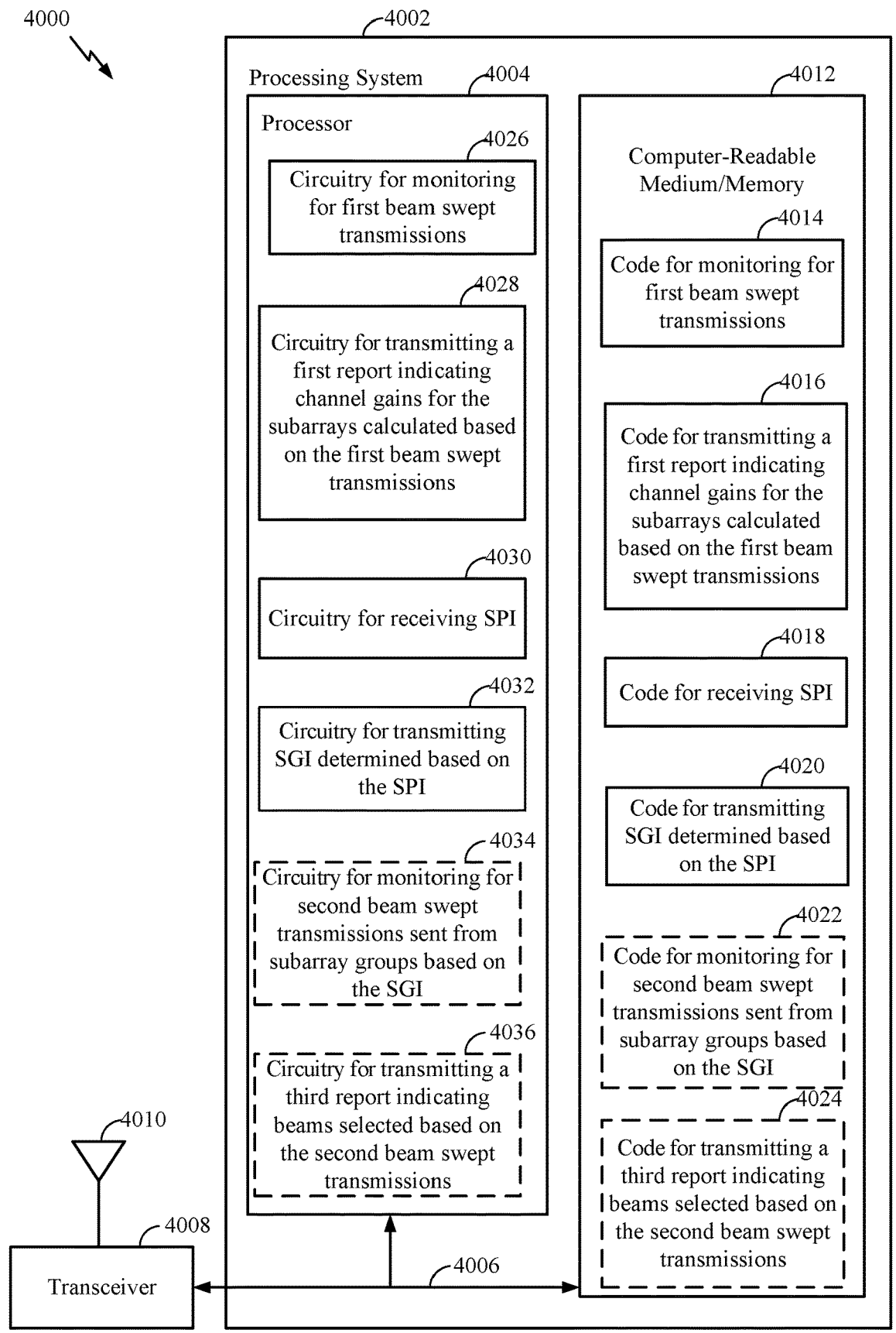
FIG. 40 illustrates a communications device that may include various components configured to perform operations for techniques disclosed herein, in accordance with certain aspects of the present disclosure.

FIG. 40 illustrates a communications device 4000 that may include various components (e.g., corresponding to means-plus-function components) configured to perform operations for the techniques disclosed herein, such as the operations illustrated in FIG. 24. The communications device 4000 includes a processing system 4002 coupled to a transceiver 4008 (e.g., a transmitter and/or a receiver). The transceiver 4008 is configured to transmit and receive signals for the communications device 4000 via an antenna 4010, such as the various signals as described herein. The processing system 4002 is configured to perform processing functions for the communications device 4000, including processing signals received and/or to be transmitted by the communications device 4000.

The processing system 4002 includes a processor 4004 coupled to a computer-readable medium/memory 4012 via a bus 4006. In certain aspects, the computer-readable medium/memory 4012 is configured to store instructions (e.g., computer-executable code) that when executed by the processor 4004, cause the processor 4004 to perform the operations illustrated in FIG. 24, or other operations for performing the various techniques discussed herein. In certain aspects, computer-readable medium/memory 4012 stores code 4014 for monitoring, code 4016 for transmitting, code 4018 for receiving, code 4020 for transmitting, code 4022 for monitoring, and code 4024 for transmitting. The code 4014 for monitoring may include code for monitoring for first beam swept transmissions sent from multiple subarrays of a holographic MIMO antenna panel of a network entity. The code 4016 for transmitting may include code for transmitting a first report to the network entity indicating channel gains for one or more of the subarrays calculated based on the first beam swept transmissions. The code 4018 for receiving may include code for receiving SPI from the network entity indicating one or more subarrays allocated to the UE based on the reported channel gains. The code 4020 for transmitting may include code for transmitting a second report to the network entity indicating SGI determined based on the SPI. The code 4022 for monitoring may include code for monitoring for second beam swept transmissions sent from subarray groups based on the SGI indicated in the second report. The code 4024 for transmitting may include code for transmitting a third report indicating one or more beams selected for the subarray groups based on the second beam swept transmissions.

The processor 4014 may include circuitry configured to implement the code stored in the computer-readable medium/memory 4012, such as for performing the operations illustrated in FIG. 24, as well as other operations for performing the various techniques discussed herein. For example, the processor 4004 includes circuitry 4026 for monitoring, circuitry 4028 for transmitting, circuitry 4030 for receiving, circuitry 4032 for transmitting, circuitry 4034 for monitoring, and circuitry 4036 for transmitting. The circuitry 4026 for monitoring may include circuitry for monitoring for first beam swept transmissions sent from multiple subarrays of a holographic MIMO antenna panel of a network entity. The circuitry 4028 for transmitting may include circuitry for transmitting a first report to the network entity indicating channel gains for one or more of the subarrays calculated based on the first beam swept transmissions. The circuitry 4030 for receiving may include circuitry for receiving SPI from the network entity indicating one or more subarrays allocated to the UE based on the reported channel gains. The circuitry 4032 for transmitting may include circuitry for transmitting a second report to the network entity indicating SGI determined based on the SPI. The circuitry 4034 for monitoring may include circuitry for monitoring for second beam swept transmissions sent from subarray groups based on the SGI indicated in the second report. The circuitry 4036 for transmitting may include circuitry for transmitting a third report indicating one or more beams selected for the subarray groups based on the second beam swept transmissions.

Figure 41:
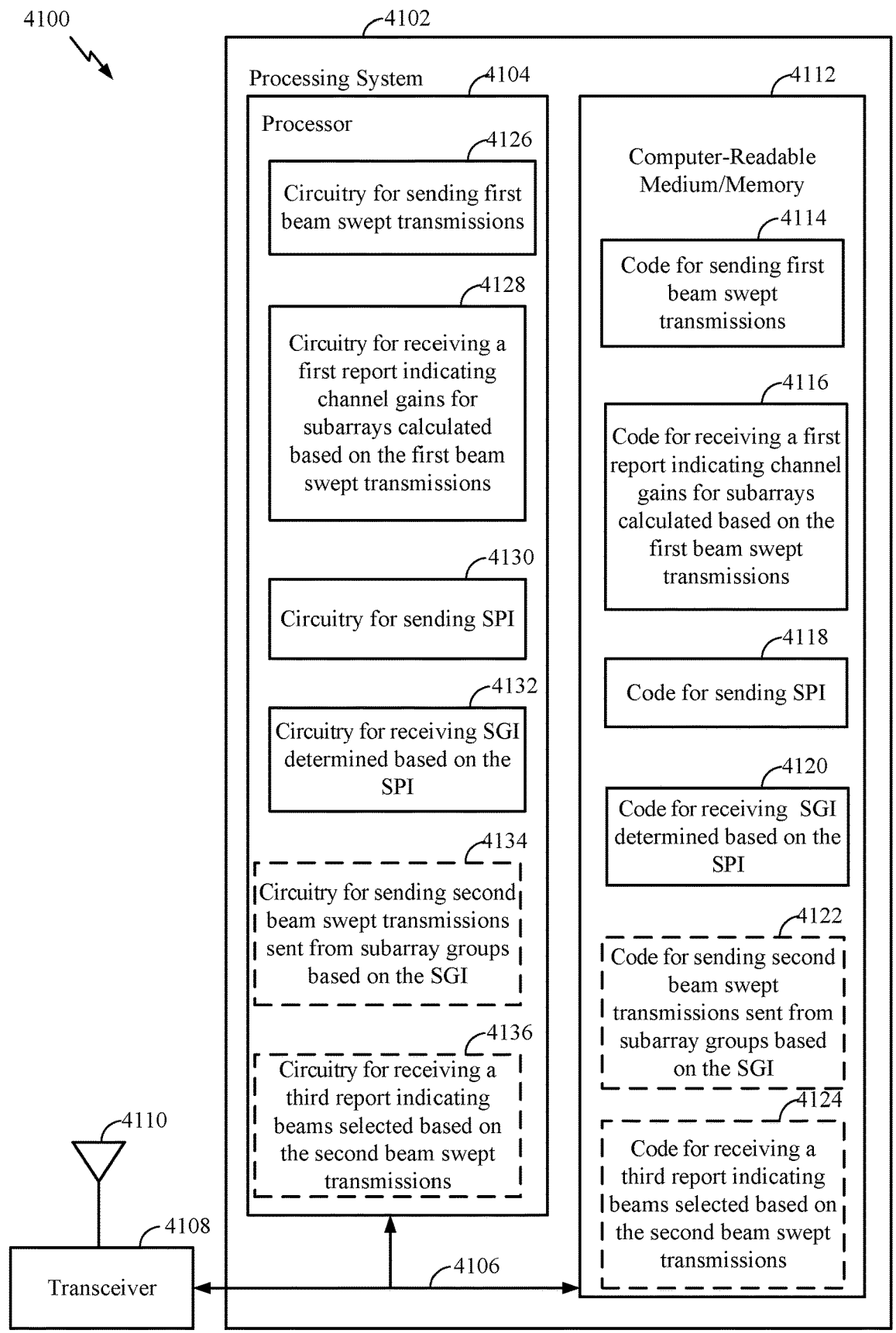
FIG. 41 illustrates a communications device that may include various components configured to perform operations for techniques disclosed herein, in accordance with certain aspects of the present disclosure.

FIG. 41 illustrates a communications device 4100 that may include various components (e.g., corresponding to means-plus-function components) configured to perform operations for the techniques disclosed herein, such as the operations illustrated in FIG. 25. The communications device 4100 includes a processing system 4102 coupled to a transceiver 4108 (e.g., a transmitter and/or a receiver). The transceiver 4108 is configured to transmit and receive signals for the communications device 4100 via an antenna 4110, such as the various signals as described herein. The processing system 4102 is configured to perform processing functions for the communications device 4100, including processing signals received and/or to be transmitted by the communications device 4100.

The processing system 4102 includes a processor 4104 coupled to a computer-readable medium/memory 4112 via a bus 4106. In certain aspects, the computer-readable medium/memory 4112 is configured to store instructions (e.g., computer-executable code) that when executed by the processor 4104, cause the processor 4104 to perform the operations illustrated in FIG. 25, or other operations for performing the various techniques discussed herein. In certain aspects, computer-readable medium/memory 4112 stores code 4114 for sending, code 4116 for receiving, code 4118 for sending, code 4120 for receiving, code 4122 for sending, and code 4124 for receiving. The code 4114 for sending may include code for sending to a UE first beam swept transmissions from multiple subarrays of a holographic MIMO antenna panel of the network entity. The code 4116 for receiving may include code for receiving from the UE a first report indicating channel gains for one or more of the subarrays calculated based on the first beam swept transmissions. The code 4118 for sending may include code for sending SPI to the UE indicating one or more subarrays allocated to the UE based on the reported channel gains. The code 4120 for receiving may include code for receiving a second report from the UE indicating SGI determined based on the SPI. The code 4122 for sending may include code for sending second beam swept transmissions from subarray groups based on the SGI indicated in the second report. The code 4124 for receiving may include code for receiving from the UE a third report indicating one or more beams selected for the subarray groups based on the second beam swept transmissions.

The processor 4114 may include circuitry configured to implement the code stored in the computer-readable medium/memory 4112, such as for performing the operations illustrated in FIG. 25, as well as other operations for performing the various techniques discussed herein. For example, the processor 4104 includes circuitry 4126 for sending, circuitry 4128 for receiving, circuitry 4130 for sending, circuitry 4132 for receiving, circuitry 4134 for sending, and circuitry 4136 for receiving. The circuitry 4126 for sending may include circuitry for sending to a UE first beam swept transmissions from multiple subarrays of a holographic MIMO antenna panel of the network entity. The circuitry 4128 for receiving may include circuitry for receiving from the UE a first report indicating channel gains for one or more of the subarrays calculated based on the first beam swept transmissions. The circuitry 4130 for sending may include circuitry for sending SPI to the UE indicating one or more subarrays allocated to the UE based on the reported channel gains. The circuitry 4132 for receiving may include circuitry for receiving a second report from the UE indicating SGI determined based on the SPI. The circuitry 4134 for sending may include circuitry for sending second beam swept transmissions from subarray groups based on the SGI indicated in the second report. The circuitry 4136 for receiving may include circuitry for receiving from the UE a third report indicating one or more beams selected for the subarray groups based on the second beam swept transmissions.

Figure 42:
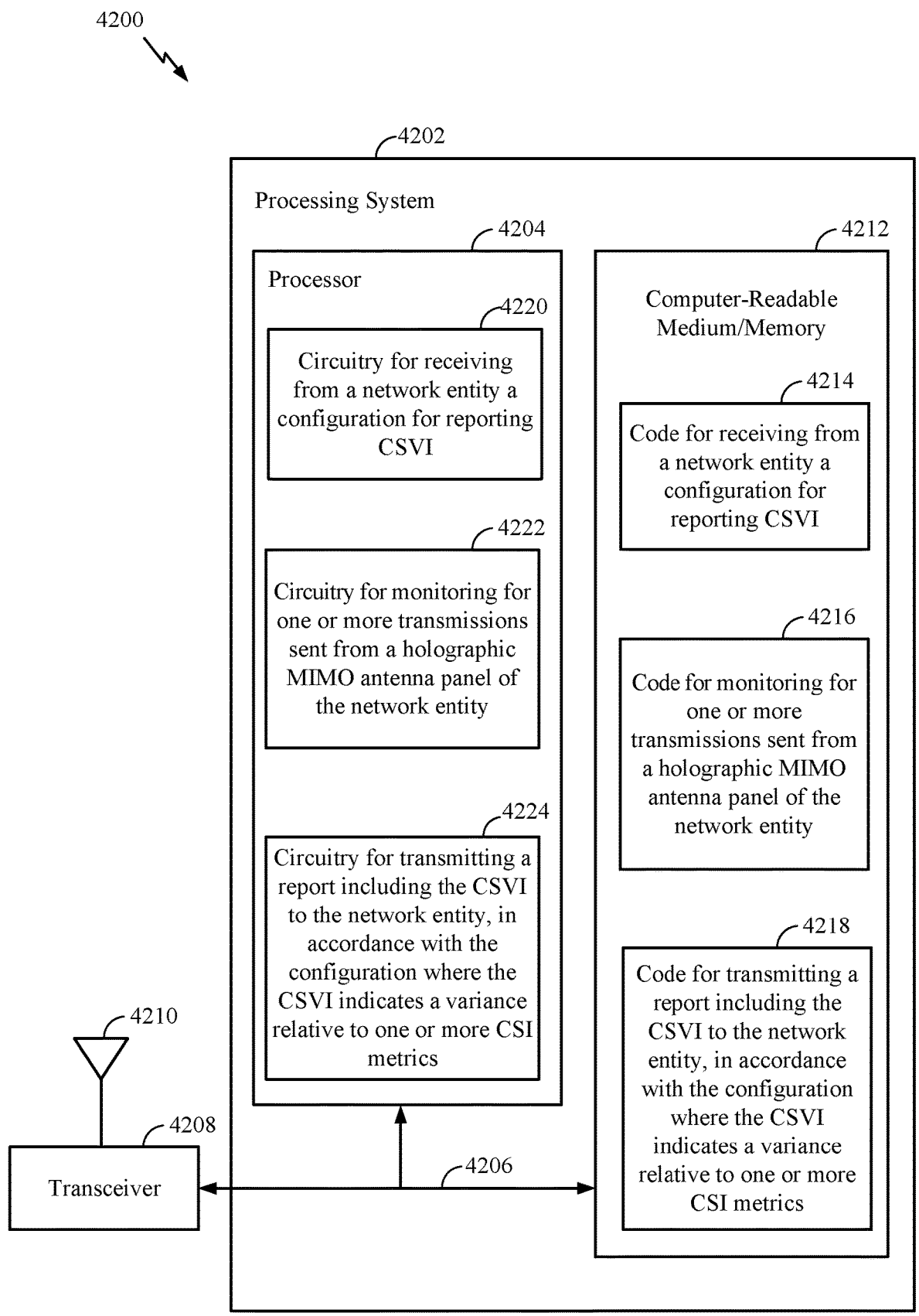
FIG. 42 illustrates a communications device that may include various components configured to perform operations for techniques disclosed herein, in accordance with certain aspects of the present disclosure.

FIG. 42 illustrates a communications device 4200 that may include various components (e.g., corresponding to means-plus-function components) configured to perform operations for the techniques disclosed herein, such as the operations illustrated in FIG. 33. The communications device 4200 includes a processing system 4202 coupled to a transceiver 4208 (e.g., a transmitter and/or a receiver). The transceiver 4208 is configured to transmit and receive signals for the communications device 4200 via an antenna 4210, such as the various signals as described herein. The processing system 4202 is configured to perform processing functions for the communications device 4200, including processing signals received and/or to be transmitted by the communications device 4200.

The processing system 4202 includes a processor 4204 coupled to a computer-readable medium/memory 4212 via a bus 4206. In certain aspects, the computer-readable medium/memory 4212 is configured to store instructions (e.g., computer-executable code) that when executed by the processor 4204, cause the processor 4204 to perform the operations illustrated in FIG. 33, or other operations for performing the various techniques discussed herein. In certain aspects, computer-readable medium/memory 4212 stores code 4214 for receiving, code 4216 for monitoring, and code 4218 for transmitting. The code 4214 for receiving may include code for receiving, from a network entity, a configuration for reporting CSVI. The code 4216 for monitoring may include code for monitoring for one or more transmissions sent from a holographic MIMO antenna panel of the network entity. The code 4218 for transmitting may include code for transmitting a report including the CSVI to the network entity, in accordance with the configuration where the CSVI indicates a variance relative to one or more CSI metrics.

The processor 4214 may include circuitry configured to implement the code stored in the computer-readable medium/memory 4212, such as for performing the operations illustrated in FIG. 33, as well as other operations for performing the various techniques discussed herein. For example, the processor 4204 includes circuitry 4220 for receiving, circuitry 4222 for monitoring, and circuitry 4224 for transmitting. The circuitry 4220 for receiving may include circuitry for receiving, from a network entity, a configuration for reporting CSVI. The circuitry 4222 for monitoring may include circuitry for monitoring for one or more transmissions sent from a holographic MIMO antenna panel of the network entity. The circuitry 4224 for transmitting may include circuitry for transmitting a report including the CSVI to the network entity, in accordance with the configuration where the CSVI indicates a variance relative to one or more CSI metrics.

Figure 43:
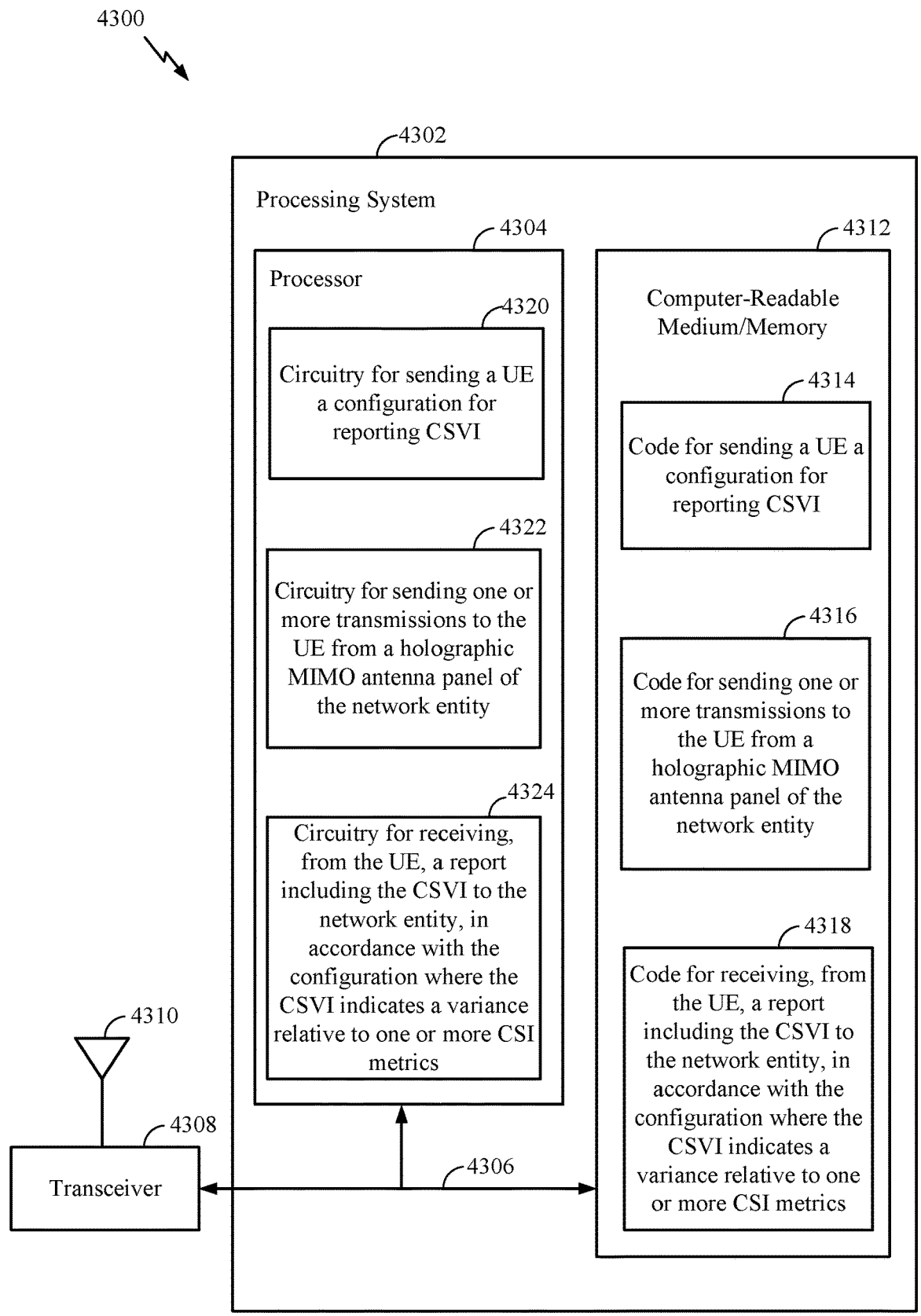
FIG. 43 illustrates a communications device that may include various components configured to perform operations for techniques disclosed herein, in accordance with certain aspects of the present disclosure.

FIG. 43 illustrates a communications device 4300 that may include various components (e.g., corresponding to means-plus-function components) configured to perform operations for the techniques disclosed herein, such as the operations illustrated in FIG. 34. The communications device 4300 includes a processing system 4302 coupled to a transceiver 4208 (e.g., a transmitter and/or a receiver). The transceiver 4308 is configured to transmit and receive signals for the communications device 4300 via an antenna 4310, such as the various signals as described herein. The processing system 4302 is configured to perform processing functions for the communications device 4300, including processing signals received and/or to be transmitted by the communications device 4300.

The processing system 4302 includes a processor 4304 coupled to a computer-readable medium/memory 4312 via a bus 4306. In certain aspects, the computer-readable medium/memory 4312 is configured to store instructions (e.g., computer-executable code) that when executed by the processor 4304, cause the processor 4304 to perform the operations illustrated in FIG. 34, or other operations for performing the various techniques discussed herein. In certain aspects, computer-readable medium/memory 4312 stores code 4314 for sending, code 4316 for sending, and code 4318 for receiving. The code 4314 for sending may include code sending a UE a configuration for reporting CSVI. The code 4316 for sending may include code for sending one or more transmissions to the UE from a holographic MIMO antenna panel of the network entity. The code 4318 for receiving may include code for receiving, from the UE, a report including the CSVI to the network entity, in accordance with the configuration, wherein the CSVI indicates a variance relative to one or more CSI metrics.

The processor 4314 may include circuitry configured to implement the code stored in the computer-readable medium/memory 4312, such as for performing the operations illustrated in FIG. 34, as well as other operations for performing the various techniques discussed herein. For example, the processor 4304 includes circuitry 4320 for sending, circuitry 4322 for sending, and circuitry 4324 for receiving. The circuitry 4320 for sending may include circuitry for sending a UE a configuration for reporting CSVI. The circuitry 4322 for sending may include circuitry for sending one or more transmissions to the UE from a holographic MIMO antenna panel of the network entity. The circuitry 4324 for receiving may include circuitry for receiving, from the UE, a report including the CSVI to the network entity, in accordance with the configuration, wherein the CSVI indicates a variance relative to one or more CSI metrics.

Example Aspects

Implementation examples are described in the following numbered clauses:

In a first aspect, a method for wireless communications by a user equipment (UE), comprising: receiving a configuration for reporting subarray grouping information (SGI); monitoring for first beam swept transmissions sent from multiple subarrays of a holographic multi input multi output (MIMO) antenna panel of a network entity; and transmitting the SGI to the network entity, in accordance with the configuration, wherein the SGI indicates one or more subarray groups determined based on the first beam swept transmissions.

In a second aspect, alone or in combination with the first aspect, monitoring for second beam swept transmissions sent from the one or more subarray groups indicated by the SGI; and transmitting a report indicating one or more beams selected for the one or more subarray groups based on the second beam swept transmissions.

In a third aspect, alone or in combination with one or more of the first and second aspects, the report also indicates channel state information (CSI) based on the one or more beams selected for the one or more subarray groups.

In a fourth aspect, alone or in combination with one or more of the first through third aspects, the configuration is received via at least one of a radio resource control (RRC) signal, a medium access control-control element (MAC-CE) or a downlink control information (DCI), and wherein the configuration indicates at least one of: a number of subarrays; a maximum number of subarray groups, wherein the maximum number of subarray groups is less than a maximum MIMO rank of the UE; a number of swept beams for each subarray; a pattern of subarrays; or a subarray group restriction, wherein the subarray group restriction corresponds to a list of subarrays that cannot be grouped into one subarray group.

In a fifth aspect, alone or in combination with one or more of the first through fourth aspects, the subarrays within the one or more subarray groups are positioned adjacent to each other, and wherein each beam from each subarray is transmitted at orthogonal radio resources comprising different time domain resources, different frequency domain resources, or orthogonal covering codes (OCC), and wherein each beam from each subarray have a large beam width.

In a sixth aspect, alone or in combination with one or more of the first through fifth aspects, the UE determines the SGI based on at least one of: a maximum number of data streams received simultaneously; or receive (Rx) antennas, wherein when the UE is equipped with the Rx antennas comprising a uniform linear array (ULA) and a uniform planar array (UPA) antenna panel, the UE is configured to group subarrays based on used Rx antenna panels.

In a seventh aspect, alone or in combination with one or more of the first through sixth aspects, the UE transmits the SGI to the network entity via a physical layer control message comprising a channel state information (CSI), and wherein the physical layer control message further indicates at least one of a physical layer measurement metrics comprising a reference signal receive power (RSRP) or a selected beam of each subarray within each subarray group for the network entity to determine a position of the UE, and wherein the physical layer control message further indicates at least one of RSRP values or beam indexes to the network entity to determine a direction and a field type of the first beam swept transmissions, and wherein the field type comprises a far field or a near field.

In an eighth aspect, alone or in combination with one or more of the first through seventh aspects, the SGI indicates at least one of: a value to indicate a number of the subarray groups; a subarray group index for each subarray within the subarray groups; a value to indicate a number of subarrays in each subarray group; a value corresponding to a total number of determined subarrays; or a list to indicate determined subarray indexes of all the subarray groups.

In a ninth aspect, alone or in combination with one or more of the first through eighth aspects, the subarrays in each subarray group indicated by the SGI are combined as a joint panel, and wherein a same data stream is inputted to each subarray within each joint panel, and wherein a size of the joint panel is larger than an individual panel of one subarray such that a border between a near field and a far field moves away from the joint panel.

In a tenth aspect, alone or in combination with one or more of the first through ninth aspects, the UE measures and determines optimal beams from each joint panel, and wherein the report further indicates the one or more beams selected for the one or more subarray groups in form of CSI reference signal (CSI-RS) resource index of each joint panel along with at least one of: a channel quality information (CQI), a precoding matrix indicator (PMI), a resource indicator (RI) or CSI metrics based on the reported one or more beams.

In an eleventh aspect, a method for wireless communications by a network entity, comprising: sending, to a user equipment (UE), a configuration for reporting subarray grouping information (SGI); sending first beam swept transmissions from multiple subarrays of a holographic multi input multi output (MIMO) antenna panel of the network entity; and receiving the SGI from the UE, wherein the SGI indicates one or more subarray groups determined based on the first beam swept transmissions.

In a twelfth aspect, alone or in combination with the eleventh aspect, sending second beam swept transmissions from the subarray groups indicated by the SGI; and receiving a report from the UE indicating one or more beams selected for the subarray groups based on the second beam swept transmissions.

In a thirteenth aspect, alone or in combination with one or more of the eleventh and twelfth aspects, the report also indicates channel state information (CSI) based on the one or more beams selected for the one or more subarray groups.

In a fourteenth aspect, alone or in combination with one or more of the eleventh through thirteenth aspects, the configuration is sent via at least one of a radio resource control (RRC) signal, a medium access control-control element (MAC-CE) or a downlink control information (DCI), and wherein the configuration indicates at least one of: a number of subarrays; a maximum number of subarray groups, wherein the maximum number of subarray groups is less than a maximum MIMO rank of the UE; a number of swept beams for each subarray; a pattern of subarrays; or a subarray group restriction, wherein the subarray group restriction corresponds to a list of subarrays that cannot be grouped into one subarray group.

In a fifteenth aspect, alone or in combination with one or more of the eleventh through fourteenth aspects, the subarrays within the one or more subarray groups are positioned adjacent to each other, and wherein each beam from each subarray is transmitted at orthogonal radio resources comprising different time domain resources, different frequency domain resources, or orthogonal covering codes (OCC), and wherein each beam from each subarray have a large beam width.

In a sixteenth aspect, alone or in combination with one or more of the eleventh through fifteenth aspects, the SGI is based on at least one of: a maximum number of data streams received simultaneously; or receive (Rx) antennas, wherein when the UE is equipped with the Rx antennas comprising a uniform linear array (ULA) and a uniform planar array (UPA) antenna panel, the UE is configured to group subarrays based on used Rx antenna panels.

In a seventeenth aspect, alone or in combination with one or more of the eleventh through sixteenth aspects, the network entity receives the SGI from the UE via a physical layer control message comprising a channel state information (CSI), and wherein the physical layer control message further indicates at least one of a physical layer measurement metrics comprising a reference signal receive power (RSRP) or a selected beam of each subarray within each subarray group for the network entity to determine a position of the UE, and wherein the physical layer control message further indicates at least one of RSRP values or beam indexes to the network entity to determine a direction and a field type of the first beam swept transmissions, and wherein the field type comprises a far field or a near field.

In an eighteenth aspect, alone or in combination with one or more of the eleventh through seventeenth aspects, the SGI indicates at least one of: a value to indicate a number of the subarray groups; a subarray group index for each subarray within the subarray groups; a value to indicate a number of subarrays in each subarray group; a value corresponding to a total number of determined subarrays; or a list to indicate determined subarray indexes of all the subarray groups.

In a nineteenth aspect, alone or in combination with one or more of the eleventh through eighteenth aspects, the subarrays in each subarray group indicated by the SGI are combined as a joint panel, and wherein a same data stream is inputted to each subarray within each joint panel, and wherein a size of the joint panel is larger than an individual panel of one subarray such that a border between a near field and a far field moves away from the joint panel.

In a twentieth aspect, alone or in combination with one or more of the eleventh through nineteenth aspects, estimating a position of the UE based on at least one of physical layer measurement metrics comprising a reference signal receive power (RSRP) or a selected beam of each subarray within each subarray group; determining whether the UE is located in the near field or the far field of the joint panel based on the estimated position of the UE; and sending three-dimensional (3D) or 2D beams in the second beam swept transmissions via the joint panel when the UE is located in the near field or the far field of the joint panel.

In a twenty-first aspect, a method for wireless communications by a user equipment (UE), comprising: monitoring for first beam swept transmissions sent from multiple subarrays of a holographic multi input multi output (MIMO) antenna panel of a network entity; transmitting a first report to the network entity indicating channel gains for one or more of the subarrays calculated based on the first beam swept transmissions; receiving subarray partition information (SPI) from the network entity indicating one or more subarrays allocated to the UE based on the reported channel gains.

In a twenty-second aspect, alone or in combination with the twenty-first aspect, transmitting a second report to the network entity indicating subarray grouping information (SGI) determined based on the SPI; monitoring for second beam swept transmissions sent from subarray groups based on the SGI indicated in the second report; and transmitting a third report indicating one or more beams selected for the subarray groups based on the second beam swept transmissions.

In a twenty-third aspect, alone or in combination with one or more of the twenty-first and twenty-second aspects, the first beam swept transmissions are sent via at least one of synchronization signal blocks (SSBs) or channel state information reference signals (CSI-RSs) of each subarray; each SSB or CSI-RS is sent via different beams of each subarray; the multiple subarrays are indexed; the UE receives a configuration indicating a number and sequence of the multiple subarrays sending the first beam swept transmissions; and a channel gain for each of the one or more of the subarrays is a largest channel gain corresponding to an optimal beam within the first beam swept transmissions from each of the one or more of the subarrays.

In a twenty-fourth aspect, alone or in combination with one or more of the twenty-first through twenty-third aspects, the first report indicates at least one of: a channel gain for each subarray of the one or more of the subarrays individually; the channel gain for each subarray of the one or more of the subarrays jointly, wherein the channel gain for each subarray jointly comprises an absolute value and a list of relative values for each subarray; or an optimal beam of each subarray.

In a twenty-fifth aspect, alone or in combination with one or more of the twenty-first through twenty-fourth aspects, the SPI is received via at least one of: a radio resource control (RRC) signal, a medium access control-control element (MAC-CE) or a downlink control information (DCI) when UE pairing is static, semi-static, or dynamic; a dedicated signaling, wherein at least one of: one bit indication is assigned to each subarray of the multiple subarrays or the one or more subarrays allocated to the UE are selected from the multiple subarrays and indexes of the one or more subarrays are indicated to the UE via the SPI; or a common signaling comprising a common medium access control-control element (MAC-CE) or a common downlink control information (DCI), wherein the SPI indicating the one or more subarrays allocated to all paired UEs is received by a group of paired UEs via the common signaling.

In a twenty-sixth aspect, alone or in combination with one or more of the twenty-first through twenty-fifth aspects, the SPI indicates at least one of: the one or more subarrays allocated to the UE along with a transmit power of each of the one or more subarrays when the SPI is received via the dedicated signaling; or the one or more subarrays allocated to all the paired UEs along with a transmit power of each UE for a shared subarray when the SPI is received via the common signaling and the transmit power is not evenly allocated to all UEs that share the subarray.

In a twenty-seventh aspect, a method for wireless communications by a network entity, comprising: sending, to a user equipment (UE), first beam swept transmissions from multiple subarrays of a holographic multi input multi output (MIMO) antenna panel of the network entity; receiving, from the UE, a first report indicating channel gains for one or more of the subarrays calculated based on the first beam swept transmissions; sending subarray partition information (SPI) to the UE indicating one or more subarrays allocated to the UE based on the reported channel gains.

In a twenty-eighth aspect, alone or in combination with the twenty-seventh aspect, receiving a second report from the UE indicating subarray grouping information (SGI) determined based on the SPI; and sending second beam swept transmissions from subarray groups based on the SGI indicated in the second report; and receiving, from the UE, a third report indicating one or more beams selected for the subarray groups based on the second beam swept transmissions.

In a twenty-ninth aspect, alone or in combination with one or more of the twenty-seventh and twenty-eighth aspects, pairing UEs based on the channel gains; and allocating the one or more subarrays to each pair, wherein partitioned subarrays indicated by the SPI for multiple UEs are different when the holographic MIMO antenna panel is without a combiner, and wherein one or more of the partitioned subarrays for the multiple UEs are identical when the holographic MIMO antenna panel has the combiner.

In a thirtieth aspect, alone or in combination with one or more of the twenty-seventh through twenty-ninth aspects, the SPI is sent via at least one of: a radio resource control (RRC) signal, a medium access control-control element (MAC-CE) or a downlink control information (DCI) when UE pairing is static, semi-static, or dynamic; a dedicated signaling, wherein at least one of: one bit indication is assigned to each subarray of the multiple subarrays or the one or more subarrays allocated to the UE are selected from the multiple subarrays and indexes of the one or more subarrays are indicated to the UE via the SPI; or a common signaling comprising a common medium access control-control element (MAC-CE) or a common downlink control information (DCI), wherein the SPI indicating the one or more subarrays allocated to all paired UEs is received by a group of paired UEs via the common signaling; and wherein the SPI indicates at least one of: the one or more subarrays allocated to the UE along with a transmit power of each of the one or more subarrays when the SPI is received via the dedicated signaling; or the one or more subarrays allocated to all the paired UEs along with a transmit power of each UE for a shared subarray when the SPI is received via the common signaling and the transmit power is not evenly allocated to all UEs that share the subarray.

In a thirty-first aspect, a method for wireless communications by a user equipment (UE), comprising: receiving, from a network entity, a configuration for reporting channel state variance information (CSVI); monitoring for one or more transmissions sent from a holographic multi input multi output (MIMO) antenna panel of the network entity; and transmitting a report including the CSVI to the network entity, in accordance with the configuration, wherein the CSVI indicates a variance relative to one or more channel state information (CSI) metrics.

In a thirty-second aspect, alone or in combination with the thirty-first aspect, the one or more CSI metrics comprise at least one of: a physical layer reference signal receive power (RSRP) value or a physical layer signal to interference and noise ratio (SINR) value.

In a thirty-third aspect, alone or in combination with one or more of the thirty-first and thirty-second aspects, receiving, from the network entity, an indication of a beam adjustment based on the CSVI included in the report; and communicating with the network entity in accordance with the indicated beam adjustment.

In a thirty-fourth aspect, alone or in combination with one or more of the thirty-first through thirty-third aspects, receiving from the network entity at least one of: channel state information reference signals (CSI-RSs) or synchronization signal blocks (SSBs) and at least one channel state information (CSI) report; and calculating the CSVI based on at least one of: the CSI-RSs or SSBs and the at least one CSI report.

In a thirty-fifth aspect, alone or in combination with one or more of the thirty-first through thirty-fourth aspects, the configuration is received via at least one of: a radio resource control (RRC) signal, a medium access control-control element (MAC-CE) or a downlink control information (DCI).

In a thirty-sixth aspect, alone or in combination with one or more of the thirty-first through thirty-fifth aspects, a variance value corresponding to the CSVI is based on CSI values in a measurement period, and wherein the measurement period is a duration between two CSI reports that are sent by the UE to the network entity.

In a thirty-seventh aspect, alone or in combination with one or more of the thirty-first through thirty-sixth aspects, the configuration indicates a quantization rule, and wherein a variance value corresponding to the CSVI is quantized based on the quantization rule.

In a thirty-eighth aspect, alone or in combination with one or more of the thirty-first through thirty-seventh aspects, the beam adjustment corresponds to changing a beam of the holographic MIMO antenna panel from a two-dimensional (2D) beam to a 3D beam when at least one of the physical layer RSRP value or the physical layer SINR value is more than a threshold.

In a thirty-ninth aspect, alone or in combination with one or more of the thirty-first through thirty-ninth aspects, the beam adjustment corresponds to changing a beam of the holographic MIMO antenna panel from a three-dimensional (3D) beam to a 2D beam when at least one of the physical layer RSRP value or the physical layer SINR value is less than a threshold.

In a fortieth aspect, a method for wireless communications by a network entity, comprising: sending a user equipment (UE) a configuration for reporting channel state variance information (CSVI); sending one or more transmissions to the UE from a holographic multi input multi output (MIMO) antenna panel of the network entity; and receiving, from the UE, a report including the CSVI to the network entity, in accordance with the configuration, wherein the CSVI indicates a variance relative to one or more channel state information (CSI) metrics.

In a forty-first aspect, alone or in combination the fortieth aspect, the one or more CSI metrics comprise at least one of: a physical layer reference signal receive power (RSRP) value or a physical layer signal to interference and noise ratio (SINR) value.

In a forty-second aspect, alone or in combination with one or more of the fortieth and forty-first aspects, transmitting, to the UE, an indication of a beam adjustment based on the CSVI included in the report; and communicating with the UE in accordance with the indicated beam adjustment.

In a forty-third aspect, alone or in combination with one or more of the fortieth through forty-second aspects, sending to the UE at least one of: multiple channel state information reference signals (CSI-RSs) or synchronization signal blocks (SSBs) and at least one channel state information (CSI) report to calculate the CSVI.

In a forty-fourth aspect, alone or in combination with one or more of the fortieth through forty-third aspects, the configuration is sent via at least one of a radio resource control (RRC) signal, a medium access control-control element (MAC-CE) or a downlink control information (DCI).

In a forty-fifth aspect, alone or in combination with one or more of the fortieth through forty-fourth aspects, a variance value corresponding to the CSVI is based on CSI values in a measurement period, and wherein the measurement period is a duration between two CSI reports that are sent by the UE to the network entity.

In a forty-sixth aspect, alone or in combination with one or more of the fortieth through forty-fifth aspects, the configuration indicates a quantization rule, and wherein a variance value corresponding to the CSVI is quantized based on the quantization rule.

In a forty-seventh aspect, alone or in combination with one or more of the fortieth through forty-sixth aspects, the beam adjustment corresponds to changing a beam of the holographic MIMO antenna panel from a two-dimensional (2D) beam to a 3D beam when at least one of the physical layer RSRP value or the physical layer SINR value is more than a threshold.

In a forty-eighth aspect, alone or in combination with one or more of the fortieth through forty-seventh aspects, the beam adjustment corresponds to changing a beam of the holographic MIMO antenna panel from a three-dimensional (3D) beam to a 2D beam when at least one of the physical layer RSRP value or the physical layer SINR value is less than a threshold.

An apparatus for wireless communication, comprising at least one processor; and a memory coupled to the at least one processor, the memory comprising code executable by the at least one processor to cause the apparatus to perform the method of any of the first through forty-eighth aspects.

An apparatus comprising means for performing the method of any of the first through forty-eighth aspects.

A computer readable medium storing computer executable code thereon for wireless communications that, when executed by at least one processor, cause an apparatus to perform the method of any of the first through forty-eighth aspects.

Additional Considerations

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A base station (BS) may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a customer premises equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. BSs are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another. In other words, unless a specific order of steps or actions is specified, the order and/or use of specific steps and/or actions may be modified.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, a digital signal processor (DSP), an application specific integrated circuit (ASIC), or a processor (e.g., a general purpose or specifically programmed processor). Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above can also be considered as examples of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 13. FIG. 14, FIG. 24, FIG. 25, FIG. 33, and/or FIG. 34.

Further, it should be appreciated that modules and/or other appropriate means for performing the methods and techniques described herein can be downloaded and/or otherwise obtained by a user terminal and/or BS as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or BS can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above.

The invention claimed is:

1. A method for wireless communications by a user equipment (UE), comprising:
   receiving a configuration for reporting subarray grouping information (SGI);
   monitoring for first beam swept transmissions sent from multiple subarrays of a holographic multi input multi output (MIMO) antenna panel of a network entity; and
   transmitting the SGI to the network entity, in accordance with the configuration, wherein the SGI indicates one or more subarray groups determined based on the first beam swept transmissions, a number of the one or more subarray groups, and a number of subarrays in each of the one or more subarray groups.

2. The method of claim 1, further comprising:
   monitoring for second beam swept transmissions sent from the one or more subarray groups indicated by the SGI; and
   transmitting a report indicating one or more beams selected for the one or more subarray groups based on the second beam swept transmissions.

3. The method of claim 2, wherein the report also indicates channel state information (CSI) based on the one or more beams selected for the one or more subarray groups.

4. The method of claim 3, wherein the subarrays in each subarray group indicated by the SGI are combined as a joint panel, and wherein a same data stream is inputted to each subarray within each joint panel, and wherein a size of the joint panel is larger than an individual panel of one subarray such that a border between a near field and a far field moves away from the joint panel.

5. The method of claim 4, wherein the UE measures and determines optimal beams from each joint panel, and wherein the report further indicates the one or more beams selected for the one or more subarray groups in form of CSI reference signal (CSI-RS) resource index of each joint panel along with at least one of: a channel quality information (CQI), a precoding matrix indicator (PMI), a resource indicator (RI) or CSI metrics based on the reported one or more beams.

6. The method of claim 1, wherein the configuration is received via at least one of a radio resource control (RRC) signal, a medium access control-control element (MAC-CE) or a downlink control information (DCI), and wherein the configuration indicates at least one of:
   a number of subarrays;
   a maximum number of subarray groups, wherein the maximum number of subarray groups is less than a maximum MIMO rank of the UE;
   a number of swept beams for each subarray;
   a pattern of subarrays; or
   a subarray group restriction, wherein the subarray group restriction corresponds to a list of subarrays that cannot be grouped into one subarray group.

7. The method of claim 1, wherein the subarrays within the one or more subarray groups are positioned adjacent to each other, and wherein each beam from each subarray is transmitted at orthogonal radio resources comprising different time domain resources, different frequency domain resources, or orthogonal covering codes (OCC), and wherein each beam from each subarray have a large beam width.

8. The method of claim 1, wherein the UE determines the SGI based on at least one of:
   a maximum number of data streams received simultaneously; or
   receive (Rx) antennas, wherein when the UE is equipped with the Rx antennas comprising a uniform linear array (ULA) and a uniform planar array (UPA) antenna panel, the UE is configured to group subarrays based on used Rx antenna panels.

9. The method of claim 1, wherein the UE transmits the SGI to the network entity via a physical layer control message comprising a channel state information (CSI), and wherein the physical layer control message further indicates at least one of a physical layer measurement metrics comprising a reference signal receive power (RSRP) or a selected beam of each subarray within each subarray group for the network entity to determine a position of the UE, and wherein the physical layer control message further indicates at least one of RSRP values or beam indexes to the network entity to determine a direction and a field type of the first beam swept transmissions, and wherein the field type comprises a far field or a near field.

10. The method of claim 1, wherein the SGI indicates at least one of:
    a subarray group index for each subarray within the subarray groups;
    a value corresponding to a total number of determined subarrays; or
    a list to indicate determined subarray indexes of all the subarray groups.

11. A method for wireless communications by a network entity, comprising:
    sending, to a user equipment (UE), a configuration for reporting subarray grouping information (SGI);
    sending first beam swept transmissions from multiple subarrays of a holographic multi input multi output (MIMO) antenna panel of the network entity; and
    receiving the SGI from the UE, wherein the SGI indicates one or more subarray groups determined based on the first beam swept transmissions, a number of the one or more subarray groups, and a number of subarrays in each of the one or more subarray groups.

12. The method of claim 11, further comprising:
sending second beam swept transmissions from the subarray groups indicated by the SGI; and
receiving a report from the UE indicating one or more beams selected for the subarray groups based on the second beam swept transmissions.

13. The method of claim 12, wherein the report also indicates channel state information (CSI) based on the one or more beams selected for the one or more subarray groups.

14. The method of claim 13, wherein the subarrays in each subarray group indicated by the SGI are combined as a joint panel, and wherein a same data stream is inputted to each subarray within each joint panel, and wherein a size of the joint panel is larger than an individual panel of one subarray such that a border between a near field and a far field moves away from the joint panel.

15. The method of claim 14, further comprising:
estimating a position of the UE based on at least one of physical layer measurement metrics comprising a reference signal receive power (RSRP) or a selected beam of each subarray within each subarray group;
determining whether the UE is located in the near field or the far field of the joint panel based on the estimated position of the UE; and
sending three-dimensional (3D) or 2D beams in the second beam swept transmissions via the joint panel when the UE is located in the near field or the far field of the joint panel.

16. The method of claim 11, wherein the configuration is sent via at least one of a radio resource control (RRC) signal, a medium access control-control element (MAC-CE) or a downlink control information (DCI), and wherein the configuration indicates at least one of:
a number of subarrays;
a maximum number of subarray groups, wherein the maximum number of subarray groups is less than a maximum MIMO rank of the UE;
a number of swept beams for each subarray;
a pattern of subarrays; or
a subarray group restriction, wherein the subarray group restriction corresponds to a list of subarrays that cannot be grouped into one subarray group.

17. The method of claim 11, wherein the subarrays within the one or more subarray groups are positioned adjacent to each other, and wherein each beam from each subarray is transmitted at orthogonal radio resources comprising different time domain resources, different frequency domain resources, or orthogonal covering codes (OCC), and wherein each beam from each subarray have a large beam width.

18. The method of claim 11, wherein the SGI is based on at least one of:
a maximum number of data streams received simultaneously; or
receive (Rx) antennas, wherein when the UE is equipped with the Rx antennas comprising a uniform linear array (ULA) and a uniform planar array (UPA) antenna panel, the UE is configured to group subarrays based on used Rx antenna panels.

19. The method of claim 11, wherein the network entity receives the SGI from the UE via a physical layer control message comprising a channel state information (CSI), and wherein the physical layer control message further indicates at least one of a physical layer measurement metrics comprising a reference signal receive power (RSRP) or a selected beam of each subarray within each subarray group for the network entity to determine a position of the UE, and wherein the physical layer control message further indicates at least one of RSRP values or beam indexes to the network entity to determine a direction and a field type of the first beam swept transmissions, and wherein the field type comprises a far field or a near field.

20. The method of claim 11, wherein the SGI indicates at least one of:
a subarray group index for each subarray within the subarray groups;
a value corresponding to a total number of determined subarrays; or
a list to indicate determined subarray indexes of all the subarray groups.

21. A method for wireless communications by a user equipment (UE), comprising:
monitoring for first beam swept transmissions sent from multiple subarrays of a holographic multi input multi output (MIMO) antenna panel of a network entity;
transmitting a first report to the network entity indicating channel gains for one or more of the subarrays calculated based on the first beam swept transmissions; and
receiving subarray partition information (SPI) from the network entity indicating one or more subarrays from the multiple subarrays allocated to the UE based on the reported channel gains, wherein the SPI further comprises a one-bit indication for each subarray of the multiple subarrays indicating whether the subarray is allocated or not allocated to the UE.

22. The method of claim 21, further comprising:
transmitting a second report to the network entity indicating subarray grouping information (SGI) determined based on the SPI;
monitoring for second beam swept transmissions sent from subarray groups based on the SGI indicated in the second report; and
transmitting a third report indicating one or more beams selected for the subarray groups based on the second beam swept transmissions.

23. The method of claim 21, wherein:
the first beam swept transmissions are sent via at least one of synchronization signal blocks (SSBs) or channel state information reference signals (CSI-RSs) of each subarray;
each SSB or CSI-RS is sent via different beams of each subarray;
the multiple subarrays are indexed;
the UE receives a configuration indicating a number and sequence of the multiple subarrays sending the first beam swept transmissions; and
a channel gain for each of the one or more of the subarrays is a largest channel gain corresponding to an optimal beam within the first beam swept transmissions from each of the one or more of the subarrays.

24. The method of claim 21, wherein the first report indicates at least one of:
a channel gain for each subarray of the one or more of the subarrays individually;
the channel gain for each subarray of the one or more of the subarrays jointly, wherein the channel gain for each subarray jointly comprises an absolute value and a list of relative values for each subarray; or
an optimal beam of each subarray.

25. The method of claim 21, wherein the SPI is received via at least one of:
- a radio resource control (RRC) signal, a medium access control-control element (MAC-CE) or a downlink control information (DCI) when UE pairing is static, semi-static, or dynamic;
- a dedicated signaling, wherein at least one of: one bit indication is assigned to each subarray of the multiple subarrays or the one or more subarrays allocated to the UE are selected from the multiple subarrays and indexes of the one or more subarrays are indicated to the UE via the SPI; or
- a common signaling comprising a common medium access control-control element (MAC-CE) or a common downlink control information (DCI), wherein the SPI indicating the one or more subarrays allocated to all paired UEs is received by a group of paired UEs via the common signaling.

26. The method of claim 25, wherein the SPI indicates at least one of:
- the one or more subarrays allocated to the UE along with a transmit power of each of the one or more subarrays when the SPI is received via the dedicated signaling; or
- the one or more subarrays allocated to all the paired UEs along with a transmit power of each UE for a shared subarray when the SPI is received via the common signaling and the transmit power is not evenly allocated to all UEs that share the subarray.

27. A method for wireless communications by a network entity, comprising:
- sending, to a user equipment (UE), first beam swept transmissions from multiple subarrays of a holographic multi input multi output (MIMO) antenna panel of the network entity;
- receiving, from the UE, a first report indicating channel gains for one or more of the subarrays calculated based on the first beam swept transmissions; and
- sending subarray partition information (SPI) to the UE indicating one or more subarrays from the multiple subarrays allocated to the UE based on the reported channel gains, wherein the SPI further comprises a one-bit indication for each subarray of the multiple subarrays indicating whether the subarray is allocated or not allocated to the UE.

28. The method of claim 27, further comprising:
- receiving a second report from the UE indicating subarray grouping information (SGI) determined based on the SPI; and
- sending second beam swept transmissions from subarray groups based on the SGI indicated in the second report; and
- receiving, from the UE, a third report indicating one or more beams selected for the subarray groups based on the second beam swept transmissions.

29. The method of claim 27, further comprising:
- pairing UEs based on the channel gains; and
- allocating the one or more subarrays to each pair, wherein partitioned subarrays indicated by the SPI for multiple UEs are different when the holographic MIMO antenna panel is without a combiner, and wherein one or more of the partitioned subarrays for the multiple UEs are identical when the holographic MIMO antenna panel has the combiner.

30. The method of claim 27, wherein the SPI is sent via at least one of:
- a radio resource control (RRC) signal, a medium access control-control element (MAC-CE) or a downlink control information (DCI) when UE pairing is static, semi-static, or dynamic;
- a dedicated signaling, wherein at least one of: one bit indication is assigned to each subarray of the multiple subarrays or the one or more subarrays allocated to the UE are selected from the multiple subarrays and indexes of the one or more subarrays are indicated to the UE via the SPI; or
- a common signaling comprising a common medium access control-control element (MAC-CE) or a common downlink control information (DCI), wherein the SPI indicating the one or more subarrays allocated to all paired UEs is received by a group of paired UEs via the common signaling; and wherein the SPI indicates at least one of:
- the one or more subarrays allocated to the UE along with a transmit power of each of the one or more subarrays when the SPI is received via the dedicated signaling; or
- the one or more subarrays allocated to all the paired UEs along with a transmit power of each UE for a shared subarray when the SPI is received via the common signaling and the transmit power is not evenly allocated to all UEs that share the subarray.

* * * * *